United States Patent
Cotter et al.

(10) Patent No.: US 11,427,740 B2
(45) Date of Patent: Aug. 30, 2022

(54) METHOD OF MAKING SHAPED ABRASIVE PARTICLES AND ARTICLES COMPRISING FORMING A FLANGE FROM OVERFILLING

(71) Applicant: SAINT-GOBAIN CERAMICS & PLASTICS, INC., Worcester, MA (US)

(72) Inventors: Todd M. Cotter, Hudson, MA (US); Francois Wagner, Nemours (FR); Rene G. Demers, Niagara Falls (CA); Richard J. Klok, Niagara Falls (CA); Alexandra Marazano, Saint Paul lès romans (FR); Adam D. Lior, Brookline, MA (US); James A. Salvatore, Sutton, MA (US); Sujatha K. Iyengar, Northborough, MA (US); David F. Louapre, Paris (FR); Sidath S. Wijesooriya, Wayland, MA (US); Ronald Christopher Motta, Worcester, MA (US); Gary A. Guertin, Ashburnham, MA (US); Michael D. Kavanaugh, North Grafton, MA (US); Doruk O. Yener, Bedford, MA (US); Jennifer H. Czerepinski, Framingham, MA (US); Jun Jia, Newton, MA (US); Frederic Josseaux, Sausset les pins (FR); Ralph Bauer, Niagara Falls (CA); Frank J. Csillag, Hopkinton, MA (US); Yang Zhong, Hopkinton, MA (US); James P. Stewart, Leicester, MA (US); Mark P. Dombrowski, Worcester, MA (US); Sandhya Jayaraman Rukmani, Shrewsbury, MA (US); Amandine Martin, Puteaux (FR); Stephen E. Fox, Worcester, MA (US); Nilanjan Sarangi, Shrewsbury, MA (US); Dean S. Matsumoto, Worcester, MA (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 201 days.

(21) Appl. No.: 16/749,490

(22) Filed: Jan. 22, 2020

(65) Prior Publication Data

US 2020/0157396 A1    May 21, 2020

Related U.S. Application Data

(63) Continuation of application No. 15/420,701, filed on Jan. 31, 2017, now Pat. No. 10,563,105.

(51) Int. Cl.
 *C09K 3/14* (2006.01)
 *B28B 7/16* (2006.01)
 (Continued)

(52) U.S. Cl.
 CPC .............. *C09K 3/1409* (2013.01); *B24D 3/14* (2013.01); *B24D 99/00* (2013.01);
 (Continued)

(58) Field of Classification Search
 CPC ............................... B28B 7/16; C09K 3/1409
 See application file for complete search history.

(56) References Cited

U.S. PATENT DOCUMENTS

| 345,604 A | 7/1886 | Semper |
|---|---|---|
| 1,910,444 A | 5/1933 | Nicholson |

(Continued)

FOREIGN PATENT DOCUMENTS

| CA | 743715 A | 10/1966 |
|---|---|---|
| CA | 2423788 A1 | 7/2002 |

(Continued)

OTHER PUBLICATIONS

VSM Actirox Fibre Discs, The Latest Generation of Abrasives for Maximum Stock Removal [PDF] VSM Abrasives Ltd., Apr. 2019 [retrieved on May 15, 2019]. Retrieved from https://uk.vsmabrasives.com/fileadmin/user_upload/ACTIROX/VSM-ACTIROX-EN.pdf.

(Continued)

*Primary Examiner* — Hoa (Holly) Le
(74) *Attorney, Agent, or Firm* — Abel Schillinger, LLP; Adrian Lawrence

(57) ABSTRACT

Various shaped abrasive particles are disclosed. Each shaped abrasive particle includes a body having at least one major surface and a side surface extending from the major surface.

20 Claims, 37 Drawing Sheets

(51) Int. Cl.
  *B24D 99/00* (2010.01)
  *B24D 3/14* (2006.01)
  *C04B 35/56* (2006.01)
  *C04B 35/624* (2006.01)
  *C04B 35/111* (2006.01)
  *C04B 35/58* (2006.01)
  *B01J 2/26* (2006.01)

(52) U.S. Cl.
  CPC .......... *C04B 35/1115* (2013.01); *C04B 35/56* (2013.01); *C04B 35/58* (2013.01); *C04B 35/624* (2013.01); *B01J 2/26* (2013.01); *C04B 2235/3206* (2013.01); *C04B 2235/5427* (2013.01); *C04B 2235/6021* (2013.01); *C04B 2235/6023* (2013.01); *C04B 2235/785* (2013.01); *C04B 2235/786* (2013.01); *C04B 2235/94* (2013.01)

(56) References Cited

U.S. PATENT DOCUMENTS

| | | |
|---|---|---|
| 2,033,991 A | 3/1936 | Melton et al. |
| 2,036,903 A | 4/1936 | Webster |
| 2,049,874 A | 8/1936 | Sherk |
| 2,148,400 A | 2/1939 | Crompton, Jr. |
| 2,248,064 A | 7/1941 | Carlton et al. |
| 2,248,990 A | 7/1941 | Heany |
| 2,290,877 A | 7/1942 | Heany |
| 2,318,360 A | 5/1943 | Benner et al. |
| 2,376,343 A | 5/1945 | Carlton |
| 2,563,650 A | 8/1951 | Heinemann et al. |
| 2,880,080 A | 3/1959 | Rankin et al. |
| 3,041,156 A | 6/1962 | Rowse et al. |
| 3,067,551 A | 12/1962 | Maginnis |
| 3,079,242 A | 2/1963 | Glasgow |
| 3,079,243 A | 2/1963 | Ueltz |
| 3,123,948 A | 3/1964 | Kistler et al. |
| 3,141,271 A | 7/1964 | Fischer et al. |
| 3,276,852 A | 10/1966 | Lemelson |
| 3,377,660 A | 4/1968 | Marshall et al. |
| 3,379,543 A | 4/1968 | Norwalk |
| 3,387,957 A | 6/1968 | Howard |
| 3,454,385 A | 7/1969 | Amero |
| 3,477,180 A | 11/1969 | Robertson, Jr. |
| 3,480,395 A | 11/1969 | McMullen et al. |
| 3,481,723 A | 12/1969 | Kistler et al. |
| 3,491,492 A | 1/1970 | Ueltz |
| 3,495,359 A | 2/1970 | Smith et al. |
| 3,536,005 A | 10/1970 | Derrickson |
| 3,590,799 A | 7/1971 | Guuchowicz |
| 3,608,050 A | 9/1971 | Carman et al. |
| 3,608,134 A | 9/1971 | Cook |
| 3,615,308 A | 10/1971 | Amero |
| 3,619,151 A | 11/1971 | Sheets, Jr. et al. |
| 3,637,360 A | 1/1972 | Ueltz |
| 3,670,467 A | 6/1972 | Walker |
| 3,672,934 A | 6/1972 | Larry |
| 3,808,747 A | 5/1974 | Kenagy |
| 3,819,785 A | 6/1974 | Argyle et al. |
| 3,859,407 A | 1/1975 | Blanding et al. |
| 3,874,856 A | 4/1975 | Leeds |
| 3,909,991 A | 10/1975 | Coes, Jr. |
| 3,940,276 A | 2/1976 | Wilson |
| 3,950,148 A | 4/1976 | Fukuda |
| 3,960,577 A | 6/1976 | Prochazka |
| 3,977,132 A | 8/1976 | Sekigawa |
| 3,986,885 A | 10/1976 | Lankard |
| 3,991,527 A | 11/1976 | Maran |
| 4,004,934 A | 1/1977 | Prochazka |
| 4,037,367 A | 7/1977 | Kruse |
| 4,045,919 A | 9/1977 | Moritomo |
| 4,055,451 A | 10/1977 | Cockbain et al. |
| 4,073,096 A | 2/1978 | Ueltz et al. |
| 4,114,322 A | 9/1978 | Greenspan |
| 4,150,078 A | 4/1979 | Miller et al. |
| 4,194,887 A | 3/1980 | Ueltz et al. |
| 4,252,544 A | 2/1981 | Takahashi |
| 4,261,706 A | 4/1981 | Blanding et al. |
| 4,286,905 A | 9/1981 | Samanta |
| 4,304,576 A | 12/1981 | Hattori et al. |
| 4,314,827 A | 2/1982 | Leitheiser et al. |
| 4,341,663 A | 7/1982 | Derleth et al. |
| 4,393,021 A | 7/1983 | Eisenberg et al. |
| 4,452,911 A | 6/1984 | Eccles et al. |
| 4,457,767 A | 7/1984 | Poon et al. |
| 4,469,758 A | 9/1984 | Scott |
| 4,505,720 A | 3/1985 | Gabor et al. |
| 4,541,842 A | 9/1985 | Rostoker |
| 4,548,617 A | 10/1985 | Miyatani et al. |
| 4,570,048 A | 2/1986 | Poole |
| 4,618,349 A | 10/1986 | Hashimoto et al. |
| 4,623,364 A | 11/1986 | Cottringer et al. |
| 4,656,330 A | 4/1987 | Poole |
| 4,657,754 A | 4/1987 | Bauer et al. |
| 4,659,341 A | 4/1987 | Ludwig et al. |
| 4,678,560 A | 7/1987 | Stole et al. |
| 4,711,750 A | 12/1987 | Scott |
| 4,728,043 A | 3/1988 | Ersdal et al. |
| 4,744,802 A | 5/1988 | Schwabel |
| 4,770,671 A | 9/1988 | Monroe |
| 4,786,292 A | 11/1988 | Janz et al. |
| 4,797,139 A | 1/1989 | Bauer |
| 4,797,269 A | 1/1989 | Bauer et al. |
| 4,799,939 A | 1/1989 | Bloecher et al. |
| 4,829,027 A | 5/1989 | Cutler et al. |
| 4,832,706 A | 5/1989 | Yates |
| 4,848,041 A | 7/1989 | Kruschke |
| 4,858,527 A | 8/1989 | Masanao |
| 4,863,573 A | 9/1989 | Moore et al. |
| 4,876,226 A | 10/1989 | Fuentes |
| 4,881,951 A | 11/1989 | Wood et al. |
| 4,917,852 A | 4/1990 | Poole et al. |
| 4,918,116 A | 4/1990 | Gardziella et al. |
| 4,925,457 A | 5/1990 | Dekok et al. |
| 4,925,815 A | 5/1990 | Tani et al. |
| 4,930,266 A | 6/1990 | Calhoun et al. |
| 4,942,011 A | 7/1990 | Bolt et al. |
| 4,954,462 A | 9/1990 | Wood |
| 4,960,441 A | 10/1990 | Pellow et al. |
| 4,961,757 A | 10/1990 | Rhodes et al. |
| 4,963,012 A | 10/1990 | Tracy |
| 4,964,883 A | 10/1990 | Morris et al. |
| 4,970,057 A | 11/1990 | Wilkens et al. |
| 4,997,461 A | 3/1991 | Markhoff-Matheny et al. |
| 5,000,760 A | 3/1991 | Ohtsubo et al. |
| 5,009,675 A | 4/1991 | Kunz et al. |
| 5,009,676 A | 4/1991 | Rue et al. |
| 5,011,508 A | 4/1991 | Wald et al. |
| 5,011,510 A | 4/1991 | Hayakawa et al. |
| 5,014,468 A | 5/1991 | Ravipati et al. |
| 5,024,795 A | 6/1991 | Kennedy et al. |
| 5,032,304 A | 7/1991 | Toyota |
| 5,035,723 A | 7/1991 | Kalinowski et al. |
| 5,035,724 A | 7/1991 | Pukari et al. |
| 5,042,991 A | 8/1991 | Kunz et al. |
| 5,049,166 A | 9/1991 | Kirkendall |
| 5,049,645 A | 9/1991 | Nagaoka et al. |
| 5,053,367 A | 10/1991 | Newkirk et al. |
| 5,053,369 A | 10/1991 | Winkler et al. |
| 5,076,991 A | 12/1991 | Poole et al. |
| 5,078,753 A | 1/1992 | Broberg et al. |
| 5,081,082 A | 1/1992 | Hai-Doo et al. |
| 5,085,671 A | 2/1992 | Martin et al. |
| 5,090,968 A | 2/1992 | Pellow |
| 5,094,986 A | 3/1992 | Matsumoto et al. |
| 5,098,740 A | 3/1992 | Tewari |
| 5,103,598 A | 4/1992 | Kelly |
| 5,108,963 A | 4/1992 | Fu et al. |
| 5,114,438 A | 5/1992 | Leatherman et al. |
| 5,120,327 A | 6/1992 | Dennis |
| 5,123,935 A | 6/1992 | Kanamaru et al. |
| 5,129,919 A | 7/1992 | Kalinowski et al. |
| 5,131,926 A | 7/1992 | Rostoker et al. |

(56) References Cited

U.S. PATENT DOCUMENTS

| | | |
|---|---|---|
| 5,132,984 A | 7/1992 | Simpson |
| 5,139,978 A | 8/1992 | Wood |
| 5,152,917 A | 10/1992 | Pieper et al. |
| 5,160,509 A | 11/1992 | Carman et al. |
| 5,164,744 A | 11/1992 | Yoshida et al. |
| 5,173,457 A | 12/1992 | Shorthouse |
| 5,178,849 A | 1/1993 | Bauer |
| 5,180,630 A | 1/1993 | Giglia |
| 5,185,012 A | 2/1993 | Kelly |
| 5,185,299 A | 2/1993 | Wood et al. |
| 5,190,568 A | 3/1993 | Tselesin |
| 5,194,072 A | 3/1993 | Rue et al. |
| 5,201,916 A | 4/1993 | Berg et al. |
| 5,203,886 A | 4/1993 | Sheldon et al. |
| 5,213,591 A | 5/1993 | Celikkaya et al. |
| 5,215,552 A | 6/1993 | Sung |
| 5,219,462 A | 6/1993 | Bruxvoort et al. |
| 5,219,806 A | 6/1993 | Wood |
| 5,221,294 A | 6/1993 | Carman et al. |
| 5,224,970 A | 7/1993 | Harakawa et al. |
| 5,227,104 A | 7/1993 | Bauer |
| 5,244,477 A | 9/1993 | Rue et al. |
| 5,244,849 A | 9/1993 | Roy et al. |
| 5,273,558 A | 12/1993 | Nelson et al. |
| 5,277,702 A | 1/1994 | Thibault et al. |
| 5,282,875 A | 2/1994 | Wood |
| 5,288,297 A | 2/1994 | Ringwood |
| 5,300,130 A | 4/1994 | Rostoker |
| 5,304,331 A | 4/1994 | Leonard et al. |
| 5,312,789 A | 5/1994 | Wood |
| 5,312,791 A | 5/1994 | Coblenz et al. |
| 5,314,513 A | 5/1994 | Miller et al. |
| 5,366,523 A | 11/1994 | Rowenhorst et al. |
| 5,366,525 A | 11/1994 | Fujiyama |
| 5,372,620 A | 12/1994 | Rowse et al. |
| 5,373,786 A | 12/1994 | Umaba |
| 5,376,598 A | 12/1994 | Preedy et al. |
| 5,376,602 A | 12/1994 | Nilsen |
| 5,383,945 A | 1/1995 | Cottringer et al. |
| 5,395,407 A | 3/1995 | Cottringer et al. |
| 5,409,645 A | 4/1995 | Torre, Jr. et al. |
| 5,429,648 A | 7/1995 | Wu |
| 5,431,967 A | 7/1995 | Manthiram |
| 5,435,816 A | 7/1995 | Spurgeon et al. |
| 5,437,754 A | 8/1995 | Calhoun |
| 5,441,549 A | 8/1995 | Helmin |
| 5,443,603 A | 8/1995 | Kirkendall |
| 5,447,894 A | 9/1995 | Yasuoka et al. |
| 5,453,106 A | 9/1995 | Roberts |
| 5,454,844 A | 10/1995 | Hibbard et al. |
| 5,470,806 A | 11/1995 | Krstic et al. |
| 5,479,873 A | 1/1996 | Shintani et al. |
| 5,482,756 A | 1/1996 | Berger et al. |
| 5,486,496 A | 1/1996 | Talbert et al. |
| 5,496,386 A | 3/1996 | Broberg et al. |
| 5,498,268 A | 3/1996 | Gagliardi et al. |
| 5,500,273 A | 3/1996 | Holmes et al. |
| 5,514,631 A | 5/1996 | Cottringer et al. |
| 5,516,347 A | 5/1996 | Garg |
| 5,516,348 A | 5/1996 | Conwell et al. |
| 5,523,074 A | 6/1996 | Takahashi et al. |
| 5,525,100 A | 6/1996 | Kelly et al. |
| 5,527,369 A | 6/1996 | Garg |
| 5,543,368 A | 8/1996 | Talbert et al. |
| 5,549,962 A | 8/1996 | Holmes et al. |
| 5,551,963 A | 9/1996 | Larmie |
| 5,560,745 A | 10/1996 | Roberts |
| 5,567,150 A | 10/1996 | Conwell et al. |
| 5,567,214 A | 10/1996 | Ashley |
| 5,567,251 A | 10/1996 | Peker et al. |
| 5,571,297 A | 11/1996 | Swei et al. |
| 5,576,409 A | 11/1996 | Mackey |
| 5,578,095 A | 11/1996 | Bland et al. |
| 5,578,222 A | 11/1996 | Trischuk et al. |
| 5,582,625 A | 12/1996 | Wright et al. |
| 5,584,896 A | 12/1996 | Broberg et al. |
| 5,584,897 A | 12/1996 | Christianson et al. |
| 5,591,685 A | 1/1997 | Mitomo et al. |
| 5,593,468 A | 1/1997 | Khaund et al. |
| 5,599,493 A | 2/1997 | Ito et al. |
| 5,603,738 A | 2/1997 | Zeiringer et al. |
| 5,609,706 A | 3/1997 | Benedict et al. |
| 5,611,829 A | 3/1997 | Monroe et al. |
| 5,618,221 A | 4/1997 | Furukawa et al. |
| 5,628,952 A | 5/1997 | Holmes et al. |
| 5,641,469 A | 6/1997 | Garg et al. |
| RE35,570 E | 7/1997 | Rowenhorst et al. |
| 5,645,619 A | 7/1997 | Erickson et al. |
| 5,651,925 A | 7/1997 | Ashley et al. |
| 5,656,217 A | 8/1997 | Rogers et al. |
| 5,667,542 A | 9/1997 | Law et al. |
| 5,669,941 A | 9/1997 | Peterson |
| 5,669,943 A | 9/1997 | Horton et al. |
| 5,672,097 A | 9/1997 | Hoopman |
| 5,672,554 A | 9/1997 | Mohri et al. |
| 5,683,844 A | 11/1997 | Mammino |
| 5,702,811 A | 12/1997 | Ho et al. |
| 5,725,162 A | 3/1998 | Garg et al. |
| 5,736,619 A | 4/1998 | Kane et al. |
| 5,738,696 A | 4/1998 | Wu |
| 5,738,697 A | 4/1998 | Wu et al. |
| 5,751,313 A | 5/1998 | Miyashita et al. |
| 5,759,481 A | 6/1998 | Pujari et al. |
| 5,776,214 A | 7/1998 | Wood |
| 5,779,743 A | 7/1998 | Wood |
| 5,785,722 A | 7/1998 | Garg et al. |
| 5,810,587 A | 9/1998 | Bruns et al. |
| 5,820,450 A | 10/1998 | Calhoun |
| 5,830,248 A | 11/1998 | Christianson et al. |
| 5,840,089 A | 11/1998 | Chesley et al. |
| 5,849,646 A | 12/1998 | Stout et al. |
| 5,855,997 A | 1/1999 | Amateau |
| 5,863,306 A | 1/1999 | Wei et al. |
| 5,866,254 A | 2/1999 | Peker et al. |
| 5,876,793 A | 3/1999 | Sherman et al. |
| 5,885,311 A | 3/1999 | McCutcheon et al. |
| 5,893,935 A | 4/1999 | Wood |
| 5,902,647 A | 5/1999 | Venkataramani |
| 5,908,477 A | 6/1999 | Harmer et al. |
| 5,908,478 A | 6/1999 | Wood |
| 5,919,549 A | 7/1999 | Van et al. |
| 5,924,917 A | 7/1999 | Benedict et al. |
| 5,946,991 A | 9/1999 | Hoopman |
| 5,975,987 A | 11/1999 | Hoopman et al. |
| 5,980,678 A | 11/1999 | Tselesin |
| 5,984,988 A | 11/1999 | Berg et al. |
| 5,989,301 A | 11/1999 | Laconto, Sr. et al. |
| 5,997,597 A | 12/1999 | Hagan |
| 6,016,660 A | 1/2000 | Abramshe |
| 6,019,805 A | 2/2000 | Herron |
| 6,024,824 A | 2/2000 | Krech |
| 6,027,326 A | 2/2000 | Cesarano, III et al. |
| 6,039,775 A | 3/2000 | Ho et al. |
| 6,048,577 A | 4/2000 | Garg |
| 6,053,956 A | 4/2000 | Wood |
| 6,054,093 A | 4/2000 | Torre, Jr. et al. |
| 6,080,215 A | 6/2000 | Stubbs et al. |
| 6,080,216 A | 6/2000 | Erickson |
| 6,083,622 A | 7/2000 | Garg et al. |
| 6,096,107 A | 8/2000 | Caracostas et al. |
| 6,110,241 A | 8/2000 | Sung |
| 6,129,540 A | 10/2000 | Hoopman et al. |
| 6,136,288 A | 10/2000 | Bauer et al. |
| 6,146,247 A | 11/2000 | Nokubi et al. |
| 6,179,887 B1 | 1/2001 | Barber, Jr. et al. |
| 6,206,942 B1 | 3/2001 | Wood |
| 6,228,134 B1 | 5/2001 | Erickson |
| 6,238,450 B1 | 5/2001 | Garg et al. |
| 6,258,137 B1 | 7/2001 | Garg et al. |
| 6,258,141 B1 | 7/2001 | Sung et al. |
| 6,261,682 B1 | 7/2001 | Law |
| 6,264,710 B1 | 7/2001 | Erickson |
| 6,277,160 B1 | 8/2001 | Stubbs et al. |
| 6,277,161 B1 | 8/2001 | Castro et al. |

(56) References Cited

U.S. PATENT DOCUMENTS

| | | |
|---|---|---|
| 6,283,997 B1 | 9/2001 | Garg et al. |
| 6,284,690 B1 | 9/2001 | Nakahata et al. |
| 6,287,353 B1 | 9/2001 | Celikkaya |
| 6,306,007 B1 | 10/2001 | Mori et al. |
| 6,312,324 B1 | 11/2001 | Mitsui et al. |
| 6,319,108 B1 | 11/2001 | Adefris et al. |
| 6,331,343 B1 | 12/2001 | Perez et al. |
| 6,371,842 B1 | 4/2002 | Romero |
| 6,391,812 B1 | 5/2002 | Araki et al. |
| 6,398,989 B1 | 6/2002 | Bergstrom |
| 6,401,795 B1 | 6/2002 | Cesarano, III et al. |
| 6,403,001 B1 | 6/2002 | Hayashi |
| 6,413,286 B1 | 7/2002 | Swei et al. |
| 6,428,392 B1 | 8/2002 | Sunahara et al. |
| 6,451,076 B1 | 9/2002 | Nevoret et al. |
| 6,475,253 B2 | 11/2002 | Culler et al. |
| 6,511,938 B1 | 1/2003 | Liu |
| 6,524,681 B1 | 2/2003 | Seitz et al. |
| 6,531,423 B1 | 3/2003 | Schwetz et al. |
| 6,537,140 B1 | 3/2003 | Miller et al. |
| 6,579,819 B2 | 6/2003 | Hirosaki et al. |
| 6,582,623 B1 | 6/2003 | Grumbine et al. |
| 6,583,080 B1 | 6/2003 | Rosenflanz |
| 6,599,177 B2 | 7/2003 | Nevoret et al. |
| 6,646,019 B2 | 11/2003 | Perez et al. |
| 6,652,361 B1 | 11/2003 | Gash et al. |
| 6,669,745 B2 | 12/2003 | Prichard et al. |
| 6,685,755 B2 | 2/2004 | Ramanath et al. |
| 6,696,258 B1 | 2/2004 | Wei |
| 6,702,650 B2 | 3/2004 | Adefris |
| 6,737,378 B2 | 5/2004 | Hirosaki et al. |
| 6,749,496 B2 | 6/2004 | Mota et al. |
| 6,750,173 B2 | 6/2004 | Rizkalla |
| 6,752,700 B2 | 6/2004 | Duescher |
| 6,755,729 B2 | 6/2004 | Ramanath et al. |
| 6,802,878 B1 | 10/2004 | Monroe |
| 6,821,196 B2 | 11/2004 | Oliver |
| 6,833,014 B2 | 12/2004 | Welygan et al. |
| 6,843,815 B1 | 1/2005 | Thurber et al. |
| 6,846,795 B2 | 1/2005 | Lant et al. |
| 6,878,456 B2 | 4/2005 | Castro et al. |
| 6,881,483 B2 | 4/2005 | McArdle et al. |
| 6,888,360 B1 | 5/2005 | Connell et al. |
| 6,913,824 B2 | 7/2005 | Culler et al. |
| 6,942,561 B2 | 9/2005 | Mota et al. |
| 6,949,128 B2 | 9/2005 | Annen |
| 6,974,930 B2 | 12/2005 | Jense |
| 7,022,179 B1 | 4/2006 | Dry |
| 7,044,989 B2 | 5/2006 | Welygan et al. |
| 7,112,621 B2 | 9/2006 | Rohrbaugh et al. |
| 7,141,522 B2 | 11/2006 | Rosenflanz et al. |
| 7,168,267 B2 | 1/2007 | Rosenflanz et al. |
| 7,169,198 B2 | 1/2007 | Moeltgen et al. |
| 7,267,604 B2 | 9/2007 | Yoshizawa et al. |
| 7,267,700 B2 | 9/2007 | Collins et al. |
| 7,294,158 B2 | 11/2007 | Welygan et al. |
| 7,297,170 B2 | 11/2007 | Welygan et al. |
| 7,297,402 B2 | 11/2007 | Evans et al. |
| 7,364,788 B2 | 4/2008 | Kishbaugh et al. |
| 7,373,887 B2 | 5/2008 | Jackson |
| 7,384,437 B2 | 6/2008 | Welygan et al. |
| 7,404,832 B2 | 7/2008 | Ohtsubo et al. |
| 7,488,544 B2 | 2/2009 | Schofalvi et al. |
| 7,507,268 B2 | 3/2009 | Rosenflanz |
| 7,553,346 B2 | 6/2009 | Welygan et al. |
| 7,556,558 B2 | 7/2009 | Palmgren |
| 7,560,062 B2 | 7/2009 | Gould et al. |
| 7,560,139 B2 | 7/2009 | Thebault et al. |
| 7,563,293 B2 | 7/2009 | Rosenflanz |
| 7,611,795 B2 | 11/2009 | Aoyama et al. |
| 7,618,684 B2 | 11/2009 | Nesbitt |
| 7,632,434 B2 | 12/2009 | Duescher |
| 7,662,735 B2 | 2/2010 | Rosenflanz et al. |
| 7,666,344 B2 | 2/2010 | Schofalvi et al. |
| 7,666,475 B2 | 2/2010 | Morrison |
| 7,669,658 B2 | 3/2010 | Barron et al. |
| 7,670,679 B2 | 3/2010 | Krishna et al. |
| 7,695,542 B2 | 4/2010 | Drivdahl et al. |
| 7,858,189 B2 | 12/2010 | Wagener et al. |
| 7,867,302 B2 | 1/2011 | Nevoret et al. |
| 7,906,057 B2 | 3/2011 | Zhang et al. |
| 7,968,147 B2 | 6/2011 | Fang et al. |
| 7,972,430 B2 | 7/2011 | Millard et al. |
| 8,021,449 B2 | 9/2011 | Seth et al. |
| 8,034,137 B2 | 10/2011 | Erickson et al. |
| 8,049,136 B2 | 11/2011 | Mase et al. |
| 8,070,556 B2 | 12/2011 | Kumar et al. |
| 8,123,828 B2 | 2/2012 | Culler et al. |
| 8,141,484 B2 | 3/2012 | Ojima et al. |
| 8,142,531 B2 | 3/2012 | Adefris et al. |
| 8,142,532 B2 | 3/2012 | Erickson et al. |
| 8,142,891 B2 | 3/2012 | Culler et al. |
| 8,251,774 B2 | 8/2012 | Joseph et al. |
| 8,256,091 B2 | 9/2012 | Duescher |
| 8,333,360 B2 | 12/2012 | Rule et al. |
| 8,440,602 B2 | 5/2013 | Gonzales et al. |
| 8,440,603 B2 | 5/2013 | Gonzales et al. |
| 8,445,422 B2 | 5/2013 | Gonzales et al. |
| 8,470,759 B2 | 6/2013 | Gonzales et al. |
| 8,480,772 B2 | 7/2013 | Welygan et al. |
| 8,530,682 B2 | 9/2013 | Sachs |
| 8,568,497 B2 | 10/2013 | Sheridan |
| 8,628,597 B2 | 1/2014 | Palmgren et al. |
| 8,783,589 B2 | 7/2014 | Hart et al. |
| 8,852,643 B2 | 10/2014 | Gonzales et al. |
| 8,920,527 B2 | 12/2014 | Seider et al. |
| 8,921,687 B1 | 12/2014 | Welser |
| 9,017,439 B2 | 4/2015 | Yener et al. |
| 9,079,154 B2 | 7/2015 | Rosendahl |
| 9,181,477 B2 | 11/2015 | Collins et al. |
| 9,211,634 B2 | 12/2015 | Rehrig et al. |
| 9,259,726 B2 | 2/2016 | Gopal |
| 9,375,826 B2 | 6/2016 | Tian et al. |
| 9,717,674 B1 | 8/2017 | Guskey et al. |
| 9,758,724 B2 | 9/2017 | Collins et al. |
| 9,982,175 B2 | 5/2018 | Sarangi et al. |
| D849,066 S | 5/2019 | Hanschen et al. |
| D849,067 S | 5/2019 | Hanschen et al. |
| 10,364,383 B2 | 7/2019 | Yener et al. |
| D862,538 S | 10/2019 | Hanschen et al. |
| D870,782 S | 12/2019 | Hanschen et al. |
| 10,556,323 B2 | 2/2020 | Alkhas et al. |
| 10,557,068 B2 | 2/2020 | Oldenkotte et al. |
| 10,563,105 B2 * | 2/2020 | Cotter ................. C04B 35/58 |
| 10,655,038 B2 | 5/2020 | Martinez et al. |
| 10,710,211 B2 | 7/2020 | Lehuu et al. |
| 10,717,908 B2 | 7/2020 | Hejtmann et al. |
| 2001/0027623 A1 | 10/2001 | Rosenflanz |
| 2002/0026752 A1 | 3/2002 | Culler et al. |
| 2002/0068518 A1 | 6/2002 | Cesena et al. |
| 2002/0084290 A1 | 7/2002 | Materna |
| 2002/0090891 A1 | 7/2002 | Adefris et al. |
| 2002/0151265 A1 | 10/2002 | Adefris |
| 2002/0170236 A1 | 11/2002 | Larson et al. |
| 2002/0174935 A1 | 11/2002 | Burdon et al. |
| 2002/0177391 A1 | 11/2002 | Fritz et al. |
| 2003/0008933 A1 | 1/2003 | Perez et al. |
| 2003/0022961 A1 | 1/2003 | Kusaka et al. |
| 2003/0029094 A1 | 2/2003 | Moeltgen et al. |
| 2003/0085204 A1 | 5/2003 | Lagos |
| 2003/0109371 A1 | 6/2003 | Pujari et al. |
| 2003/0110707 A1 | 6/2003 | Rosenflanz et al. |
| 2003/0126800 A1 | 7/2003 | Seth et al. |
| 2003/0228738 A1 | 12/2003 | Beaudoin |
| 2004/0003895 A1 | 1/2004 | Amano et al. |
| 2004/0148868 A1 | 8/2004 | Anderson et al. |
| 2004/0148967 A1 | 8/2004 | Celikkaya et al. |
| 2004/0202844 A1 | 10/2004 | Wong |
| 2004/0224125 A1 | 11/2004 | Yamada et al. |
| 2004/0235406 A1 | 11/2004 | Duescher |
| 2004/0244675 A1 | 12/2004 | Kishimoto et al. |
| 2005/0020190 A1 | 1/2005 | Schutz et al. |
| 2005/0060941 A1 | 3/2005 | Provow et al. |
| 2005/0060947 A1 | 3/2005 | McArdle et al. |

(56) References Cited

U.S. PATENT DOCUMENTS

| | | |
|---|---|---|
| 2005/0064805 A1 | 3/2005 | Culler et al. |
| 2005/0081455 A1 | 4/2005 | Welygan et al. |
| 2005/0118939 A1 | 6/2005 | Duescher |
| 2005/0132655 A1 | 6/2005 | Anderson et al. |
| 2005/0218565 A1 | 10/2005 | DiChiara, Jr. |
| 2005/0223649 A1 | 10/2005 | O'Gary et al. |
| 2005/0232853 A1 | 10/2005 | Evans et al. |
| 2005/0245179 A1 | 11/2005 | Luedeke |
| 2005/0255801 A1 | 11/2005 | Pollasky |
| 2005/0266221 A1 | 12/2005 | Karam et al. |
| 2005/0271795 A1 | 12/2005 | Moini et al. |
| 2005/0284029 A1 | 12/2005 | Bourlier et al. |
| 2006/0049540 A1 | 3/2006 | Hui et al. |
| 2006/0126265 A1 | 6/2006 | Crespi et al. |
| 2006/0135050 A1 | 6/2006 | Petersen et al. |
| 2006/0177488 A1 | 8/2006 | Caruso et al. |
| 2006/0185256 A1 | 8/2006 | Nevoret et al. |
| 2007/0011951 A1 | 1/2007 | Gaeta et al. |
| 2007/0020457 A1 | 1/2007 | Adefris |
| 2007/0051355 A1 | 3/2007 | Sung |
| 2007/0072527 A1 | 3/2007 | Palmgren |
| 2007/0074456 A1 | 4/2007 | Orlhac et al. |
| 2007/0087928 A1 | 4/2007 | Rosenflanz et al. |
| 2007/0234646 A1 | 10/2007 | Can et al. |
| 2008/0017053 A1 | 1/2008 | Araumi et al. |
| 2008/0072500 A1 | 3/2008 | Klett et al. |
| 2008/0098659 A1 | 5/2008 | Sung |
| 2008/0121124 A1 | 5/2008 | Sato |
| 2008/0172951 A1 | 7/2008 | Starling |
| 2008/0176075 A1 | 7/2008 | Bauer et al. |
| 2008/0179783 A1 | 7/2008 | Liu et al. |
| 2008/0230951 A1 | 9/2008 | Dannoux et al. |
| 2008/0262577 A1 | 10/2008 | Altshuler et al. |
| 2008/0271384 A1 | 11/2008 | Puthanangady et al. |
| 2008/0286590 A1 | 11/2008 | Besida et al. |
| 2008/0299875 A1 | 12/2008 | Duescher |
| 2009/0016916 A1 | 1/2009 | Rosenzweig et al. |
| 2009/0017276 A1 | 1/2009 | Hoglund et al. |
| 2009/0017736 A1 | 1/2009 | Block et al. |
| 2009/0098365 A1 | 4/2009 | Moeltgen |
| 2009/0165394 A1 | 7/2009 | Culler et al. |
| 2009/0165661 A1 | 7/2009 | Koenig et al. |
| 2009/0169816 A1 | 7/2009 | Erickson et al. |
| 2009/0208734 A1 | 8/2009 | Macfie et al. |
| 2009/0246464 A1 | 10/2009 | Watanabe et al. |
| 2010/0000159 A1 | 1/2010 | Walia et al. |
| 2010/0003900 A1 | 1/2010 | Sakaguchi et al. |
| 2010/0003904 A1 | 1/2010 | Duescher |
| 2010/0040767 A1 | 2/2010 | Uibel et al. |
| 2010/0056816 A1 | 3/2010 | Wallin et al. |
| 2010/0064594 A1 | 3/2010 | Pakalapati et al. |
| 2010/0068974 A1 | 3/2010 | Dumm |
| 2010/0146867 A1 | 6/2010 | Boden et al. |
| 2010/0151195 A1 | 6/2010 | Culler et al. |
| 2010/0151196 A1 | 6/2010 | Adefris et al. |
| 2010/0151201 A1 | 6/2010 | Erickson et al. |
| 2010/0190424 A1 | 7/2010 | Francois et al. |
| 2010/0201018 A1 | 8/2010 | Yoshioka et al. |
| 2010/0251625 A1 | 10/2010 | Gaeta |
| 2010/0292428 A1 | 11/2010 | Meador et al. |
| 2010/0307067 A1 | 12/2010 | Sigalas et al. |
| 2010/0319269 A1 | 12/2010 | Erickson |
| 2010/0330886 A1 | 12/2010 | Wu et al. |
| 2011/0008604 A1 | 1/2011 | Boylan |
| 2011/0111563 A1 | 5/2011 | Yanagi et al. |
| 2011/0124483 A1 | 5/2011 | Shah et al. |
| 2011/0136659 A1 | 6/2011 | Allen et al. |
| 2011/0146509 A1 | 6/2011 | Welygan et al. |
| 2011/0152548 A1 | 6/2011 | Sachs |
| 2011/0160104 A1 | 6/2011 | Wu et al. |
| 2011/0244769 A1 | 10/2011 | David et al. |
| 2011/0289854 A1 | 12/2011 | Moren et al. |
| 2011/0314746 A1 | 12/2011 | Erickson et al. |
| 2012/0000135 A1 | 1/2012 | Eilers et al. |
| 2012/0034847 A1 | 2/2012 | Besse et al. |
| 2012/0055098 A1 | 3/2012 | Ramanath et al. |
| 2012/0100366 A1 | 4/2012 | Dumm et al. |
| 2012/0137597 A1 | 6/2012 | Adefris et al. |
| 2012/0144754 A1 | 6/2012 | Culler et al. |
| 2012/0144755 A1 | 6/2012 | Erickson et al. |
| 2012/0153547 A1 | 6/2012 | Bauer et al. |
| 2012/0167481 A1 | 7/2012 | Yener et al. |
| 2012/0168979 A1 | 7/2012 | Bauer et al. |
| 2012/0227333 A1 | 9/2012 | Adefris et al. |
| 2012/0231711 A1 | 9/2012 | Keipert et al. |
| 2012/0308837 A1 | 12/2012 | Schlechtriemen et al. |
| 2013/0000212 A1 | 1/2013 | Wang et al. |
| 2013/0000216 A1 | 1/2013 | Wang et al. |
| 2013/0009484 A1 | 1/2013 | Yu |
| 2013/0036402 A1 | 2/2013 | Mutisya et al. |
| 2013/0045251 A1 | 2/2013 | Cen et al. |
| 2013/0067669 A1 | 3/2013 | Gonzales et al. |
| 2013/0072417 A1 | 3/2013 | Perez-Prat et al. |
| 2013/0074418 A1 | 3/2013 | Panzarella et al. |
| 2013/0125477 A1 | 5/2013 | Adefris |
| 2013/0180180 A1 | 7/2013 | Yener et al. |
| 2013/0186005 A1 | 7/2013 | Kavanaugh |
| 2013/0186006 A1 | 7/2013 | Kavanaugh et al. |
| 2013/0199105 A1 | 8/2013 | Braun et al. |
| 2013/0203328 A1 | 8/2013 | Givot et al. |
| 2013/0212952 A1 | 8/2013 | Welygan et al. |
| 2013/0236725 A1 | 9/2013 | Yener et al. |
| 2013/0255162 A1 | 10/2013 | Welygan et al. |
| 2013/0260656 A1 | 10/2013 | Seth et al. |
| 2013/0267150 A1 | 10/2013 | Seider et al. |
| 2013/0283705 A1 | 10/2013 | Fischer et al. |
| 2013/0296587 A1 | 11/2013 | Rosendahl |
| 2013/0305614 A1 | 11/2013 | Gaeta et al. |
| 2013/0337262 A1 | 12/2013 | Bauer et al. |
| 2013/0337725 A1 | 12/2013 | Monroe |
| 2013/0344786 A1 | 12/2013 | Keipert |
| 2014/0000176 A1 | 1/2014 | Moren et al. |
| 2014/0007518 A1 | 1/2014 | Yener et al. |
| 2014/0080393 A1 | 3/2014 | Ludwig |
| 2014/0106126 A1 | 4/2014 | Gaeta et al. |
| 2014/0107356 A1 | 4/2014 | Gopal |
| 2014/0182216 A1 | 7/2014 | Panzarella et al. |
| 2014/0182217 A1 | 7/2014 | Yener et al. |
| 2014/0186585 A1 | 7/2014 | Field, III et al. |
| 2014/0250797 A1 | 9/2014 | Yener et al. |
| 2014/0256238 A1 | 9/2014 | Van et al. |
| 2014/0287658 A1 | 9/2014 | Flaschberger et al. |
| 2014/0290147 A1 | 10/2014 | Seth et al. |
| 2014/0352721 A1 | 12/2014 | Gonzales et al. |
| 2014/0352722 A1 | 12/2014 | Gonzales et al. |
| 2014/0357544 A1 | 12/2014 | Gonzales et al. |
| 2014/0378036 A1 | 12/2014 | Cichowlas et al. |
| 2015/0000209 A1 | 1/2015 | Louapre et al. |
| 2015/0000210 A1 | 1/2015 | Breder et al. |
| 2015/0007399 A1 | 1/2015 | Gonzales et al. |
| 2015/0007400 A1 | 1/2015 | Gonzales et al. |
| 2015/0089881 A1 | 4/2015 | Stevenson et al. |
| 2015/0126098 A1 | 5/2015 | Eilers et al. |
| 2015/0128505 A1 | 5/2015 | Wang et al. |
| 2015/0183089 A1 | 7/2015 | Iyengar et al. |
| 2015/0209932 A1 | 7/2015 | Lehuu et al. |
| 2015/0218430 A1 | 8/2015 | Yener et al. |
| 2015/0232727 A1 | 8/2015 | Erickson |
| 2015/0291865 A1 | 10/2015 | Breder et al. |
| 2015/0291866 A1 | 10/2015 | Arcona et al. |
| 2015/0291867 A1 | 10/2015 | Breder et al. |
| 2015/0343603 A1 | 12/2015 | Breder et al. |
| 2016/0090516 A1 | 3/2016 | Yener et al. |
| 2016/0177152 A1 | 6/2016 | Braun |
| 2016/0177153 A1 | 6/2016 | Josseaux |
| 2016/0177154 A1 | 6/2016 | Josseaux et al. |
| 2016/0186028 A1 | 6/2016 | Louapare et al. |
| 2016/0214903 A1 | 7/2016 | Humpal et al. |
| 2016/0298013 A1 | 10/2016 | Bock et al. |
| 2016/0303704 A1 | 10/2016 | Chou et al. |
| 2016/0303705 A1 | 10/2016 | Chou et al. |
| 2016/0304760 A1 | 10/2016 | Bock et al. |
| 2016/0311081 A1 | 10/2016 | Culler et al. |
| 2016/0311084 A1 | 10/2016 | Culler et al. |

(56) References Cited

U.S. PATENT DOCUMENTS

| | | | |
|---|---|---|---|
| 2016/0326416 A1 | 11/2016 | Bauer et al. | |
| 2016/0340564 A1 | 11/2016 | Louapre et al. | |
| 2016/0354898 A1 | 12/2016 | Nienaber et al. | |
| 2016/0362589 A1* | 12/2016 | Bauer | B01J 2/20 |
| 2017/0066099 A1 | 3/2017 | Nakamura | |
| 2017/0114260 A1 | 4/2017 | Bock et al. | |
| 2017/0129075 A1 | 5/2017 | Thurber et al. | |
| 2017/0225299 A1 | 8/2017 | Keipert et al. | |
| 2017/0335156 A1 | 11/2017 | Bauer et al. | |
| 2017/0349797 A1 | 12/2017 | Yener et al. | |
| 2018/0086957 A1 | 3/2018 | Sahlin et al. | |
| 2018/0161960 A1 | 6/2018 | Wilson et al. | |
| 2018/0169837 A1 | 6/2018 | Liu | |
| 2018/0215975 A1 | 8/2018 | Marazano et al. | |
| 2018/0215976 A1 | 8/2018 | Cotter et al. | |
| 2018/0318983 A1 | 11/2018 | Wilson et al. | |
| 2019/0022826 A1 | 1/2019 | Franke et al. | |
| 2019/0030684 A1 | 1/2019 | Van et al. | |
| 2019/0091835 A1 | 3/2019 | Culler et al. | |
| 2019/0126436 A1 | 5/2019 | Westberg et al. | |
| 2019/0217442 A1 | 7/2019 | Gaeta et al. | |
| 2019/0249052 A1 | 8/2019 | Eckel et al. | |
| 2019/0270182 A1 | 9/2019 | Eckel et al. | |
| 2019/0309201 A1 | 10/2019 | Dumont et al. | |
| 2019/0322915 A1 | 10/2019 | Jiwpanich et al. | |
| 2019/0330505 A1 | 10/2019 | Bujnowski et al. | |
| 2019/0337124 A1 | 11/2019 | Liu et al. | |
| 2019/0338172 A1 | 11/2019 | Erickson et al. | |
| 2019/0338173 A1 | 11/2019 | Yener et al. | |
| 2019/0351531 A1 | 11/2019 | Nelson et al. | |
| 2019/0366511 A1 | 12/2019 | Huber | |
| 2019/0382637 A1 | 12/2019 | Braun et al. | |
| 2020/0139512 A1 | 5/2020 | Culler et al. | |
| 2020/0148927 A1 | 5/2020 | Arcona et al. | |
| 2020/0156215 A1 | 5/2020 | Jusuf et al. | |
| 2020/0157396 A1 | 5/2020 | Cotter et al. | |
| 2020/0157397 A1 | 5/2020 | Stevenson et al. | |
| 2020/0199426 A1 | 6/2020 | Yener et al. | |
| 2021/0087445 A1* | 3/2021 | Cotter | B24D 99/00 |

FOREIGN PATENT DOCUMENTS

| | | |
|---|---|---|
| CH | 685051 A5 | 3/1995 |
| CN | 1229007 A | 7/2005 |
| CN | 1774488 A | 5/2006 |
| CN | 101389466 A | 3/2009 |
| CN | 101970347 A | 2/2011 |
| CN | 101980836 A | 2/2011 |
| CN | 102281992 A | 12/2011 |
| CN | 103189164 A | 7/2013 |
| CN | 103842132 A | 6/2014 |
| CN | 102123837 B | 7/2014 |
| CN | 104125875 A | 10/2014 |
| CN | 104994995 A | 10/2015 |
| CN | 105622071 A | 6/2016 |
| CN | 105713568 A | 6/2016 |
| DE | 3923671 C2 | 2/1998 |
| DE | 102012023688 A1 | 4/2014 |
| DE | 202014101739 U1 | 6/2014 |
| DE | 202014101741 U1 | 6/2014 |
| DE | 102013202204 A1 | 8/2014 |
| DE | 102013210158 A1 | 12/2014 |
| DE | 102013210716 A1 | 12/2014 |
| DE | 102013212598 A1 | 12/2014 |
| DE | 102013212622 A1 | 12/2014 |
| DE | 102013212634 A1 | 12/2014 |
| DE | 102013212639 A1 | 12/2014 |
| DE | 102013212644 A1 | 12/2014 |
| DE | 102013212653 A1 | 12/2014 |
| DE | 102013212654 A1 | 12/2014 |
| DE | 102013212661 A1 | 12/2014 |
| DE | 102013212666 A1 | 12/2014 |
| DE | 102013212677 A1 | 12/2014 |
| DE | 102013212680 A1 | 12/2014 |
| DE | 102013212687 A1 | 12/2014 |
| DE | 102013212690 A1 | 12/2014 |
| DE | 102013212700 A1 | 12/2014 |
| DE | 102014210836 A1 | 12/2014 |
| EP | 0078896 A2 | 5/1983 |
| EP | 0152768 A2 | 8/1985 |
| EP | 0293163 A2 | 11/1988 |
| EP | 0480133 A2 | 4/1992 |
| EP | 0652919 A1 | 5/1995 |
| EP | 0662110 A1 | 7/1995 |
| EP | 0500369 B1 | 1/1996 |
| EP | 0609864 B1 | 11/1996 |
| EP | 0771769 A2 | 5/1997 |
| EP | 0812456 B1 | 12/1997 |
| EP | 0651778 B1 | 5/1998 |
| EP | 0614861 B1 | 5/2001 |
| EP | 0931032 B3 | 7/2001 |
| EP | 0833803 B1 | 8/2001 |
| EP | 1207015 A2 | 5/2002 |
| EP | 1356152 A2 | 10/2003 |
| EP | 1371451 A1 | 12/2003 |
| EP | 1383631 B1 | 1/2004 |
| EP | 1015181 B1 | 3/2004 |
| EP | 1492845 A1 | 1/2005 |
| EP | 1851007 A1 | 11/2007 |
| EP | 1960157 A1 | 8/2008 |
| EP | 2176031 A1 | 4/2010 |
| EP | 2184134 A1 | 5/2010 |
| EP | 2242618 A2 | 10/2010 |
| EP | 2390056 A2 | 11/2011 |
| EP | 1800801 B1 | 3/2012 |
| EP | 2445982 A2 | 5/2012 |
| EP | 2507016 A2 | 10/2012 |
| EP | 2537917 A1 | 12/2012 |
| EP | 2567784 A1 | 3/2013 |
| EP | 2631286 A1 | 8/2013 |
| EP | 2692813 A1 | 2/2014 |
| EP | 2692814 A1 | 2/2014 |
| EP | 2692815 A1 | 2/2014 |
| EP | 2692816 A1 | 2/2014 |
| EP | 2692817 A1 | 2/2014 |
| EP | 2692818 A1 | 2/2014 |
| EP | 2692819 A1 | 2/2014 |
| EP | 2692820 A1 | 2/2014 |
| EP | 2692821 A1 | 2/2014 |
| EP | 2719752 A1 | 4/2014 |
| EP | 2720676 A1 | 4/2014 |
| EP | 2012972 B1 | 6/2014 |
| EP | 3319758 A1 | 5/2018 |
| EP | 3342839 A1 | 7/2018 |
| EP | 3444313 B1 | 7/2020 |
| FR | 2354373 A1 | 1/1978 |
| GB | 986847 A | 3/1965 |
| GB | 1456765 A | 11/1976 |
| GB | 1466054 | 3/1977 |
| JP | 53064890 A | 6/1978 |
| JP | 60-006356 U | 1/1985 |
| JP | 62002946 B | 1/1987 |
| JP | 63036905 B | 7/1988 |
| JP | 3079277 A | 4/1991 |
| JP | 03-287687 | 12/1991 |
| JP | 5285833 A | 11/1993 |
| JP | 6114739 A | 4/1994 |
| JP | 7008474 B2 | 2/1995 |
| JP | 3030861 U | 8/1996 |
| JP | 10113875 A | 5/1998 |
| JP | 2779252 B2 | 7/1998 |
| JP | 10330734 A | 12/1998 |
| JP | H10315142 A | 12/1998 |
| JP | 2957492 B2 | 10/1999 |
| JP | 2000091280 A | 3/2000 |
| JP | 2000-336344 A | 12/2000 |
| JP | 2000354967 A | 12/2000 |
| JP | 3160084 B2 | 4/2001 |
| JP | 2001162541 A | 6/2001 |
| JP | 03194269 B2 | 7/2001 |
| JP | 2001180930 A | 7/2001 |
| JP | 2001207160 A | 7/2001 |
| JP | 2002-038131 A | 2/2002 |
| JP | 2002210659 A | 7/2002 |

(56) References Cited

FOREIGN PATENT DOCUMENTS

| | | |
|---|---|---|
| JP | 2003-049158 A | 2/2003 |
| JP | 2004-510873 A | 4/2004 |
| JP | 2004209624 A | 7/2004 |
| JP | 2006130586 A | 5/2006 |
| JP | 2006130636 A | 5/2006 |
| JP | 2006159402 A | 6/2006 |
| JP | 2006-192540 A | 7/2006 |
| JP | 2007-537891 A | 12/2007 |
| JP | 2008132560 A | 6/2008 |
| JP | 2008194761 A | 8/2008 |
| JP | 2008531305 A | 8/2008 |
| JP | 2012512046 A | 5/2012 |
| JP | 2012512047 A | 5/2012 |
| JP | 2012512048 A | 5/2012 |
| JP | 2012530615 A | 12/2012 |
| JP | 5238725 B2 | 7/2013 |
| JP | 5238726 B2 | 7/2013 |
| JP | 2014503367 A | 2/2014 |
| JP | 2017518889 A | 7/2017 |
| JP | 2017538588 A | 12/2017 |
| JP | 2018510073 A | 4/2018 |
| KR | 20140106713 A | 9/2014 |
| NL | 171464 B | 11/1982 |
| WO | 94/02559 A1 | 2/1994 |
| WO | 95/03370 | 2/1995 |
| WO | 95/18192 A1 | 7/1995 |
| WO | 95/20469 A1 | 8/1995 |
| WO | 96/27189 A1 | 9/1996 |
| WO | 9711484 A1 | 3/1997 |
| WO | 97/14536 A1 | 4/1997 |
| WO | 99/06500 A1 | 2/1999 |
| WO | 1999/038817 A1 | 8/1999 |
| WO | 99/54424 A1 | 10/1999 |
| WO | 0064630 A1 | 11/2000 |
| WO | 01/14494 A1 | 3/2001 |
| WO | 0123323 A1 | 4/2001 |
| WO | 02/097150 A2 | 12/2002 |
| WO | 03/087236 A1 | 10/2003 |
| WO | 2005/080624 A1 | 9/2005 |
| WO | 2005112601 A2 | 12/2005 |
| WO | 2006/027593 | 3/2006 |
| WO | 2006062597 A1 | 6/2006 |
| WO | 2007/041538 A1 | 4/2007 |
| WO | 2009/085578 A2 | 7/2009 |
| WO | 2009085841 A2 | 7/2009 |
| WO | 2009098017 A1 | 8/2009 |
| WO | 2010/077509 A1 | 7/2010 |
| WO | 2010/085587 A1 | 7/2010 |
| WO | 2010/151201 | 12/2010 |
| WO | 2011005425 A2 | 1/2011 |
| WO | 2011/068714 A2 | 6/2011 |
| WO | 2011/068724 A2 | 6/2011 |
| WO | 2011/087649 A2 | 7/2011 |
| WO | 2011/109188 A2 | 9/2011 |
| WO | 2011133438 A1 | 10/2011 |
| WO | 2011/139562 A2 | 11/2011 |
| WO | 2011/149625 A2 | 12/2011 |
| WO | 2012/018903 A2 | 2/2012 |
| WO | 2012/061016 A1 | 5/2012 |
| WO | 2012/061033 A2 | 5/2012 |
| WO | 2012/092590 A2 | 7/2012 |
| WO | 2012/092605 A2 | 7/2012 |
| WO | 2012/112305 A2 | 8/2012 |
| WO | 2012/112322 A2 | 8/2012 |
| WO | 2010070294 A1 | 8/2012 |
| WO | 2012/141905 A2 | 10/2012 |
| WO | 2012092590 A3 | 10/2012 |
| WO | 2012140617 A1 | 10/2012 |
| WO | 2013/003830 A2 | 1/2013 |
| WO | 2013/003831 A2 | 1/2013 |
| WO | 2013/009484 A2 | 1/2013 |
| WO | 2013/036402 A1 | 3/2013 |
| WO | 2013040423 A2 | 3/2013 |
| WO | 2013/045251 A1 | 4/2013 |
| WO | 2013/049239 A1 | 4/2013 |
| WO | 2013/070576 A2 | 5/2013 |
| WO | 2013/101575 A1 | 7/2013 |
| WO | 2013/102170 A1 | 7/2013 |
| WO | 2013/102176 A1 | 7/2013 |
| WO | 2013/102177 A1 | 7/2013 |
| WO | 2013/106597 A1 | 7/2013 |
| WO | 2013/106602 A1 | 7/2013 |
| WO | 2013/151745 A1 | 10/2013 |
| WO | 2013149209 A1 | 10/2013 |
| WO | 2013/177446 A1 | 11/2013 |
| WO | 2013/186146 A1 | 12/2013 |
| WO | 2013/188038 A1 | 12/2013 |
| WO | 2014/005120 A1 | 1/2014 |
| WO | 2014/020068 A1 | 2/2014 |
| WO | 2014/020075 A1 | 2/2014 |
| WO | 2014/022453 A1 | 2/2014 |
| WO | 2014/022462 A1 | 2/2014 |
| WO | 2014/022465 A1 | 2/2014 |
| WO | 2014/161001 A1 | 2/2014 |
| WO | 2014/057273 A1 | 4/2014 |
| WO | 2014/062701 A1 | 4/2014 |
| WO | 2014/070468 A1 | 5/2014 |
| WO | 2014/106173 A1 | 7/2014 |
| WO | 2014/106211 A1 | 7/2014 |
| WO | 2014/124554 A1 | 8/2014 |
| WO | 2014/137972 A1 | 9/2014 |
| WO | 2014/140689 A1 | 9/2014 |
| WO | 2014/165390 A1 | 10/2014 |
| WO | 2014/176108 A1 | 10/2014 |
| WO | 2014/206739 A1 | 12/2014 |
| WO | 2014/206890 A1 | 12/2014 |
| WO | 2014/206967 A1 | 12/2014 |
| WO | 2014/209567 A1 | 12/2014 |
| WO | 2014/210160 A1 | 12/2014 |
| WO | 2014/210442 A1 | 12/2014 |
| WO | 2014/210532 A1 | 12/2014 |
| WO | 2014/210568 A1 | 12/2014 |
| WO | 2015/050781 A1 | 4/2015 |
| WO | 2015/073346 A1 | 5/2015 |
| WO | 2015/048768 A9 | 6/2015 |
| WO | 2015/088953 A1 | 6/2015 |
| WO | 2015/089527 A1 | 6/2015 |
| WO | 2015/089528 A1 | 6/2015 |
| WO | 2015/089529 A1 | 6/2015 |
| WO | 2015/100018 A1 | 7/2015 |
| WO | 2015/100020 A1 | 7/2015 |
| WO | 2015/100220 A1 | 7/2015 |
| WO | 2015/102992 A1 | 7/2015 |
| WO | 2015/112379 A1 | 7/2015 |
| WO | 2015/130487 A1 | 9/2015 |
| WO | 2015/158009 A1 | 10/2015 |
| WO | 2015/160854 A1 | 10/2015 |
| WO | 2015/160855 A1 | 10/2015 |
| WO | 2015/160857 A1 | 10/2015 |
| WO | 2015/164211 A1 | 10/2015 |
| WO | 2015/165122 A1 | 11/2015 |
| WO | 2015/167910 A1 | 11/2015 |
| WO | 2015/179335 A1 | 11/2015 |
| WO | 2015/180005 A1 | 12/2015 |
| WO | 2015/184355 A1 | 12/2015 |
| WO | 2016/028683 A1 | 2/2016 |
| WO | 2016/044158 A1 | 3/2016 |
| WO | 2016/064726 A1 | 4/2016 |
| WO | 2016/089675 A1 | 6/2016 |
| WO | 2016/105469 A1 | 6/2016 |
| WO | 2016/105474 A1 | 6/2016 |
| WO | 2016/160357 A1 | 10/2016 |
| WO | 2016/161157 A1 | 10/2016 |
| WO | 2016/161170 A1 | 10/2016 |
| WO | 2016/167967 A1 | 10/2016 |
| WO | 2016/187570 A1 | 11/2016 |
| WO | 2016/196795 A1 | 12/2016 |
| WO | 2016/201104 A1 | 12/2016 |
| WO | 2016/205133 A1 | 12/2016 |
| WO | 2016/205267 A1 | 12/2016 |
| WO | 2016/210057 A1 | 12/2016 |
| WO | 2017/007703 A1 | 1/2017 |
| WO | 2017/007714 A1 | 1/2017 |
| WO | 2017/062482 A1 | 4/2017 |

(56) References Cited

FOREIGN PATENT DOCUMENTS

| | | |
|---|---|---|
| WO | 2017/083249 A1 | 5/2017 |
| WO | 2017/083255 A1 | 5/2017 |
| WO | 2016/105543 A9 | 9/2017 |
| WO | 2017/151498 A1 | 9/2017 |
| WO | 2018/010730 A1 | 1/2018 |
| WO | 2018/026669 A1 | 2/2018 |
| WO | 2018/057465 A1 | 3/2018 |
| WO | 2018/057558 A1 | 3/2018 |
| WO | 2018/063902 A1 | 4/2018 |
| WO | 2018/063958 A1 | 4/2018 |
| WO | 2018/063960 A1 | 4/2018 |
| WO | 2018/063962 A1 | 4/2018 |
| WO | 2018/064642 A1 | 4/2018 |
| WO | 2018/080703 A1 | 5/2018 |
| WO | 2018/080704 A1 | 5/2018 |
| WO | 2018/080705 A1 | 5/2018 |
| WO | 2018/080755 A1 | 5/2018 |
| WO | 2018/080756 A1 | 5/2018 |
| WO | 2018/080765 A1 | 5/2018 |
| WO | 2018/080778 A1 | 5/2018 |
| WO | 2018/080784 A1 | 5/2018 |
| WO | 2018/081246 A1 | 5/2018 |
| WO | 2018/118688 A1 | 6/2018 |
| WO | 2018/118690 A1 | 6/2018 |
| WO | 2018/118695 A1 | 6/2018 |
| WO | 2018/118699 A1 | 6/2018 |
| WO | 2018/134732 A1 | 7/2018 |
| WO | 2018/136268 A1 | 7/2018 |
| WO | 2018/136269 A1 | 7/2018 |
| WO | 2018/136271 A1 | 7/2018 |
| WO | 2018/172193 A1 | 9/2018 |
| WO | 2018/207145 A1 | 11/2018 |
| WO | 2018236989 A1 | 12/2018 |
| WO | 2019001908 A1 | 1/2019 |
| WO | 2019069157 A1 | 4/2019 |
| WO | 2019102312 A1 | 5/2019 |
| WO | 2019102328 A1 | 5/2019 |
| WO | 2019102329 A1 | 5/2019 |
| WO | 2019102330 A1 | 5/2019 |
| WO | 2019102331 A1 | 5/2019 |
| WO | 2021161129 A1 | 8/2019 |
| WO | 2019167022 A1 | 9/2019 |
| WO | 2019197948 A1 | 10/2019 |
| WO | 2019207415 A1 | 10/2019 |
| WO | 2019207416 A1 | 10/2019 |
| WO | 2019207417 A1 | 10/2019 |
| WO | 2019207423 A1 | 10/2019 |
| WO | 2019215571 A1 | 11/2019 |
| WO | 2020025270 A1 | 2/2020 |
| WO | 2020035764 A1 | 2/2020 |
| WO | 2020075005 A1 | 4/2020 |
| WO | 2020079522 A1 | 4/2020 |
| WO | 2020084382 A1 | 4/2020 |
| WO | 2020084483 A1 | 4/2020 |
| WO | 2020089741 A1 | 5/2020 |
| WO | 2020128708 A1 | 6/2020 |
| WO | 2020128716 A1 | 6/2020 |
| WO | 2020128717 A1 | 6/2020 |
| WO | 2020128719 A1 | 6/2020 |
| WO | 2020128720 A2 | 6/2020 |
| WO | 2020128752 A1 | 6/2020 |
| WO | 2020128779 A2 | 6/2020 |
| WO | 2020128780 A1 | 6/2020 |
| WO | 2020128781 A1 | 6/2020 |
| WO | 2020128783 A1 | 6/2020 |
| WO | 2020128787 A1 | 6/2020 |
| WO | 2020128794 A1 | 6/2020 |
| WO | 2020128833 A1 | 6/2020 |
| WO | 2020128838 A1 | 6/2020 |
| WO | 2020128842 A1 | 6/2020 |
| WO | 2020128844 A1 | 6/2020 |
| WO | 2020128845 A1 | 6/2020 |
| WO | 2020128852 A1 | 6/2020 |
| WO | 2020128853 A1 | 6/2020 |
| WO | 2020128856 A1 | 6/2020 |
| WO | 2021009600 A1 | 1/2021 |
| WO | 2021014271 A1 | 1/2021 |
| WO | 2021074756 A1 | 4/2021 |
| WO | 2021074768 A1 | 4/2021 |
| WO | 2021079331 A1 | 4/2021 |
| WO | 2021081571 A1 | 5/2021 |
| WO | 2021105030 A1 | 6/2021 |
| WO | 2021116883 A1 | 6/2021 |
| WO | 2021137092 A1 | 7/2021 |
| WO | 2021179025 A1 | 9/2021 |
| WO | 2021186326 A1 | 9/2021 |
| WO | 2021214065 A1 | 10/2021 |
| WO | 2021214576 A1 | 10/2021 |
| WO | 2021234540 A1 | 11/2021 |

OTHER PUBLICATIONS

Torre, "Investigation of Shaped Abrasive Particles vol. 1: Review of U.S. Pat. No. 6,054,093 Apr. 25, 2000" © Apr. 2011, 5 pages.

Austin, Benson M., "Thick-Film Screen Printing," Solid State Technology, Jun. 1969, pp. 53-58.

Avril, Nicholas Joseph, "Manufacturing Glass-fiber Reinforcement for Grinding Wheels," Massachusetts Institute of Technology, 1996, 105 pgs.

Bacher, Rudolph J., "High Resolution Thick Film Printing," E.I. du Pont de Nemours & Company, Inc., pp. 576-581, date unknown.

Besse, John R., "Understanding and controlling wheel truing and dressing forces when rotary plunge dressing," Cutting Tool Engineering, Jun. 2012, vol. 64, Issue 6, 5 pages.

Brewer, L. et al., Journal of Materials Research, 1999, vol. 14, No. 10, pp. 3907-3912.

Ciccotti, M. et al., "Complex dynamics in the peeling of an adhesive tape," International Journal of Adhesion & Adhesives 24 (2004) pp. 143-151.

DuPont, "Kevlar Aramid Pulp", Copyright 2011, DuPont, 1 page.

Wu, J. et al., Friction and Wear Properties of Kevlar Pulp Reinforced Epoxy.

J. European Ceramic Society 31, Abstract only (2011) 2073-2081.

Riemer, Dietrich E., "Analytical Engineering Model of the Screen Printing Process: Part II," Solid State Technology, Sep. 1988, pp. 85-90.

Miller, L.F., "Paste Transfer in the Screening Process," Solid State Technology, Jun. 1969, pp. 46-52.

Morgan, P. et al., "Ceramic Composites of Monazite and Alumina," J. Am. Ceram. Soc., 78, 1995, 1553-63.

Riemer, Dietrich E., "Analytical Engineering Model of the Screen Printing Process: Part I," Solid State Technology, Aug. 1988, pp. 107-111.

Winter Catalogue No. 5, Dressing tools, Winter diamond tools for dressing grinding wheels, 140 pages.

Badger, Jeffrey, "Evaluation of Triangular, Engineered-Shape Ceramic Abrasive in Cutting Discs," Supplement to the Welding Journal, Apr. 2014, vol. 93, pp. 107-s to 115-s.

3M Cubitron II Abrasive Belts Brochure, Shaping the Future, Jan. 2011, 6 pages.

Vanstrum et al., Precisely Shaped Grain (PSG): 3M's Innovation in Abrasive Grain Technology, date unknown, 1 page.

Graf, "Cubitron II: Precision-Shaped Grain (PSG) Turns the Concept of Gear Grinding Upside Down," gearsolutions.com, May 2014, pp. 36-44.

DOW Machine Tool Accessories, Grinding & Surface Finishing, www.1mta.com, Nov. 2014, 72 pages.

Kumar et al., "Composites by rapid prototyping technology", Material & Design, Feb. 2010, vol. 31, Issue 2, pp. 850-856.

Lewis et al., "Direct Ink Writing of Three-Dimensional Ceramic Structures", Journal of the American Ceramic Society, US, Nov. 30, 2006, vol. 89, Issue 12, pp. 3599-3609.

International Search Report with regard to International application No. PCT/US2017/031998, dated Aug. 21, 2017.

International Search Report with regard to International application No. PCT/US2017/031992, dated Aug. 21, 2017.

(56) References Cited

OTHER PUBLICATIONS

International Search Report and Written Opinion for Application No. PCT/US2016/036701, dated Sep. 1, 2016, 12 pages.

\* cited by examiner

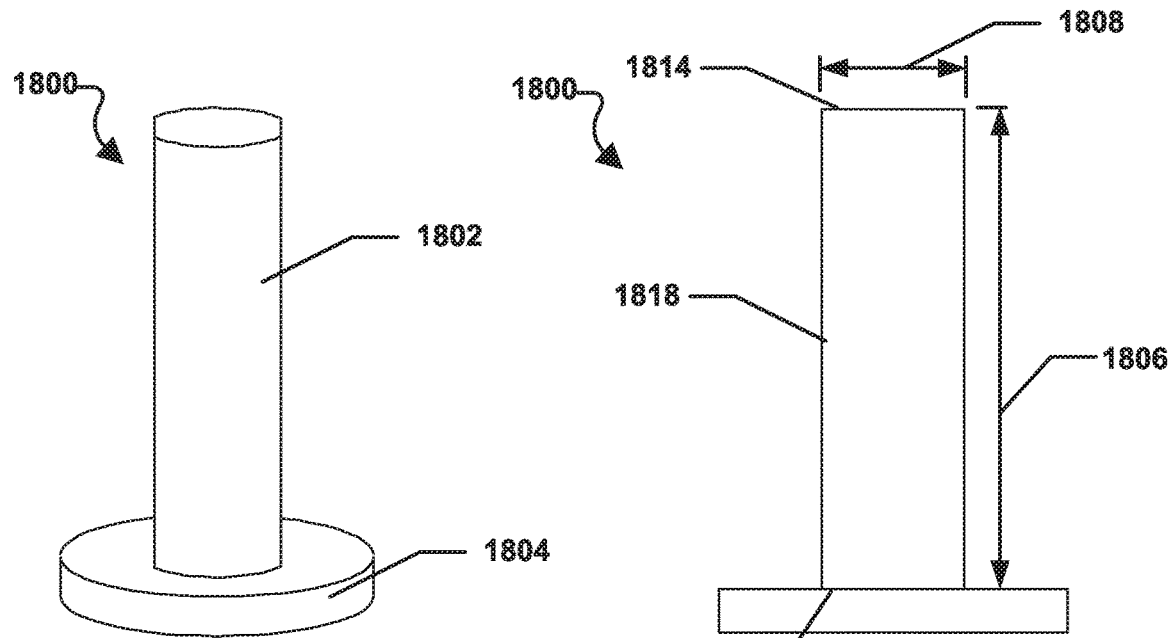
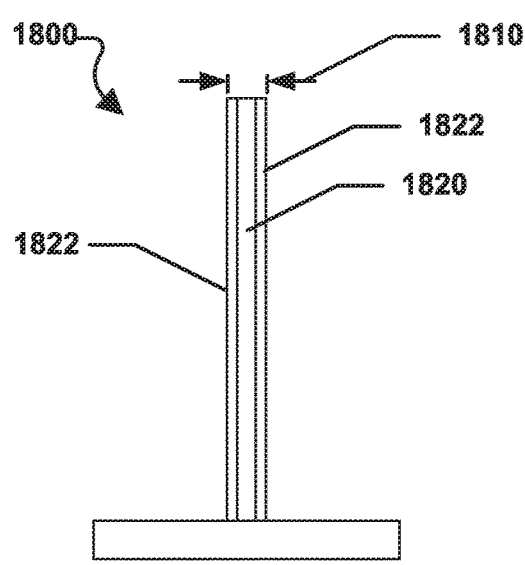
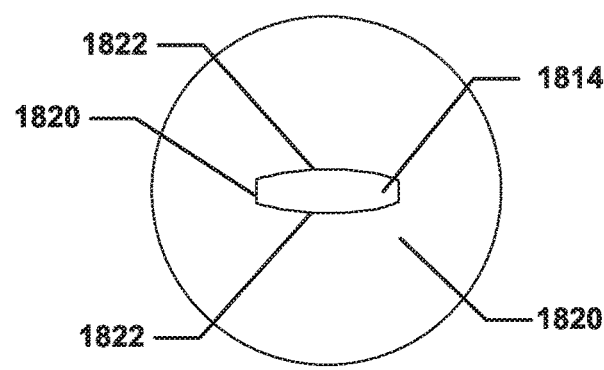
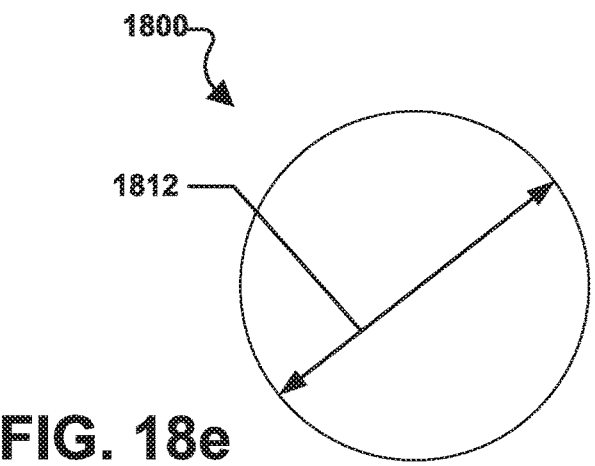
FIG. 18a
FIG. 18b
FIG. 18c
FIG. 18d
FIG. 18e

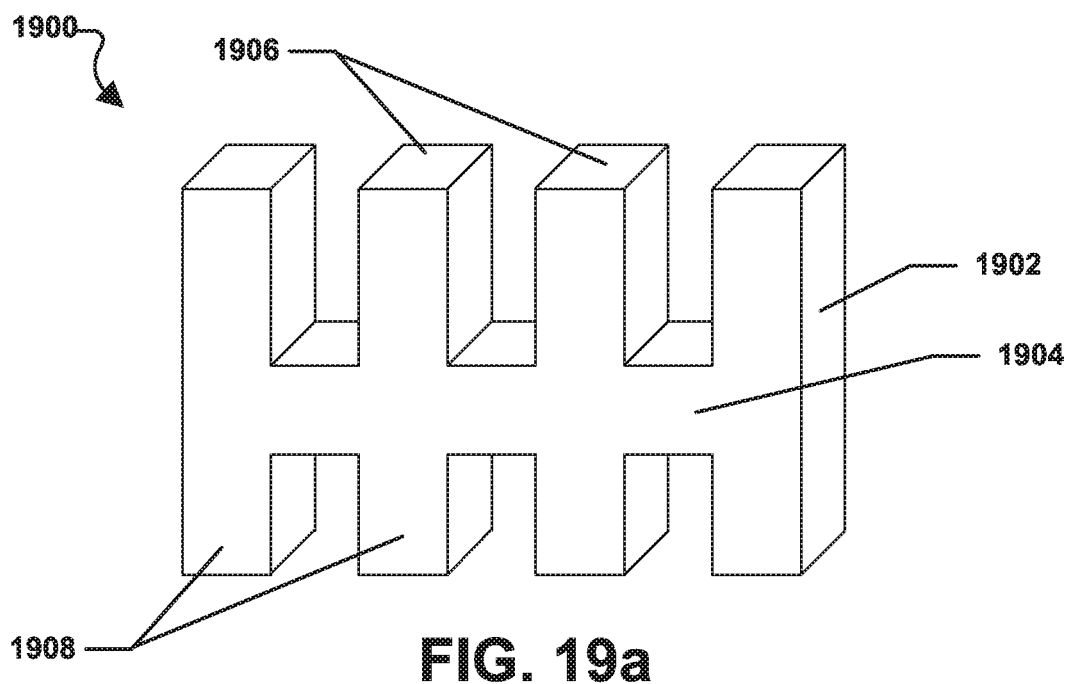
FIG. 19a
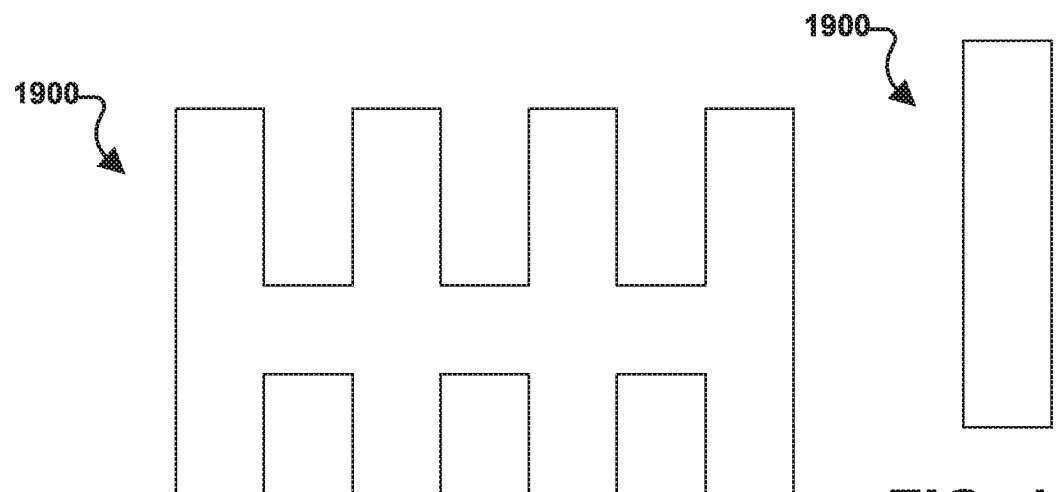
FIG. 19b
FIG. 19c
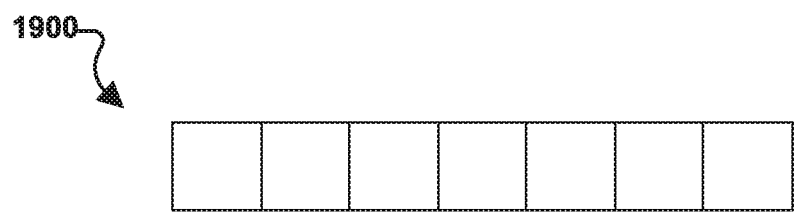
FIG. 19d

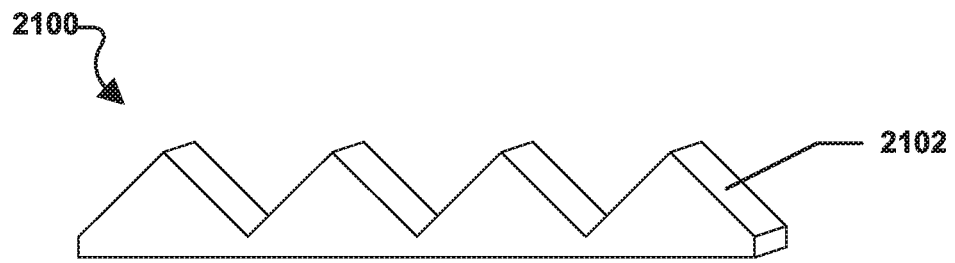
FIG. 21a
FIG. 21b
 
FIG. 21c  FIG. 21d
FIG. 21e

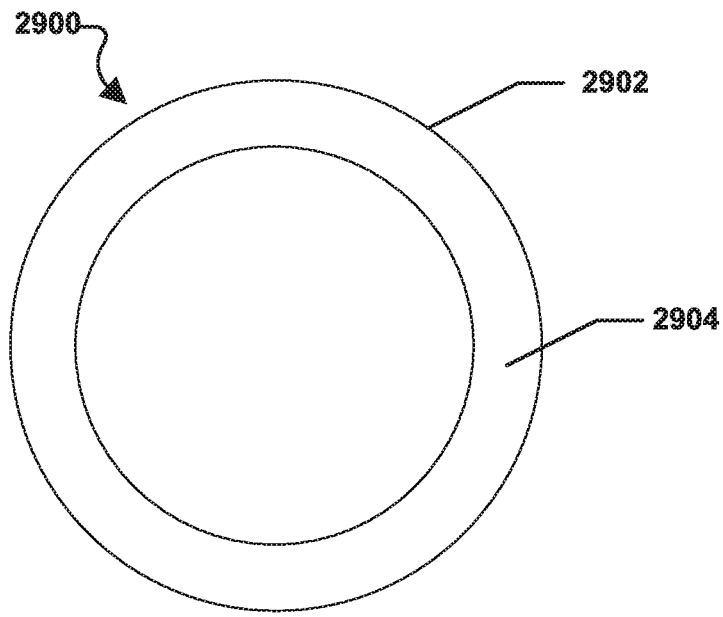
FIG. 29a
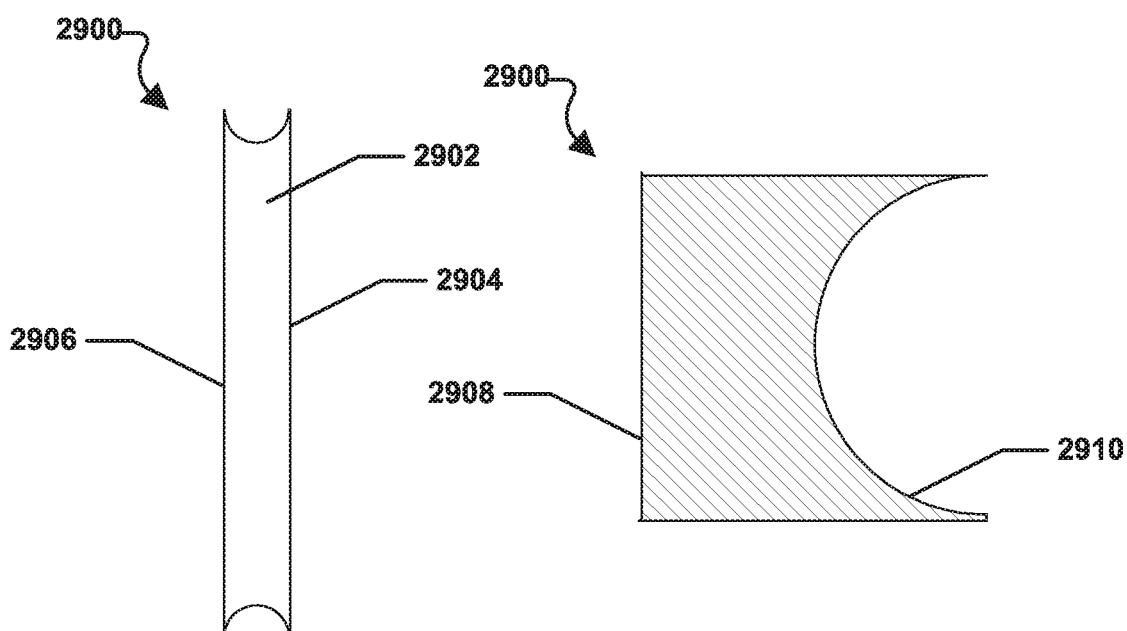
FIG. 29b
FIG. 29c

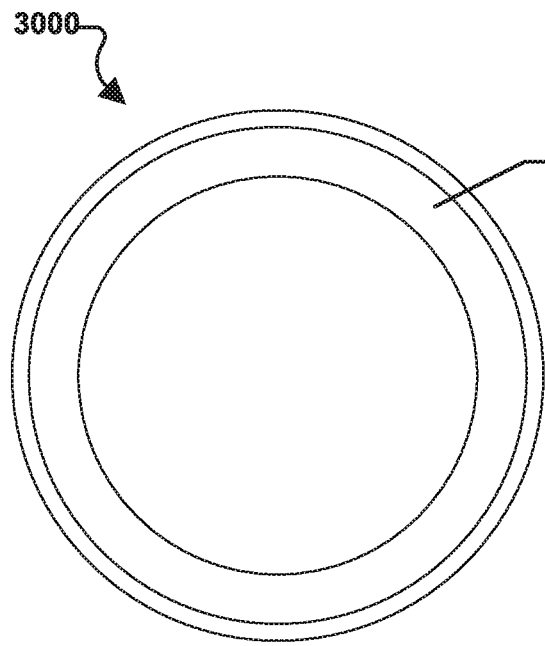
FIG. 30a
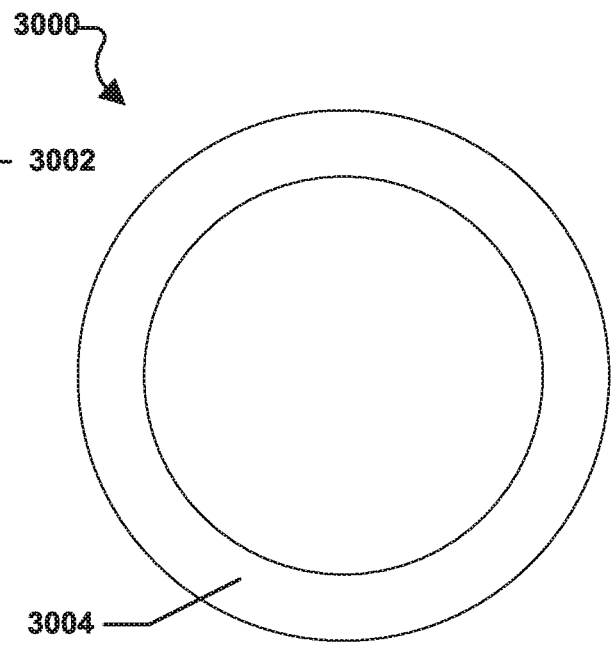
FIG. 30b
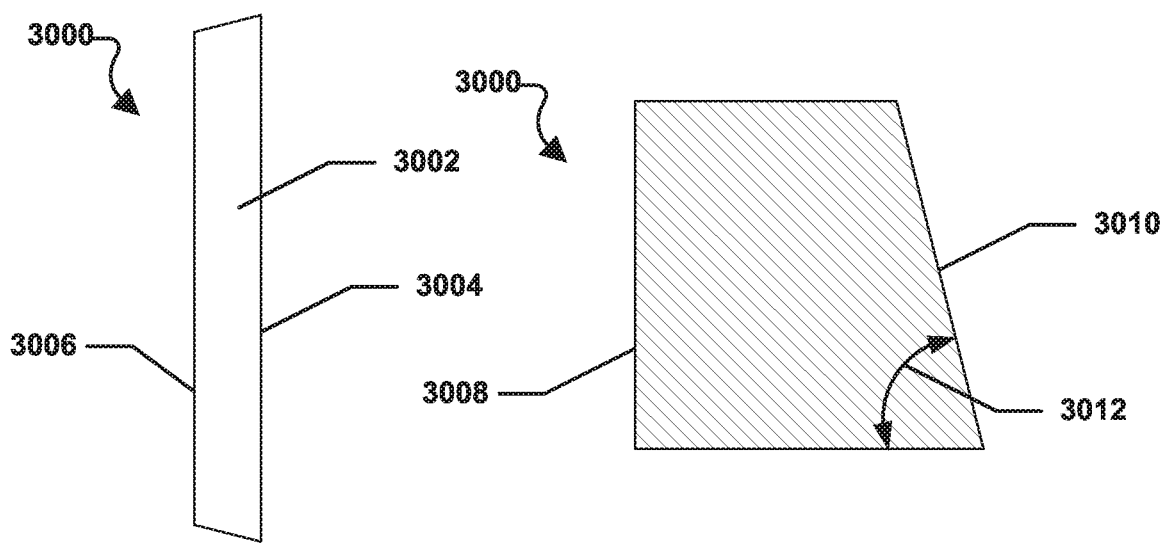
FIG. 30c
FIG. 30d

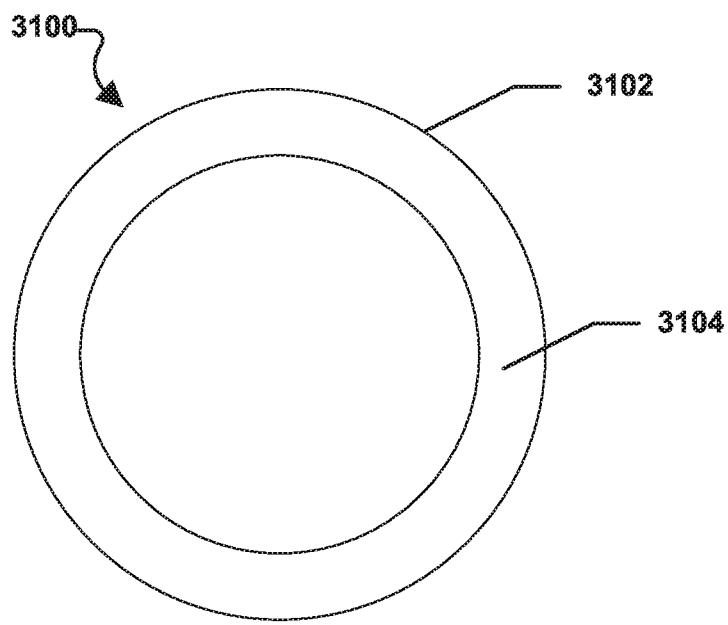
FIG. 31a
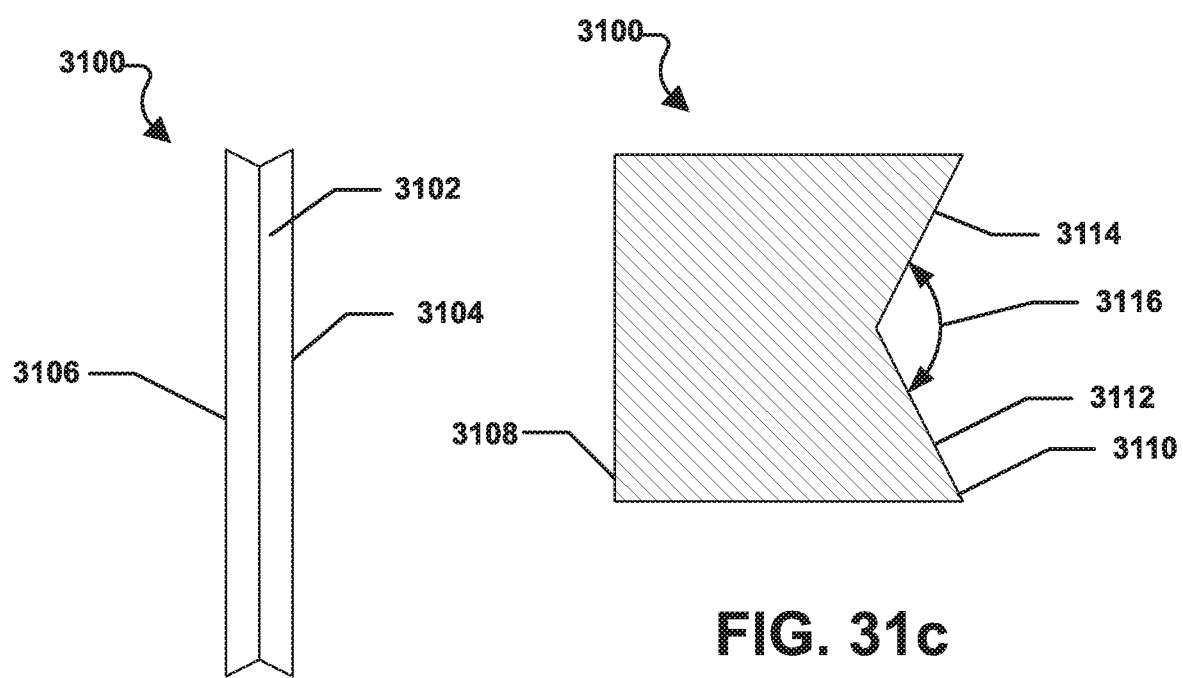
FIG. 31b
FIG. 31c

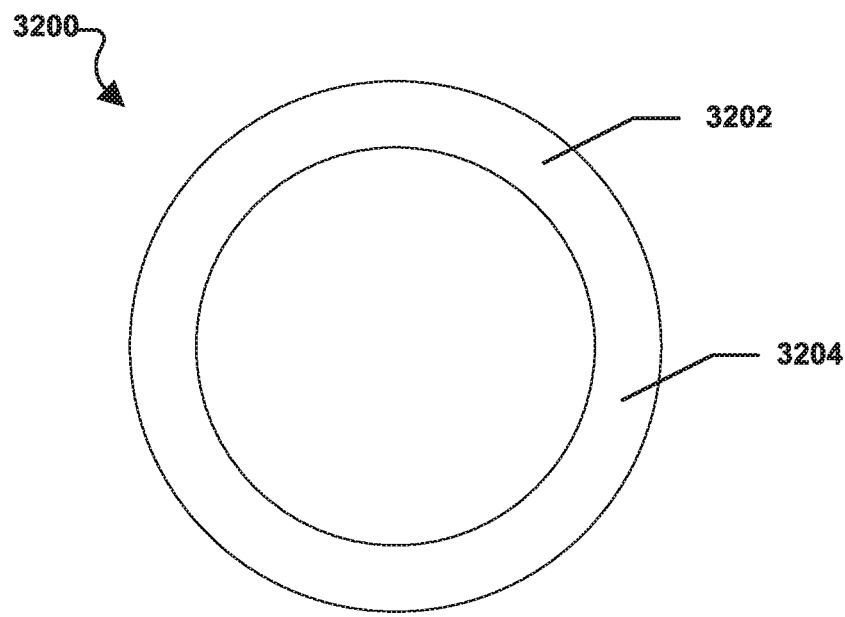
FIG. 32a
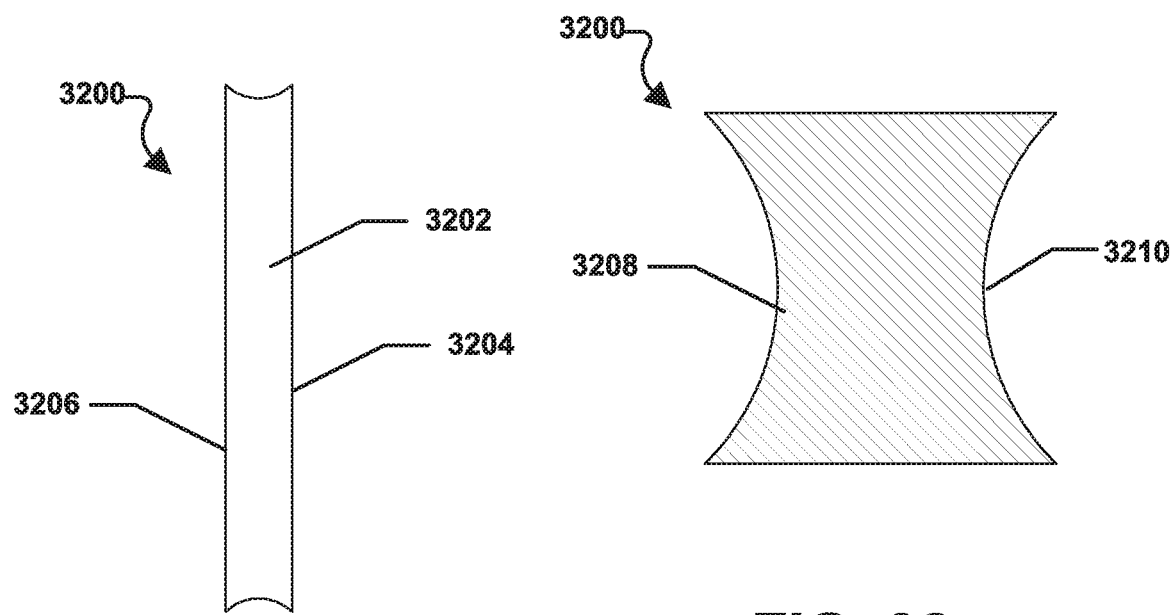
FIG. 32b
FIG. 32c

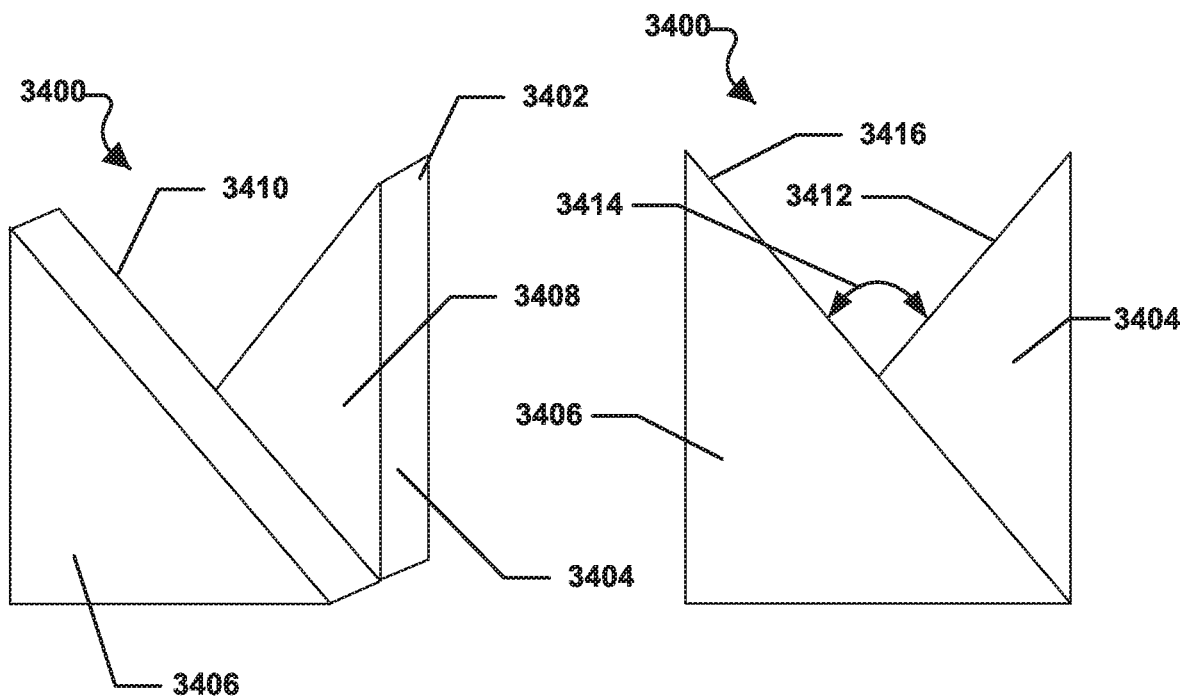
FIG. 34a
FIG. 34b
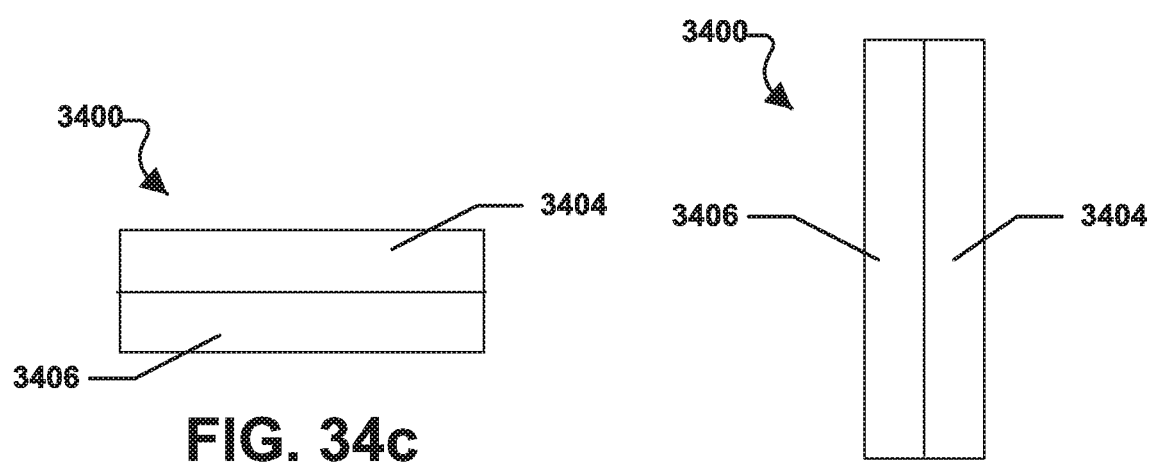
FIG. 34c
FIG. 34d

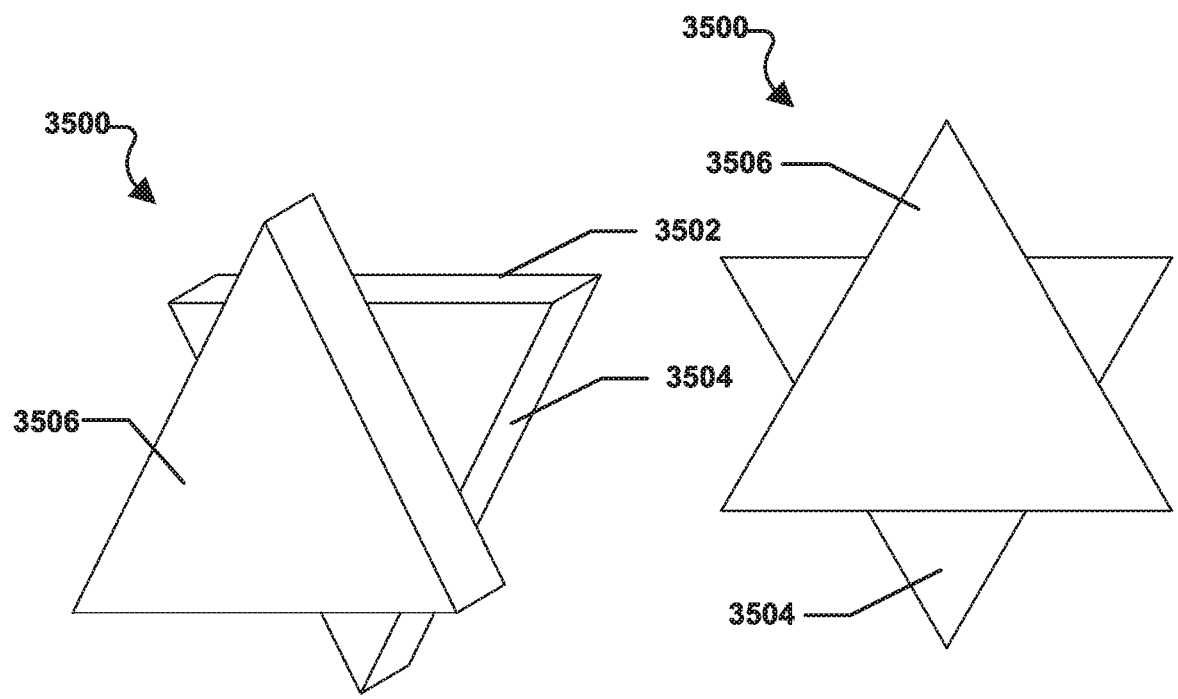
FIG. 35a
FIG. 35b
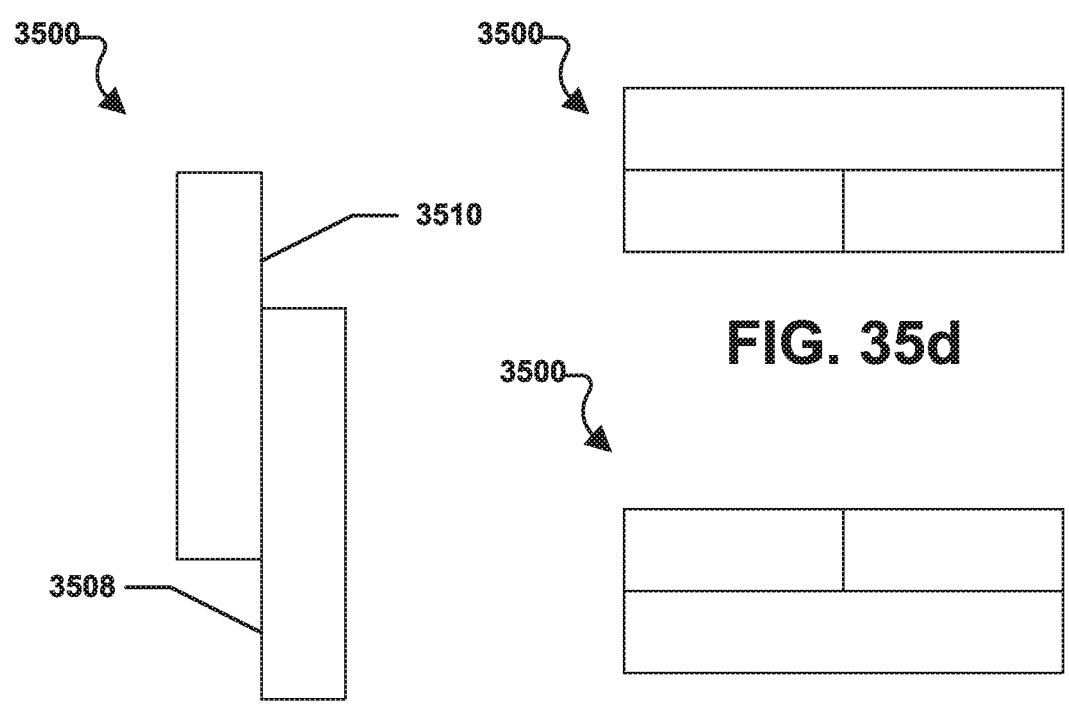
FIG. 35c
FIG. 35d
FIG. 35e

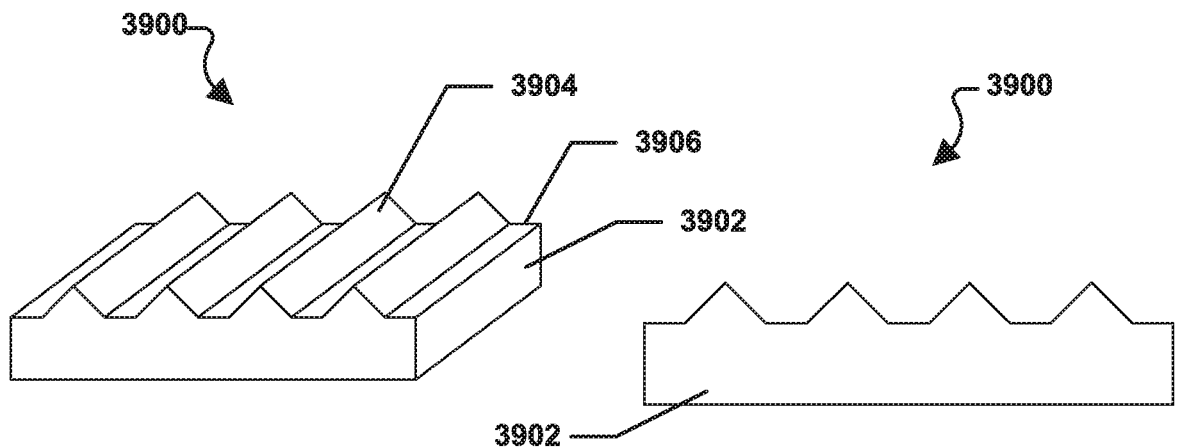
FIG. 36a
FIG. 36b
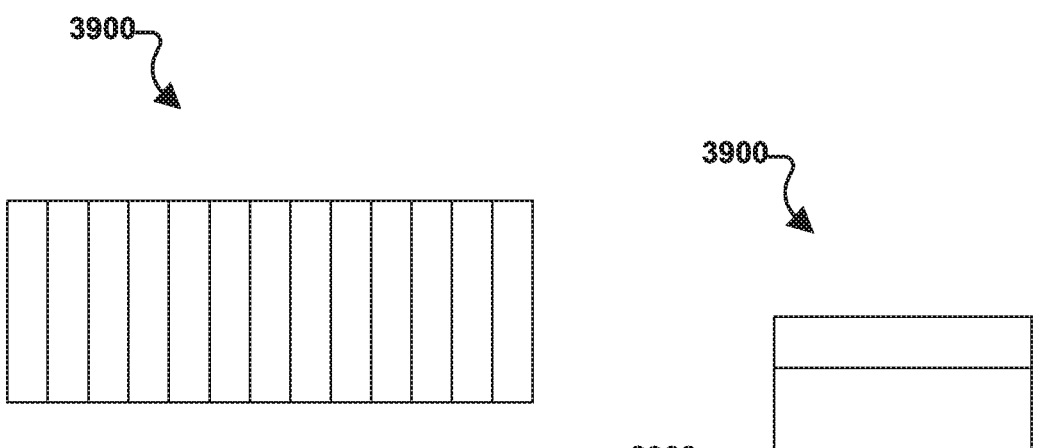
FIG. 36c
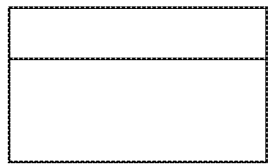
FIG. 36e
FIG. 36d

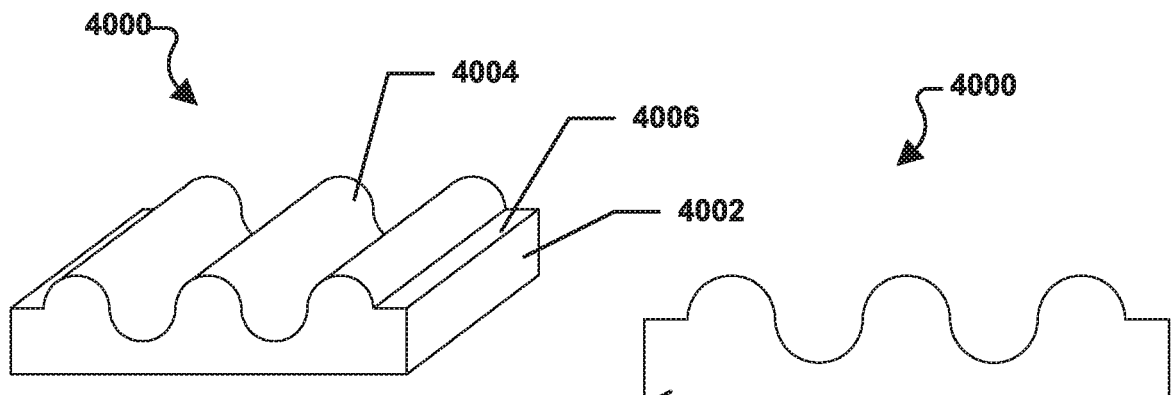
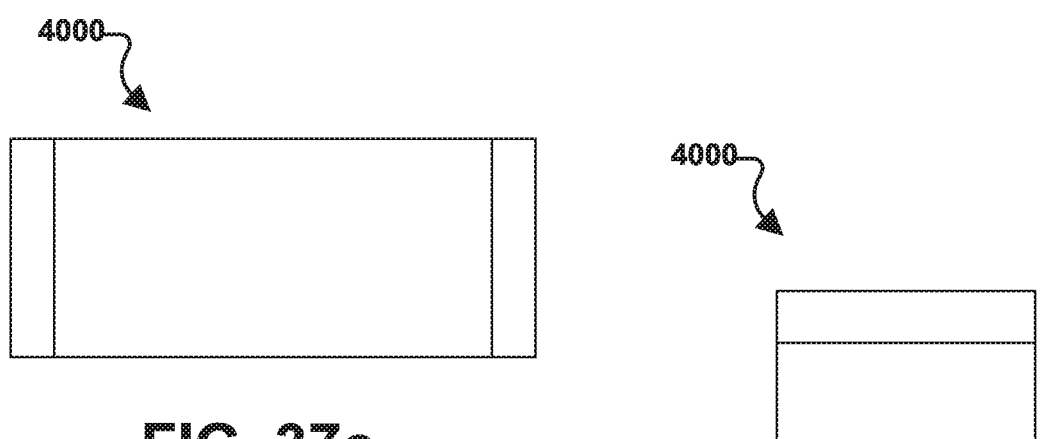
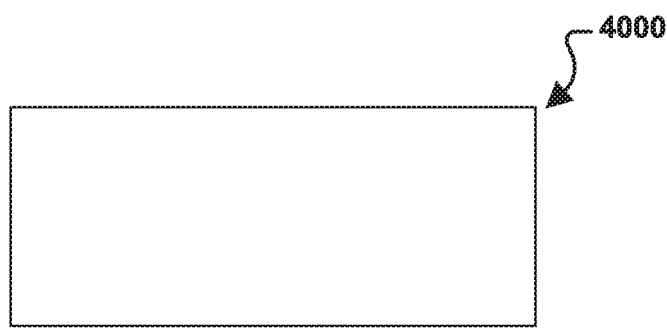

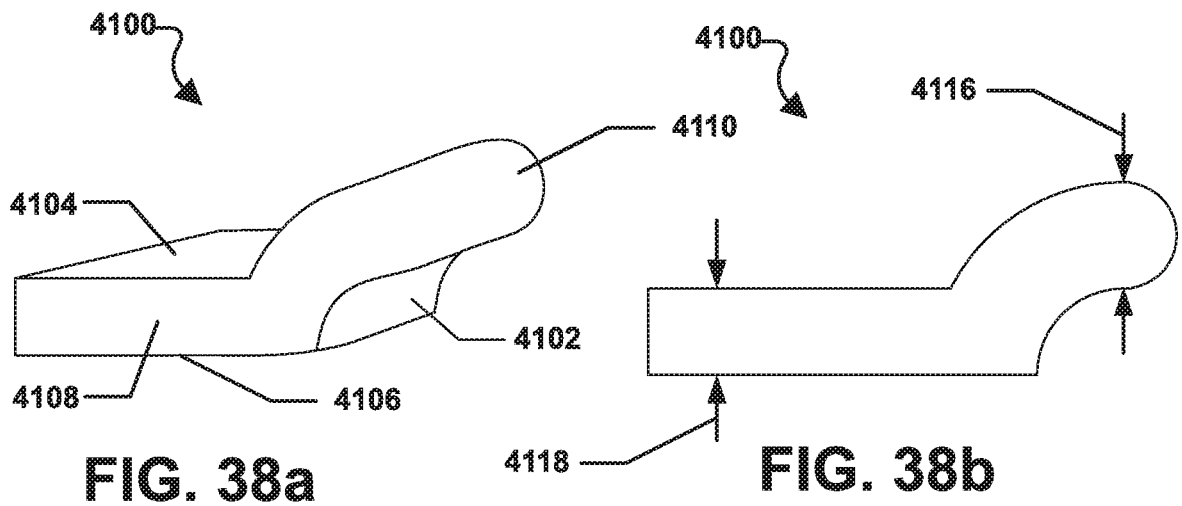
FIG. 38a  FIG. 38b
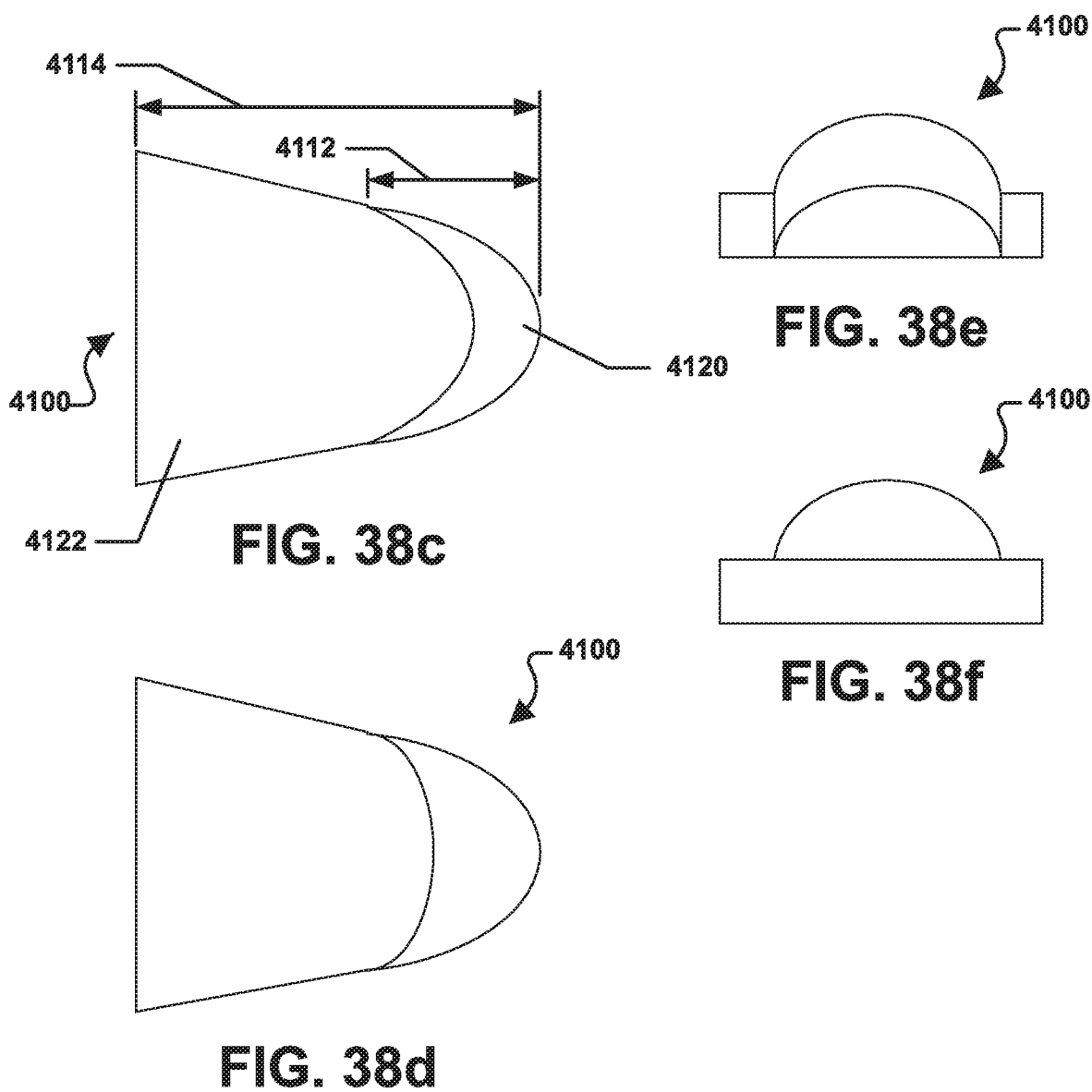
FIG. 38c  FIG. 38e
FIG. 38d  FIG. 38f

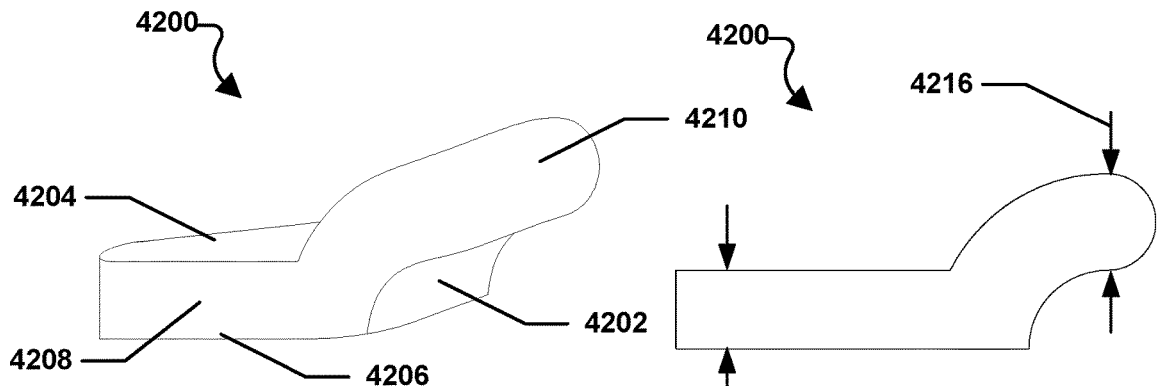
FIG. 39a
FIG. 39b
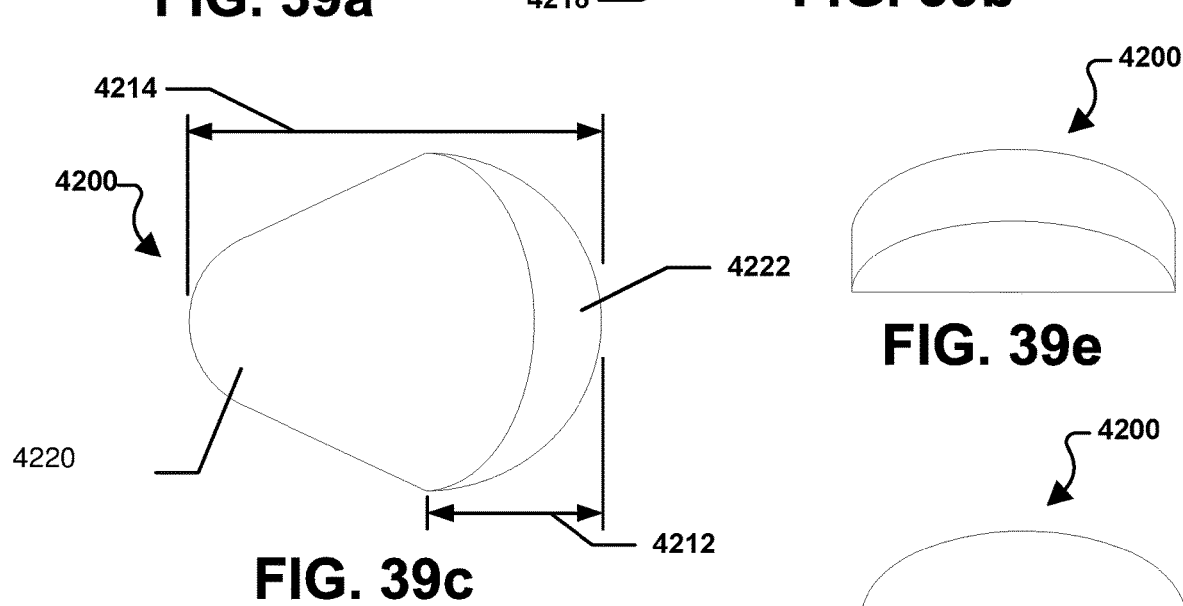
FIG. 39c
FIG. 39e
FIG. 39f
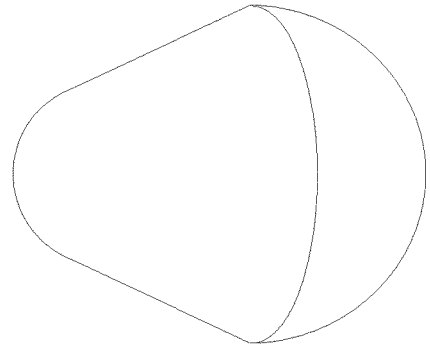
FIG. 39d

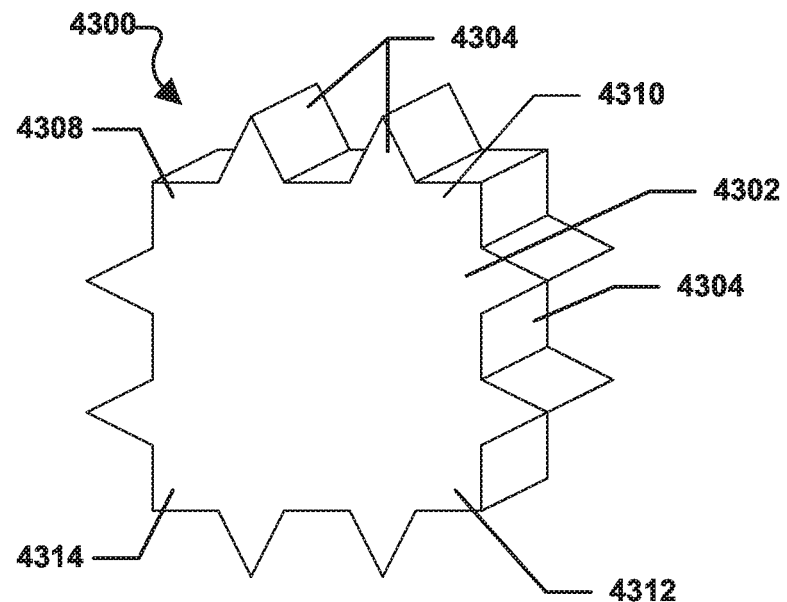
FIG. 40a
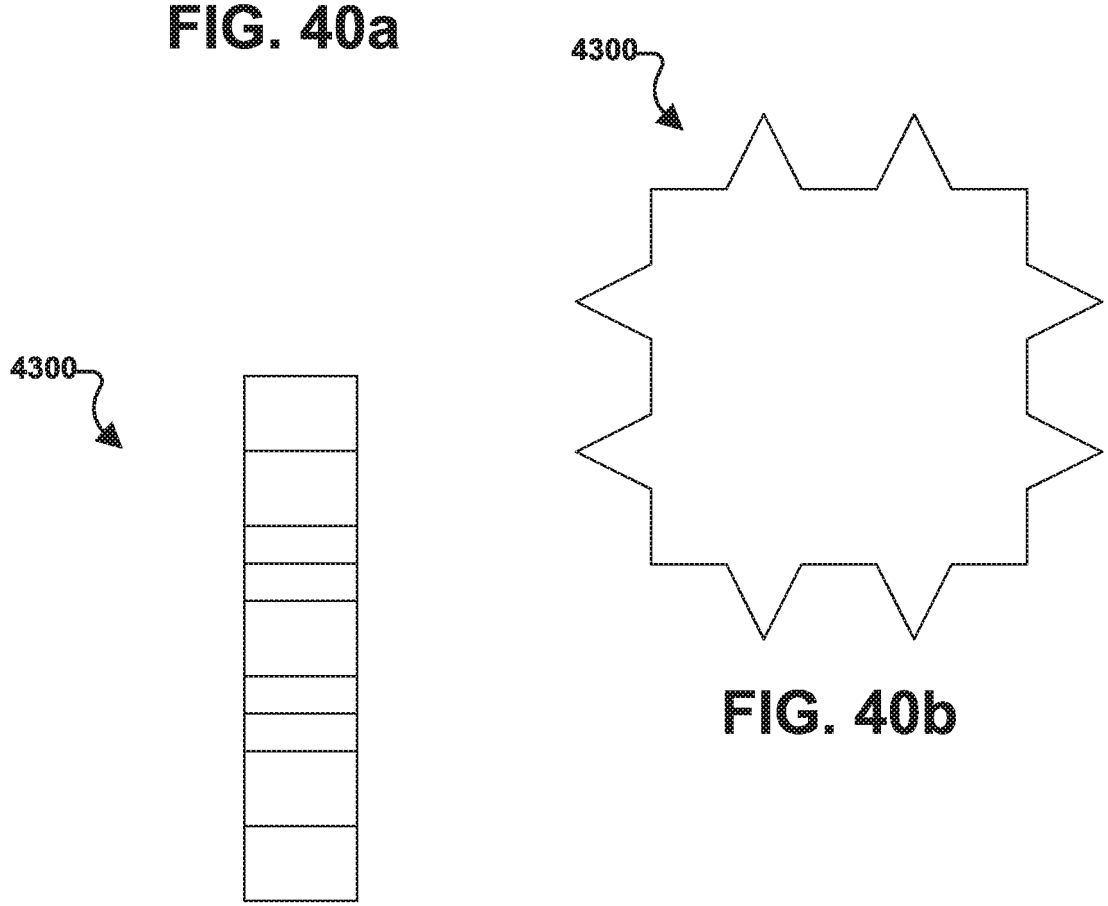
FIG. 40b
FIG. 40c

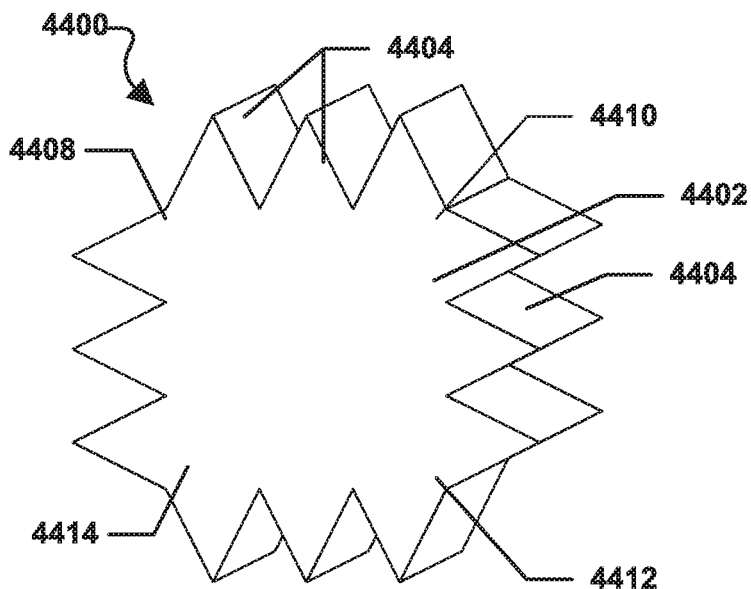
FIG. 41a
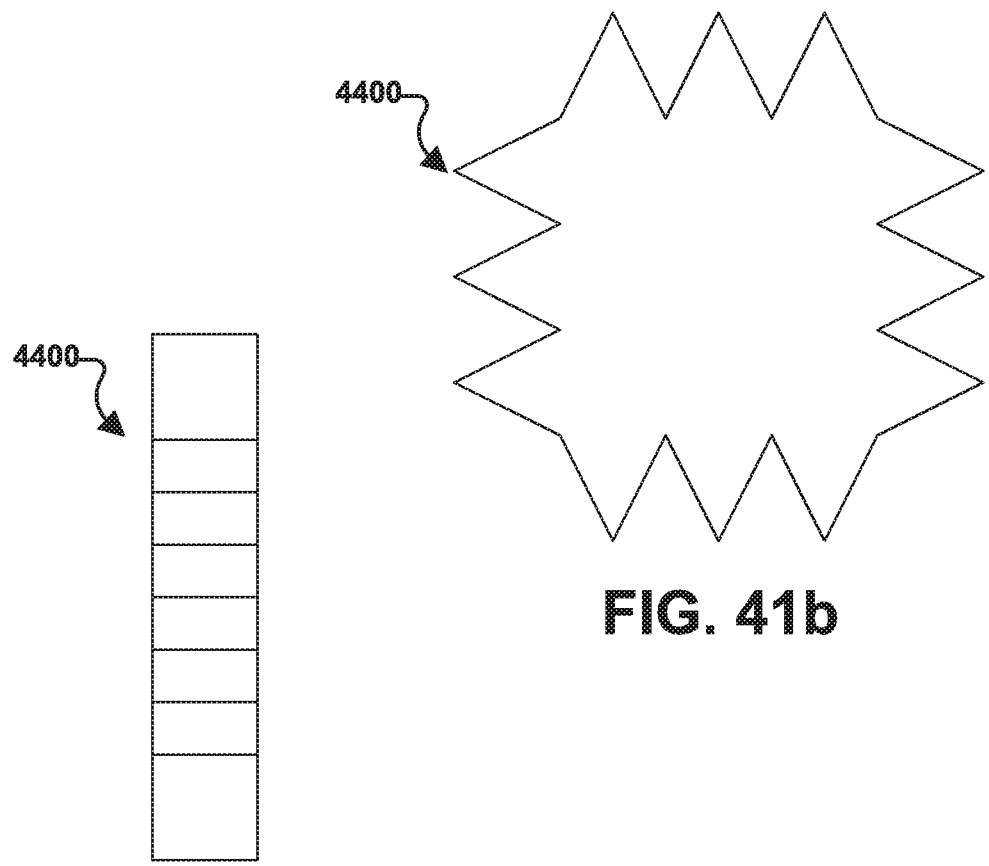
FIG. 41b
FIG. 41c

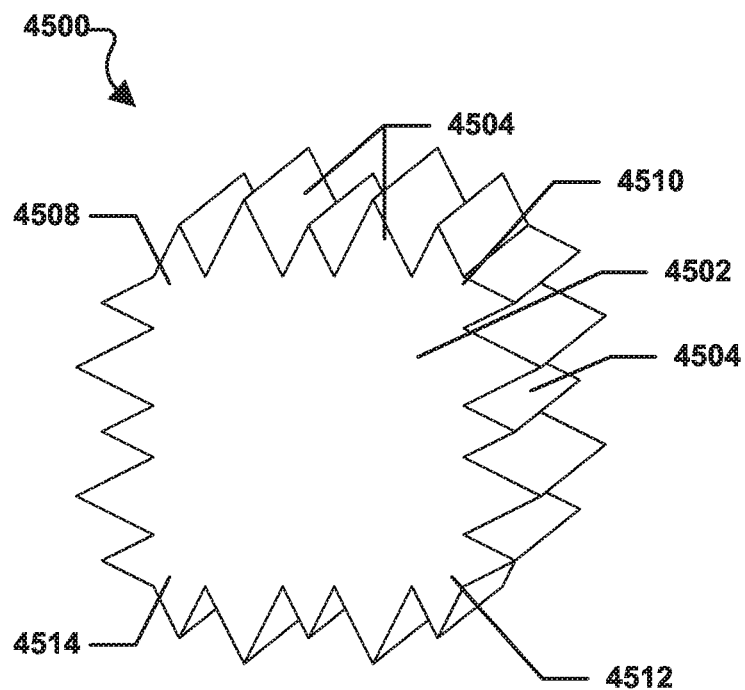
FIG. 42a
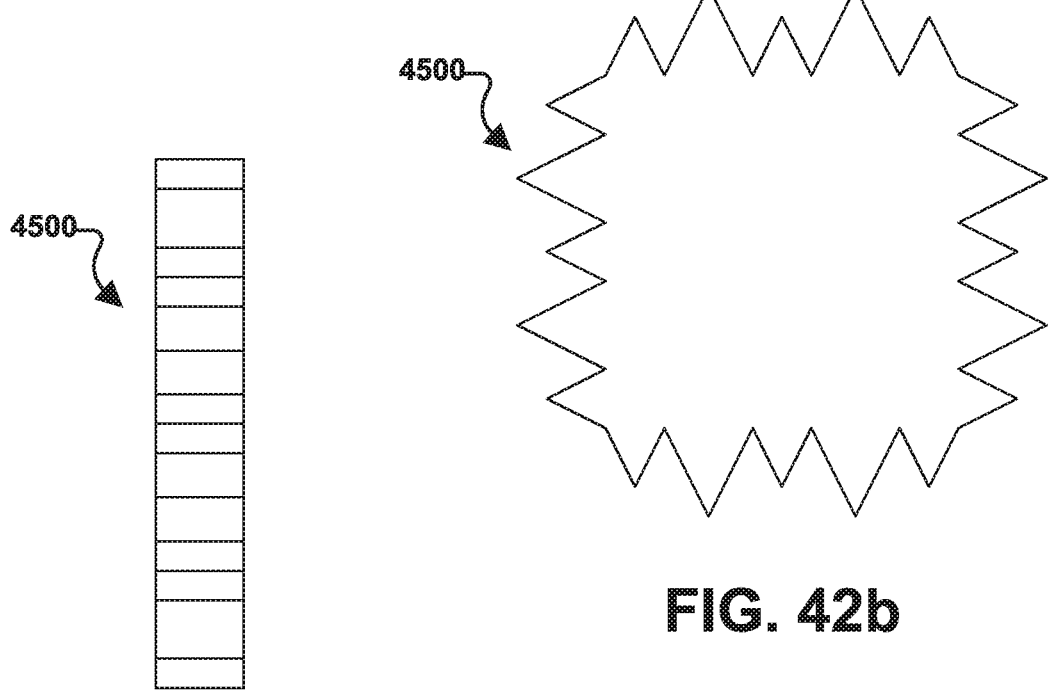
FIG. 42b
FIG. 42c

METHOD OF MAKING SHAPED ABRASIVE PARTICLES AND ARTICLES COMPRISING FORMING A FLANGE FROM OVERFILLING

CROSS-REFERENCE TO RELATED APPLICATION(S)

This application is a continuation of U.S. patent application Ser. No. 15/420,701, entitled "ABRASIVE ARTICLE INCLUDING SHAPED ABRASIVE PARTICLES," by Todd M. COTTER et al., filed Jan. 31, 2017, which is assigned to the current assignee hereof and incorporated herein by reference in its entirety.

BACKGROUND

Field of the Disclosure

The following is directed to abrasive articles, and particularly, abrasive articles including shaped abrasive particles.

Description of the Related Art

Abrasive particles and abrasive articles made from abrasive particles are useful for various material removal operations including grinding, finishing, and polishing. Depending upon the type of abrasive material, such abrasive particles can be useful in shaping or grinding a wide variety of materials and surfaces in the manufacturing of goods. Certain types of abrasive particles have been formulated to date that have particular geometries, such as triangular shaped abrasive particles and abrasive articles incorporating such objects. See, for example, U.S. Pat. Nos. 5,201,916; 5,366,523; and 5,984,988.

Three basic technologies that have been employed to produce abrasive particles having a specified shape are (1) fusion, (2) sintering, and (3) chemical ceramic. In the fusion process, abrasive particles can be shaped by a chill roll, the face of which may or may not be engraved, a mold into which molten material is poured, or a heat sink material immersed in an aluminum oxide melt. See, for example, U.S. Pat. No. 3,377,660 (disclosing a process including flowing molten abrasive material from a furnace onto a cool rotating casting cylinder, rapidly solidifying the material to form a thin semisolid curved sheet, densifying the semisolid material with a pressure roll, and then partially fracturing the strip of semisolid material by reversing its curvature by pulling it away from the cylinder with a rapidly driven cooled conveyor).

In the sintering process, abrasive particles can be formed from refractory powders having a particle size of up to 10 micrometers in diameter. Binders can be added to the powders along with a lubricant and a suitable solvent, e.g., water. The resulting mixture, mixtures, or slurries can be shaped into platelets or rods of various lengths and diameters. See, for example, U.S. Pat. No. 3,079,242 (disclosing a method of making abrasive particles from calcined bauxite material including (1) reducing the material to a fine powder, (2) compacting under affirmative pressure and forming the fine particles of said powder into grain sized agglomerations, and (3) sintering the agglomerations of particles at a temperature below the fusion temperature of the bauxite to induce limited recrystallization of the particles, whereby abrasive grains are produced directly to size).

Chemical ceramic technology involves converting a colloidal dispersion or hydrosol (sometimes called a sol), optionally in a mixture, with solutions of other metal oxide precursors, into a gel or any other physical state that restrains the mobility of the components, drying, and firing to obtain a ceramic material. See, for example, U.S. Pat. Nos. 4,744,802 and 4,848,041. Other relevant disclosures on shaped abrasive particles and associated methods of forming and abrasive articles incorporating such particles are available at: abel-ip.com/publications/.

Still, there remains a need in the industry for improving performance, life, and efficacy of abrasive particles, and the abrasive articles that employ abrasive particles.

SUMMARY

According to a first aspect, a shaped abrasive particle includes a body including a first surface, a second surface, a side surface extending between the first surface and second surface, and a flange portion extending from the side surface and the first major surface.

In another aspect, a shaped abrasive particle includes a body including a first surface, a second surface, and a side surface, wherein the body includes a gear-shaped two-dimensional shape including a plurality of teeth extending peripherally from the side surface of the body.

In another aspect, a shaped abrasive particle includes a body including a first surface, a second surface, and a side surface extending between a first surface and the second surface, wherein the first surface includes raised portions extending from exterior corners of the body along the first surface and joining in a center region of the first surface.

In another aspect, a shaped abrasive particle includes a body defining a partial-ellipsoid shape, the body including a first surface, a second surface, and a third surface extending between a portion of the first major surface and the second major surface, wherein at least a portion of the first surface and a portion of the second surface are connected to each other along a first edge and wherein a portion of the first surface and a portion of the third surface are connected to each other and define a second edge, and wherein a portion of the second surface and a portion of the third surface are connected to each other and define a third edge.

In another aspect, a shaped abrasive particle includes a body having a conical or frustoconical shape, wherein a surface of the body includes a plurality of protrusions extending in a spiral pathway.

In another aspect, a shaped abrasive particle includes a body defining a fin-shape, wherein the body includes a length, a width and a thickness and wherein the body includes a rectangular cross-sectional shape in the plane defined by the length and width and an elliptical cross-sectional shape in the plane defined by the width and thickness, and wherein the aspect ratio of width-to-thickness (w:t) is at least 2:1.

In another aspect, a shaped abrasive particle includes a rake-shaped body including a first group of projections extending from a central region of the body in a first direction and a second group of projections extending from the central region the body in a second direction, and wherein the first group of projections have a length (Lp1) that is different compared to a length (Lp2) of the second group of projections.

In another aspect, a shaped abrasive particle includes a body including a first surface, a second surface, and a side surface, wherein the body includes at least four distinct side surface portions separated by at least four exterior corners, and wherein at least one side surface portion includes a concave contour and wherein the particle includes a curved shape, wherein the first surface includes a substantially concave curvature and the second surface includes a substantially convex curvature.

In another aspect, a shaped abrasive particle includes a toothed body including a plurality of teeth extending from one side of the body, wherein the plurality of teeth define external corners of the body having an average spacing of less than 0.5(L), wherein L defines the length of the body.

In another aspect, a shaped abrasive agglomerate includes a body including a plurality of shaped abrasive particle portions bonded to each other to form the body of the shaped abrasive particle.

In another aspect, a shaped abrasive particle includes a body including at least a first surface, a second surface, a third surface, and a fourth surface, wherein each of the first, second, third, and fourth surfaces contact at least one of the other first, second, third, and fourth surfaces along at least one edge of the body, and wherein the first surface includes a concave contour.

In another aspect, a method of making a ceramic body includes creating a layer of material from a mixture including a precursor ceramic material; altering the surface of the layer with a gaseous or liquid material to create a pattern in an upper surface of the layer; and forming the layer into abrasive particles, wherein at least a portion of the abrasive particles includes a surface including at least a portion of the pattern created in the upper surface of the layer.

In another aspect, a method of forming a shaped abrasive particle includes placing a mixture including a ceramic precursor material into a production tool including a plurality of openings, wherein placing the mixture includes partially filling a majority of the openings of the plurality of openings.

In another aspect, a shaped abrasive particle includes a body including a plurality of discrete micro-voids distributed throughout the body, wherein the discrete micro-voids include a liquid or gas material.

In another aspect, a method of making shaped abrasive particles includes translating a production tool having openings over rollers and through a deposition zone configured to deposit a mixture into the openings, wherein in the deposition zone the production tool is translated over a primary roller having a greater diameter compared to any other rollers in contact with the production tool.

In another aspect, a shaped abrasive particle includes a multi-flanged body including a first shaped abrasive portion bonded to another shaped abrasive portion to form the body including at least two different flanges, and wherein the different flanges extend in different planes with respect to each other.

In another aspect, a shaped abrasive particle includes an annular body including a first surface, second surface, a third surface extending between the first surface and second surface, wherein the annular body includes a rounded contour, a central opening extend through the body, and wherein at least a portion of the first surface includes a non-planar contour.

BRIEF DESCRIPTION OF THE DRAWINGS

The present disclosure may be better understood, and its numerous features and advantages made apparent to those skilled in the art by referencing the accompanying drawings.

FIGS. 18a-18e include a shaped abrasive particle in accordance with an embodiment.

FIGS. 19a-19d include a shaped abrasive particle in accordance with an embodiment.

FIGS. 21a-21e include a shaped abrasive particle in accordance with an embodiment.

FIGS. 29a-29c include a shaped abrasive particle in accordance with an embodiment.

FIGS. 30a-30d include a shaped abrasive particle in accordance with an embodiment.

FIGS. 31a-31c include a shaped abrasive particle in accordance with an embodiment.

FIGS. 32a-32c include a shaped abrasive particle in accordance with an embodiment.

FIGS. 34a-34d include a shaped abrasive particle in accordance with an embodiment.

FIGS. 35a-35e include a shaped abrasive particle in accordance with an embodiment.

FIGS. 36a-36e include a shaped abrasive particle in accordance with an embodiment.

FIGS. 37a-37e include a shaped abrasive particle in accordance with an embodiment.

FIGS. 38a-38f include a shaped abrasive particle in accordance with an embodiment.

FIGS. 39a-39f include a shaped abrasive particle in accordance with an embodiment.

FIGS. 40a-40c include a shaped abrasive particle in accordance with an embodiment.

FIGS. 41a-41c include a shaped abrasive particle in accordance with an embodiment.

FIGS. 42a-42c include a shaped abrasive particle in accordance with an embodiment.

DETAILED DESCRIPTION

The following is directed to abrasive articles including shaped abrasive particles. The methods herein may be utilized in forming shaped abrasive particles and using abrasive articles incorporating shaped abrasive particles. The shaped abrasive particles may be utilized in various applications, including for example fixed abrasive articles, such as coated abrasives, bonded abrasives, non-woven abrasive materials and the like. Alternatively, the shaped abrasive particles may be used in free abrasives. Various other uses may be derived for the shaped abrasive particles.

Methods for Making Shaped Abrasive Particles

Various methods may be utilized to obtain shaped abrasive particles. Some suitable processes used to fabricate the shaped abrasive particles can include, but is not limited to, depositing, printing (e.g., screen-printing), molding, pressing, casting, sectioning, cutting, dicing, punching, drying, curing, coating, extruding, rolling, and a combination thereof.

Shaped abrasive particles are formed such that each particle has substantially the same arrangement of surfaces and edges relative to each other for shaped abrasive particles having the same two-dimensional and three-dimensional shapes. As such, shaped abrasive particles can have a high shape fidelity and consistency in the arrangement of the surfaces and edges relative to other shaped abrasive particles of the same group having the same two-dimensional and three-dimensional shape. By contrast, non-shaped abrasive particles can be formed through different process and have different shape attributes. For example, non-shaped abrasive particles are typically formed by a comminution process, wherein a mass of material is formed and then crushed and sieved to obtain abrasive particles of a certain size. However, a non-shaped abrasive particle will have a generally random arrangement of the surfaces and edges, and generally will lack any recognizable two-dimensional or three dimensional shape in the arrangement of the surfaces and edges around the body. Moreover, non-shaped abrasive particles of the same group or batch generally lack a consistent shape with respect to each other, such that the surfaces and edges are randomly arranged when compared to each other. Therefore, non-shaped grains or crushed grains have a significantly lower shape fidelity compared to shaped abrasive particles.

Figure 1:
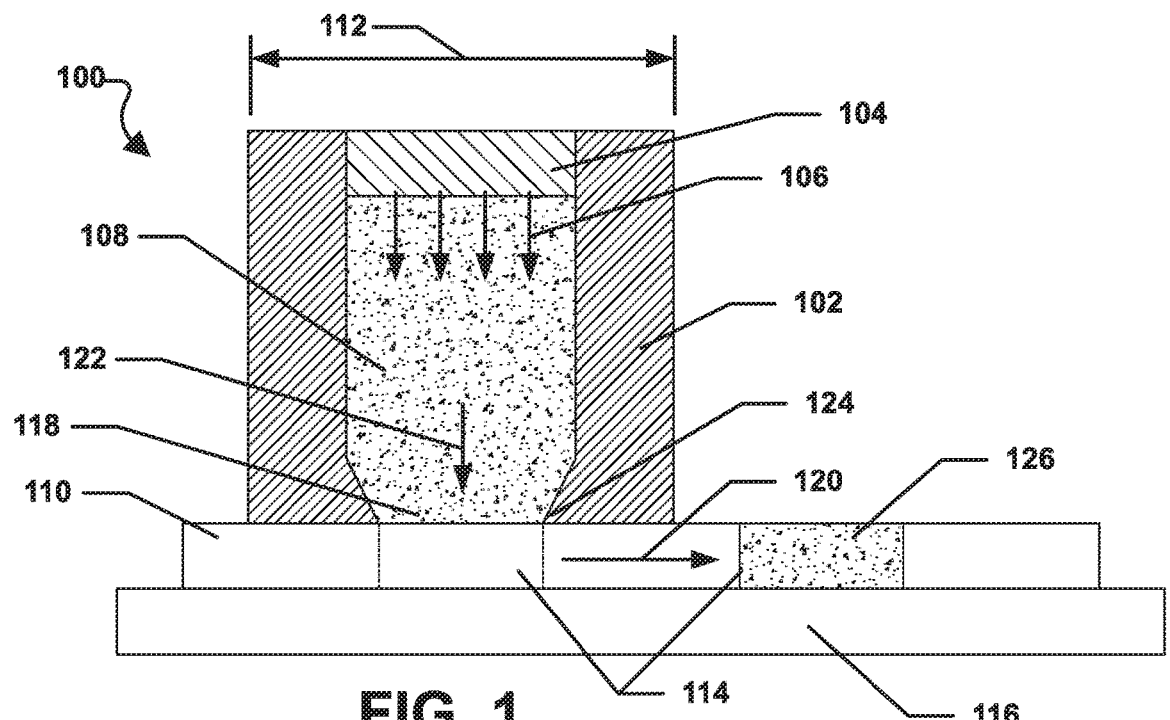
FIG. 1 includes a portion of a system for forming a particulate material in accordance with an embodiment.
Figure 2A:
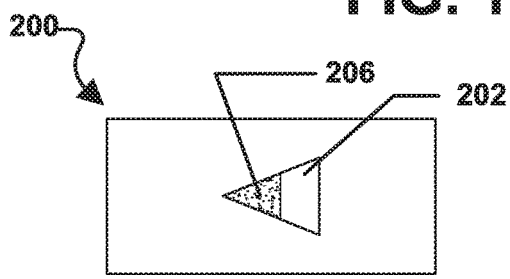
FIGS. 2a-2b include a portion of a screen for forming a particulate material in accordance with an embodiment.
Figure 2B:
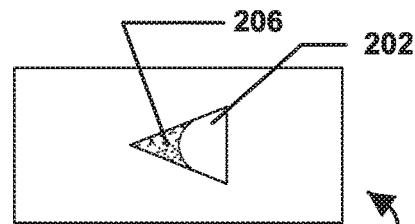
Figure 3A:
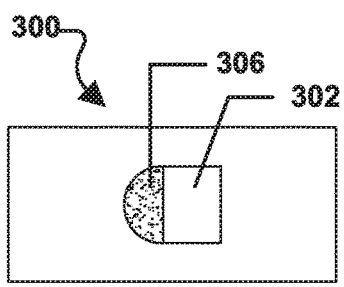
FIGS. 3a-3c include a portion of a screen for forming a particulate material in accordance with an embodiment.
Figure 3B:
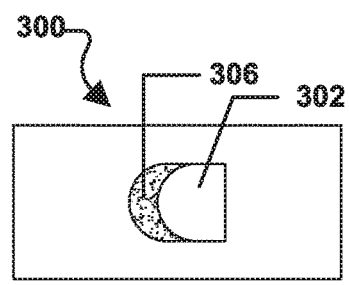
Figure 3C:
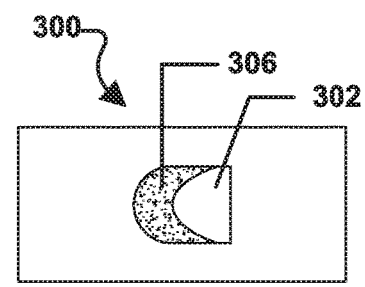
Figure 4:
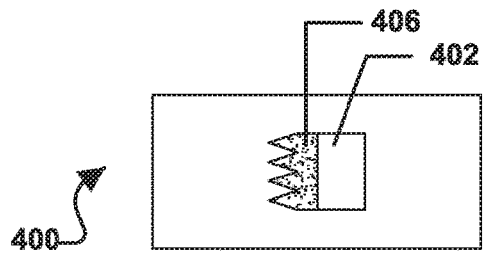
FIG. 4 includes a portion of a screen for forming a particulate material in accordance with an embodiment.

FIG. 1 includes an illustration of a system 100 for forming a shaped abrasive particle in accordance with one, non-limiting embodiment. As shown, the system 100 may include a die 102 in which a piston 104 may move in order to apply a force 106 onto a mixture 108 within the die 102. The resulting pressure of the force 106 may extrude the mixture 108 into a tool 110 within an application zone 112. The mixture 108 may be extruded into one or more tool cavities 114 formed within the tool 110. Further, the tool 110 may be supported by a backing plate 116. In a particular aspect, the backing plate 116 may be constructed from a low friction material, e.g., polytetrafluoroethylene (PTFE). In another aspect, it may be made of a metal or metal alloy.

The process of forming shaped abrasive particles can be initiated by forming a mixture 108 including a ceramic material and a liquid. In particular, the mixture 108 can be a gel formed of a ceramic powder material and a liquid. In accordance with an embodiment, the gel can be formed of the ceramic powder material as an integrated network of discrete particles.

The mixture 108 may contain a certain content of solid material, liquid material, and additives such that it has suitable rheological characteristics for use with the process detailed herein. That is, in certain instances, the mixture can have a certain viscosity, and more particularly, suitable rheological characteristics that form a dimensionally stable phase of material that can be formed through the process as noted herein. A dimensionally stable phase of material is a material that can be formed to have a particular shape and substantially maintain the shape for at least a portion of the processing subsequent to forming. In certain instances, the shape may be retained throughout subsequent processing, such that the shape initially provided in the forming process is present in the finally-formed object. It will be appreciated that in some instances, the mixture 108 may not be a shape-stable material, and the process may rely upon solidification and stabilization of the mixture 108 by further processing, such as drying.

The mixture 108 can be formed to have a particular content of solid material, such as the ceramic powder material. For example, in one embodiment, the mixture 108 can have a solids content of at least about 25 wt %, such as at least about 35 wt %, or even at least about 38 wt % for the total weight of the mixture 108. Still, in at least one non-limiting embodiment, the solids content of the mixture 108 can be not greater than about 75 wt %, such as not greater than about 70 wt %, not greater than about 65 wt %, not greater than about 55 wt %, not greater than about 45 wt %, or not greater than about 42 wt %. It will be appreciated that the content of the solids materials in the mixture 108 can be within a range between any of the minimum and maximum percentages noted above.

According to one embodiment, the ceramic powder material can include an oxide, a nitride, a carbide, a boride, an oxycarbide, an oxynitride, and a combination thereof. In particular instances, the ceramic material can include alumina. More specifically, the ceramic material may include a boehmite material, which may be a precursor of alpha alumina. The term "boehmite" is generally used herein to denote alumina hydrates including mineral boehmite, typically being $Al_2O_3 \cdot H_2O$ and having a water content on the order of 15%, as well as pseudoboehmite, having a water content higher than 15%, such as 20-38% by weight. It is noted that boehmite (including pseudoboehmite) has a particular and identifiable crystal structure, and therefore a unique X-ray diffraction pattern. As such, boehmite is distinguished from other aluminous materials including other hydrated aluminas such as ATH (aluminum trihydroxide), a common precursor material used herein for the fabrication of boehmite particulate materials.

Furthermore, the mixture 108 can be formed to have a particular content of liquid material. Some suitable liquids may include water. In accordance with one embodiment, the mixture 108 can be formed to have a liquid content less than the solids content of the mixture 108. In more particular instances, the mixture 108 can have a liquid content of at least about 25 wt % for the total weight of the mixture 108. In other instances, the amount of liquid within the mixture 108 can be greater, such as at least about 35 wt %, at least about 45 wt %, at least about 50 wt %, or even at least about 58 wt %. Still, in at least one non-limiting embodiment, the liquid content of the mixture can be not greater than about 75 wt %, such as not greater than about 70 wt %, not greater than about 65 wt %, not greater than about 62 wt %, or even not greater than about 60 wt %. It will be appreciated that the content of the liquid in the mixture 108 can be within a range between any of the minimum and maximum percentages noted above.

Furthermore, to facilitate processing and forming shaped abrasive particles according to embodiments herein, the mixture 108 can have a particular storage modulus. For example, the mixture 108 can have a storage modulus of at least about $1 \times 10^4$ Pa, such as at least about $4 \times 10^4$ Pa, or even at least about $5 \times 10^4$ Pa. However, in at least one non-limiting embodiment, the mixture 108 may have a storage modulus of not greater than about $1 \times 10^7$ Pa, such as not greater than about $2 \times 10^6$ Pa. It will be appreciated that the storage modulus of the mixture 108 can be within a range between any of the minimum and maximum values noted above.

The storage modulus can be measured via a parallel plate system using ARES or AR-G2 rotational rheometers, with Peltier plate temperature control systems. For testing, the mixture 108 can be extruded within a gap between two plates that are set to be approximately 8 mm apart from each other. After extruding the gel into the gap, the distance between the two plates defining the gap is reduced to 2 mm until the mixture 108 completely fills the gap between the plates. After wiping away excess mixture, the gap is decreased by 0.1 mm and the test is initiated. The test is an oscillation strain sweep test conducted with instrument settings of a strain range between 0.01% to 100%, at 6.28 rad/s (1 Hz), using 25-mm parallel plate and recording 10 points per decade. Within 1 hour after the test completes, the gap is lowered again by 0.1 mm and the test is repeated. The test can be repeated at least 6 times. The first test may differ from the second and third tests. Only the results from the second and third tests for each specimen should be reported.

Furthermore, to facilitate processing and forming shaped abrasive particles according to embodiments herein, the mixture 108 can have a particular viscosity. For example, the mixture 108 can have a viscosity of at least about $2 \times 10^3$ Pa s, such as at least about $3 \times 10^3$ Pa s, at least about $4 \times 10^3$ Pa s, at least about $5 \times 10^3$ Pa s, at least about $6 \times 10^3$ Pa s, at least about $8 \times 10^3$ Pa s, at least about $10 \times 10^3$ Pa s, at least about $20 \times 10^3$ Pa s, at least about $30 \times 10^3$ Pa s, at least about $40 \times 10^3$ Pa s, at least about $50 \times 10^3$ Pa s, at least about $60 \times 10^3$ Pa s, or at least about $65 \times 10^3$ Pa s. In at least one non-limiting embodiment, the mixture 108 may have a viscosity of not greater than about $100 \times 10^3$ Pa s, such as not greater than about $95 \times 10^3$ Pa s, not greater than about $90 \times 10^3$ Pa s, or even not greater than about $85 \times 10^3$ Pa s. It will be appreciated that the viscosity of the mixture 108 can be within a range between any of the minimum and maximum values noted above. The viscosity can be measured in the same manner as the storage modulus as described above.

Moreover, the mixture 108 can be formed to have a particular content of organic materials including, for example, organic additives that can be distinct from the liquid to facilitate processing and formation of shaped abrasive particles according to the embodiments herein. Some suitable organic additives can include stabilizers, binders such as fructose, sucrose, lactose, glucose, UV curable resins, and the like.

Notably, the embodiments herein may utilize a mixture 108 that can be distinct from slurries used in conventional forming operations. For example, the content of organic materials within the mixture 108 and, in particular, any of the organic additives noted above, may be a minor amount as compared to other components within the mixture 108. In at least one embodiment, the mixture 108 can be formed to have not greater than about 30 wt % organic material for the total weight of the mixture 108. In other instances, the amount of organic materials may be less, such as not greater than about 15 wt %, not greater than about 10 wt %, or even not greater than about 5 wt %. Still, in at least one non-limiting embodiment, the amount of organic materials within the mixture 108 can be at least about 0.01 wt %, such as at least about 0.5 wt % for the total weight of the mixture 108. It will be appreciated that the amount of organic materials in the mixture 108 can be within a range between any of the minimum and maximum values noted above.

Moreover, the mixture 108 can be formed to have a particular content of acid or base, distinct from the liquid content, to facilitate processing and formation of shaped abrasive particles according to the embodiments herein. Some suitable acids or bases can include nitric acid, sulfuric acid, citric acid, chloric acid, tartaric acid, phosphoric acid, ammonium nitrate, and ammonium citrate. According to one particular embodiment in which a nitric acid additive is used, the mixture 108 can have a pH of less than about 5, and more particularly, can have a pH within a range between about 2 and about 4.

As shown in FIG. 1, the system 100 can include the die 102 and the mixture 108 can be provided within the interior of the die 102. Further, the die 102 can be configured so that as the piston 104 moves toward the tool 110, the mixture can be extruded through a die opening 118 positioned, or otherwise formed, at one end of the die 102, e.g., the end of the die 102 closest to the tool 110. As further illustrated, extruding can include applying the force 106 on the mixture 108 to facilitate extruding the mixture 108 through the die opening 118.

During extrusion within the application zone 112, the tool 110 can be in direct contact with a portion of the die 102 to facilitate extrusion of the mixture 108 into the one or more tool cavities 114. The tool 110 can be in the form of a screen, such as illustrated in FIG. 1, wherein the one or more tool cavities 114 extend through the entire thickness of the tool 110. Still, it will be appreciated that the tool 110 may be formed such that the one or more tool cavities 114 extend for a portion of the entire thickness of the tool 110 and have a bottom surface, such that the volume of space configured to hold and shape the mixture 108 is defined by a bottom surface and side surfaces.

The tool 110 may be formed of a metal material, including for example, a metal alloy, such as stainless steel. In other instances, the tool 110 may be formed of an organic material, such as a polymer.

In accordance with an embodiment, a particular pressure may be utilized during extrusion. For example, the pressure can be at least about 10 kPa, such as at least about 500 kPa. Still, in at least one non-limiting embodiment, the pressure utilized during extrusion can be not greater than about 4 MPa. It will be appreciated that the pressure used to extrude the mixture 108 can be within a range between any of the minimum and maximum values noted above. In particular instances, the consistency of the pressure delivered by a piston 199 may facilitate improved processing and formation of shaped abrasive particles. Notably, controlled delivery of consistent pressure across the mixture 108 and across the width of the die 102 can facilitate improved processing control and improved dimensional characteristics of the shaped abrasive particles.

Prior to depositing the mixture 108 in the tool one or more tool cavities 114, a mold release agent can be applied to the surfaces of the tool one or more tool cavities 114, which may facilitate removal of precursor shaped abrasive particles 126 from the tool one or more tool cavities 114 after further processing. Such a process can be optional and may not necessarily be used to conduct the molding process. A suitable exemplary mold release agent can include an organic material, such as one or more polymers (e.g., PTFE). In other instances, an oil (synthetic or organic) may be applied as a mold release agent to the surfaces of the tool one or more tool cavities 114. One suitable oil may be peanut oil. The mold release agent may be applied using any suitable manner, including but not limited to, depositing, spraying, printing, brushing, coating, and the like.

The mixture 108 may be deposited within the tool one or more tool cavities 114, which may be shaped in any suitable manner to form shaped abrasive particles having shapes corresponding to the shape of the tool one or more tool cavities 114.

Referring briefly to FIG. 2a and FIG. 2b, FIG. 3a through 3c, and FIG. 4, various examples of tools are illustrated and designated 200, 300, and 400, respectively. As shown in these figures, the tools 200, 300, 400 can include the tool one or more tool cavities 202, 302, 402, and more particularly, a plurality of one or more tool cavities 202, 302, 402 that extend into the volume of each respective tool 200, 300, 400. In accordance with these embodiments, each of the one or more tool cavities 202, 302, 402 can have a two-dimensional shape as viewed in a plane defined by the length (l) and width (w) of the respective tool 200, 300, 400 in which the tool cavity 202, 302, 402 is formed.

As illustrated in FIG. 2a through FIG. 4, the tool cavities 202, 302, 402 may be triangular, square with a semi-circular end, or square with a saw tooth end. In other embodiments, the tool cavities 202, 302, 402 can include various shapes such as, for example, polygons, ellipsoids, numerals, Greek alphabet letters, Latin alphabet letters, Russian alphabet characters, complex shapes including a combination of polygonal shapes, and a combination thereof. In particular instances, one or more tool cavities 202, 302, 402 may have two-dimensional polygonal shapes such as a rectangle, a quadrilateral, a pentagon, a hexagon, a heptagon, an octagon, a nonagon, a decagon, and a combination thereof. Notably, as will be appreciated in further reference to the shaped abrasive particles of the embodiments herein, one or more tool cavities 202, 302, 402 may utilize various other shapes. Further, as indicated in FIG. 2a through FIG. 4, in certain instances, during extrusion, the tool cavities 202, 302, 402 may be partially filled in order to create shapes that only partially correspond to the interior shape of the respective tool cavities 202, 302, 402.

In such a case, a method for forming shaped abrasive particles may include placing a mixture 206, 306, 406 comprising a ceramic precursor material into a production tool having a plurality of openings, e.g., one of the tools 200, 300, 400 described herein having the respective tool cavities 202, 302, 402. Placing the mixture 206, 306, 406 comprises partially filling a majority of the cavities of the plurality of cavities. In certain instances, each of the plurality of tool cavities 202, 302, 402 formed in the production tools 200, 300, 400 can have the same two-dimensional shape or different two-dimensional shapes.

In another aspect, partially filling includes placing the mixture 206, 306, 406 into only a portion of the openings such that the openings comprise some mixture 206, 306, 406 and some void volume that is free of the mixture. Partially filling a majority of the openings can include controlling at least one variable from the group consisting of: orientation of the plurality of openings relative to a direction of translation of the production tool, speed of translation of the production tool, viscosity of the mixture, pressure applied to the mixture during placing of the mixture into the plurality of openings, material of the production tool, surface energy between the surface of the plurality of the openings and the mixture, and any combination thereof.

Each tool 200, 300, 400 as illustrated may include a plurality of tool cavities 202, 302, 402 oriented in a particular manner relative to each other. For example, each of the plurality of tool cavities 202, 302, 402 in each respective tool 200, 300, 400 can have substantially the same orientation relative to each other, and substantially the same orientation relative to the surface of the screen. However, it will be appreciated, that in other instances, the one or more tool cavities 202, 302, 402 within each tool 200, 300, 400 need not necessarily have the same orientation relative to each other.

Referring again to FIG. 1, during operation of the system 100, the tool 110 can be translated in a direction 120 to facilitate a continuous molding operation. As will be appreciated, the tool 110 may be in the form of a continuous belt, which can be translated over rollers to facilitate continuous processing. In some embodiments, the tool 110 can be translated while extruding the mixture 108 through the die opening 118. As illustrated in the representation of the system 100, the mixture 108 may be extruded in a direction 122. The direction of translation 120 of the tool 110 can be angled relative to the direction of extrusion 122 of the mixture 108. While the angle between the direction of translation 120 and the direction of extrusion 122 is illustrated as substantially orthogonal in the system 100, other angles are contemplated, including for example, an acute angle or an obtuse angle. After the mixture 108 is extruded through the die opening 118, the mixture 108 and tool 110 may be translated under a knife edge 124 attached to, or otherwise formed on, a surface of the die 102. The knife edge 124 may define a region at the front of the die 102 that facilitates displacement of the mixture 108 into the tool one or more tool cavities 114 of the tool 110.

In the molding process, the mixture 108 may undergo significant drying while contained in the tool cavity 114. Therefore, shaping may be primarily attributed to substantial drying and solidification of the mixture 108 in the tool one or more tool cavities 114 to shape the mixture 108.

After applying the mold release agent, the mixture 108 can be deposited within the mold cavities and dried. Drying may include removal of a particular content of certain materials from the mixture 108, including volatiles, such as water or organic materials. In accordance with an embodiment, the drying process can be conducted at a drying temperature of not greater than about 300° C., such as not greater than about 250° C., not greater than about 200° C., not greater than about 150° C., not greater than about 100° C., not greater than about 80° C., not greater than about 60° C., not greater than about 40° C., or even not greater than about 30° C. Still, in one non-limiting embodiment, the drying process may be conducted at a drying temperature of at least about −20° C., such as at least about −10° C. at least about 0° C. at least about 5° C. at least about 10° C., or even at least about 20° C. It will be appreciated that the drying temperature may be within a range between any of the minimum and maximum temperatures noted above.

In certain instances, drying may be conducted for a particular duration to facilitate the formation of shaped abrasive particles according to embodiments herein. For example, drying can be conducted for a duration of at least about 20 second, such as at least about 1 minute, at least about 2 minutes, at least about 4 minutes, at least about 6 minutes, at least about 8 minutes, at least about 10 minutes, at least about 30 minutes, at least about 1 hour, at least about 2 hours, at least about 4 hours, at least about 8 hours, at least about 12 hours, at least about 15 hours, at least about 18 hours, at least about 24 hours. In still other instances, the process of drying may be not greater than about 30 hours, such as not greater than about 24 hours, not greater than about 20 hours, not greater than about 15 hours, not greater than about 12 hours, not greater than about 10 hours, not greater than about 8 hours, not greater than about 6 hours, not greater than about 4 hours. It will be appreciated that the duration of drying can be within a range between any of the minimum and maximum values noted above.

Additionally, drying may be conducted at a particular relative humidity to facilitate formation of shaped abrasive particles according to the embodiments herein. For example, drying may be conducted at a relative humidity of at least about 20%, at least about 30%, at least about 40%, at least about 50%, at least about 60%, such as at least about 62%, at least about 64%, at least about 66%, at least about 68%, at least about 70%, at least about 72%, at least about 74%, at least about 76%, at least about 78%, or even at least about 80%. In still other non-limiting embodiments, drying may be conducted at a relative humidity of not greater than about 90%, such as not greater than about 88%, not greater than about 86%, not greater than about 84%, not greater than about 82%, not greater than about 80%, not greater than about 78%, not greater than about 76%, not greater than about 74%, not greater than about 72%, not greater than about 70%, not greater than about 65%, not greater than about 60%, not greater than about 55%, not greater than about 50%, not greater than about 45%, not greater than about 40%, not greater than about 35%, not greater than about 30%, or even not greater than about 25%. It will be appreciated that the relative humidity utilized during drying can be within a range between any of the minimum and maximum percentages noted above.

After completing the drying process, the mixture 108 can be released from the tool one or more tool cavities 114 to produce precursor shaped abrasive particles 126. Notably, before the mixture 108 is removed from the tool one or more tool cavities 114 or after the mixture 108 is removed and the precursor shaped abrasive particles 126 are formed, one or more post-forming processes may be completed. Such processes can include surface shaping, curing, reacting, radiating, planarizing, calcining, sintering, sieving, doping, and a combination thereof. For example, in one optional process, the mixture 108 or precursor shaped abrasive particles 126 may be translated through an optional shaping zone, wherein at least one exterior surface of the mixture or precursor shaped abrasive particles 126 may be shaped.

In still another embodiment, the mixture 108 as contained in the mold cavities or the precursor shaped abrasive particles 126 may be translated through an optional application zone, wherein a dopant material can be applied. In particular instances, the process of applying a dopant material can include selective placement of the dopant material on at least one exterior surface of the mixture 108 or precursor shaped abrasive particles. In an optional process, the mixture 108 may be treated with one or more acid or base materials. Treatment may occur post-calcination and may affect a distribution of dopant material within the shaped abrasive particle. In a particular instance, treatment with one or more acid or base materials may facilitate increased performance of the shaped abrasive particle. The process of applying a dopant can include doping (i.e., additives or a provision of additives to the gel prior to calcination). In alternative instances, an impregnation process may be used instead of doping, where impregnation utilizes an additive introduced to the precursor particles after calcination. Utilization of doping or impregnation may affect distribution of the dopant material within the final shaped abrasive particle which may also facilitate increased performance of the shaped abrasive particle.

The dopant material may be applied utilizing various methods including for example, spraying, dipping, depositing, impregnating, transferring, punching, cutting, pressing, crushing, and any combination thereof. In accordance with an embodiment, applying a dopant material can include the application of a particular material, such as a precursor. In certain instances, the precursor can be a salt, such as a metal salt, that includes a dopant material to be incorporated into the finally-formed shaped abrasive particles. For example, the metal salt can include an element or compound that is the precursor to the dopant material. It will be appreciated that the salt material may be in liquid form, such as in a dispersion comprising the salt and liquid carrier. The salt may include nitrogen, and more particularly, can include a nitrate. In other embodiments, the salt can be a chloride, sulfate, phosphate, and a combination thereof. In one embodiment, the salt can include a metal nitrate, and more particularly, consist essentially of a metal nitrate. In one embodiment, the dopant material can include an element or compound such as an alkali element, alkaline earth element, rare earth element, hafnium, zirconium, niobium, tantalum, molybdenum, vanadium, or a combination thereof. In one particular embodiment, the dopant material includes an element or compound including an element such as lithium, sodium, potassium, magnesium, calcium, strontium, barium, scandium, yttrium, lanthanum, cesium, praseodymium, niobium, hafnium, zirconium, tantalum, molybdenum, vanadium, chromium, cobalt, iron, germanium, manganese, nickel, titanium, zinc, and a combination thereof.

The forming process may further include a sintering process. For certain embodiments herein, sintering can be conducted after removing the mixture from the tool one or more tool cavities 114 and forming the precursor shaped abrasive particles 126. Sintering of the precursor shaped abrasive particles 126 may be utilized to densify the particles 126, which are generally in a green state. In a particular instance, the sintering process can facilitate the formation of a high-temperature phase of the ceramic material. For example, in one embodiment, the precursor shaped abrasive particles may be sintered such that a high-temperature phase of alumina, such as alpha alumina, is formed. In one instance, a shaped abrasive particle can comprise at least about 90 wt % alpha alumina for the total weight of the particle. In other instances, the content of alpha alumina may be greater such that the shaped abrasive particle may consist essentially of alpha alumina.

The body of the finally-formed shaped abrasive particles can have particular two-dimensional shapes. For example, the body can have a two-dimensional shape, as viewed in a plane defined by the length and width of the body, and can have a shape including a polygonal shape, ellipsoidal shape, a numeral, a Greek alphabet character, a Latin alphabet character, a Russian alphabet character, a complex shape utilizing a combination of polygonal shapes and a combination thereof. Particular polygonal shapes include rectangular, trapezoidal, pentagonal, hexagonal, heptagonal, octagonal, nonagonal, decagonal, and any combination thereof. In another instance, the finally-formed shaped abrasive particles can have a body having a two-dimensional shape such as an irregular quadrilateral, an irregular rectangle, an irregular trapezoid, an irregular pentagon, an irregular hexagon, an irregular heptagon, an irregular octagon, an irregular nonagon, an irregular decagon, and a combination thereof. An irregular polygonal shape is one where at least one of the sides defining the polygonal shape is different in dimension (e.g., length) with respect to another side. As illustrated in other embodiments herein, the two-dimensional shape of certain shaped abrasive particles can have a particular number of exterior points or external corners. For example, the body of the shaped abrasive particles can have a two-dimensional polygonal shape as viewed in a plane defined by a length and width, wherein the body comprises a two-dimensional shape having at least 4 exterior points (e.g., a quadrilateral), at least 5 exterior points (e.g., a pentagon), at least 6 exterior points (e.g., a hexagon), at least 7 exterior points (e.g., a heptagon), at least 8 exterior points (e.g., an octagon), at least 9 exterior points (e.g., a nonagon), and the like.

Figure 5:
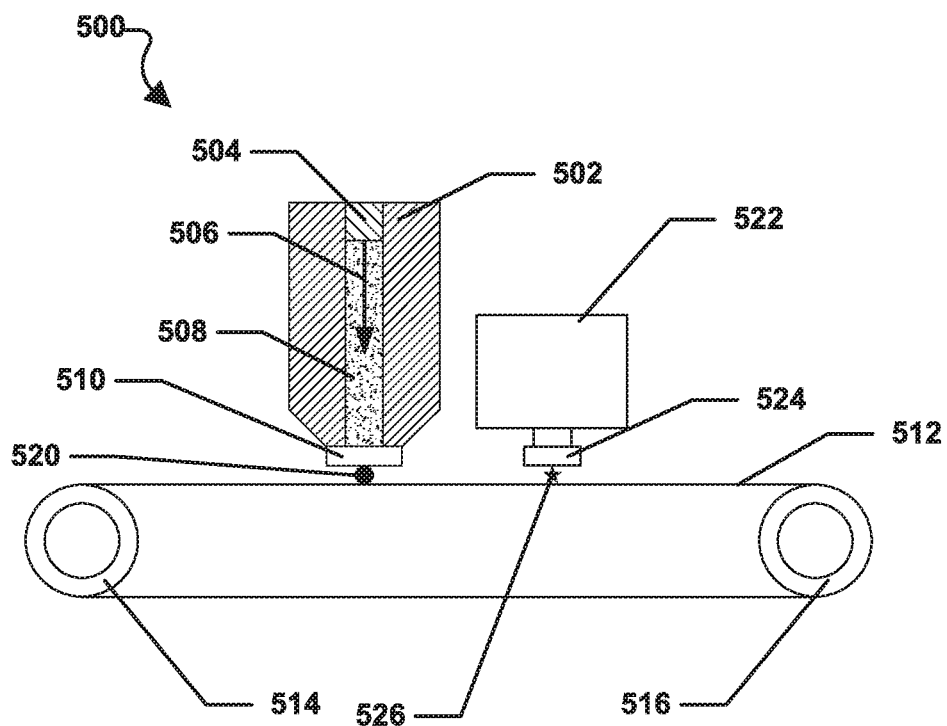
FIG. 5 includes a portion of a system for forming a particulate material in accordance with an embodiment.

Referring now to FIG. 5, another system 500 for forming shaped abrasive particles in accordance with one, non-limiting embodiment is illustrated. As shown, the system 500 may include a die 502 having a piston 504 disposed therein. The piston 504 may move within the die 502 in order to apply a force 506 onto a mixture 508 also disposed within the die 502 between the piston 504 and a shaped die opening 510.

The resulting pressure of the force 506 may extrude the mixture 508 through the shaped die opening 510 and onto a conveyor belt 512. The conveyor belt 512 may be supported by, and rotate on, a first roller 514 and a second roller 516. In a particular embodiment, the mixture 508 can be same as the mixture 108, described above. Further, the mixture 508 can be extruded from the die 502 and a resulting extrudate 520 can undergo one or more post-forming processes, described above, to become a shaped abrasive particle having the shape of the shaped die opening 510.

In another aspect, the system 500 can further include a post-extrusion shaping device 522. The post-extrusion shaping device 522 may be a stamping device, a molding device, a pressing device, or some other device that may be used to alter, or otherwise modify, the shape of the extrudate 520 into another shape. For example, the post-extrusion shaping device 522 may include a piston driven stamp 524. The extrudate 520 may be moved into position under the post-extrusion shaping device 522 and the piston driven stamp 524 may be lowered onto the extrudate 520 in order to press the extrudate 520 into a stamped extrudate 526 having a different shape than that of the extrudate 520 after it is extruded onto the conveyor belt 512 from the die 502.

Thereafter, the stamped extrudate 526 may undergo one or more of the post-forming processes described above to become a shaped abrasive particle having a shape corresponding to the interior shape of the piston driven stamp 524. It can be appreciated that the extrudate 520 or the stamped extrudate 526 can be shaped like one or more of the shaped abrasive particles described in detail herein. The stamp may be used to form all or a portion of the features of a shaped abrasive particle. For example, in certain instances, the stamp may be used to form a shaped abrasive particle having a particular shape from the extrudate. In still other instances, the stamp may be used to form only a portion of the extrudate, such as a surface of the extrudate, such that the stamp is configured to impart one or more surface features to the extrudate. In further instances, the extrudate 520 can be in the form of a ribbon, and the post-extrusion shaping device 522 and/or the piston driven stamp 524 can be used to stamp a shape (e.g., a shaped abrasive particle having a shape corresponding to the interior shape of the piston driven stamp 524) out of the ribbon.

The stamp can be used with other processes, such as a molding process or a screen printing process to alter a portion (e.g. a surface) of the precursor shaped abrasive particles made by printing or molding.

Figure 6:
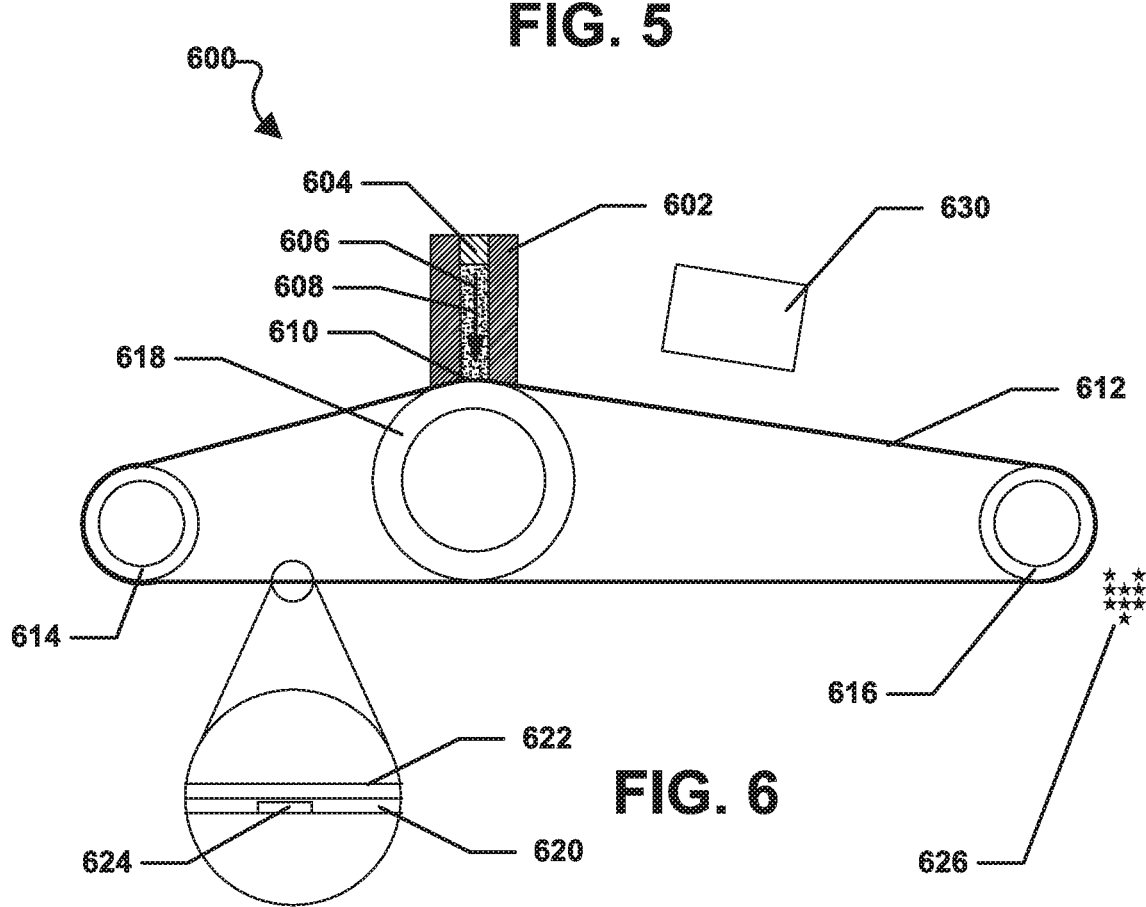
FIG. 6 includes a portion of a system for forming a particulate material in accordance with an embodiment.

FIG. 6 illustrates yet another system 600 for forming shaped abrasive particles in accordance with one, non-limiting embodiment is illustrated. As illustrated in FIG. 6, the system 600 may include a die 602 having a piston 604 disposed therein. The piston 604 may move within the die 602 in order to apply a force 606 onto a mixture 608 also disposed within the die 602 between the piston 604 and a die opening 610.

The resulting pressure of the force 606 may extrude the mixture 608 through the die opening 610 and onto a conveyor belt 612. The conveyor belt 612 may be supported by, and rotate on, a first roller 614, a second roller 616, and a third roller 618. The third roller 618 may be placed directly under the die 602 so that when the mixture 608 is extruded from the die 602, the extrusion force will not move the conveyor belt 612 away from the die 602. In a particular embodiment, the mixture 608 can be same as the mixture 108, described above.

As illustrated in the enlarged portion of FIG. 6, the conveyor belt 612 can include an exterior layer 620 and an interior layer 622. The exterior layer 620 may be constructed from a low friction material, e.g., PTFE, while the interior layer 622 may be constructed from a high friction material, e.g., rubber. The exterior layer 620 acts as a tool layer and can include a plurality of tool cavities 624. During operation, the mixture 608 can be extruded from the die 602 and into the tool cavities 624 formed in the exterior layer 620 of the conveyor belt 612. After the mixture 608 is extruded from the die 602 into the tool cavities 624 of the exterior layer 620 of the conveyor belt 612, the material within the tool cavities 624 may undergo one or more post-forming processes, described above, to become a shaped abrasive particle having the shape of the tool cavities 624. The tool cavities 624 may have an interior shape that corresponds to the exterior shape of one or more of the shaped abrasive particles described herein. It can be appreciated that the exterior layer 620 of the conveyor belt 612 can have a coefficient of friction low enough to allow the shaped abrasive particles 626 to release from the conveyor belt 612 as the conveyor belt 612 rotates around and under the rollers 614, 616, 618. Further, the interior layer 622 of the conveyor belt 612 can have a coefficient of friction high enough to engage the rollers 614, 616, 618 and allow the conveyor belt 612 to be driven by one or more of the rollers 614, 616, 618 and not slide relative to those rollers 614, 616, 618 during operation. FIG. 6 further indicates that the system 600 may include a drying device 630 that may be used to cure, or otherwise dry, the material 608 after it is extruded into the tool cavities 624 formed in the conveyor belt 612.

The system 600 illustrated in FIG. 6 may be used in a method of making shaped abrasive particles that includes translating a production tool having openings over rollers and through a deposition zone configured to deposit a mixture into the openings. In the deposition zone, the production tool is translated over a primary roller having a greater diameter compared to any other roller in contact with the production tool.

Figure 7:
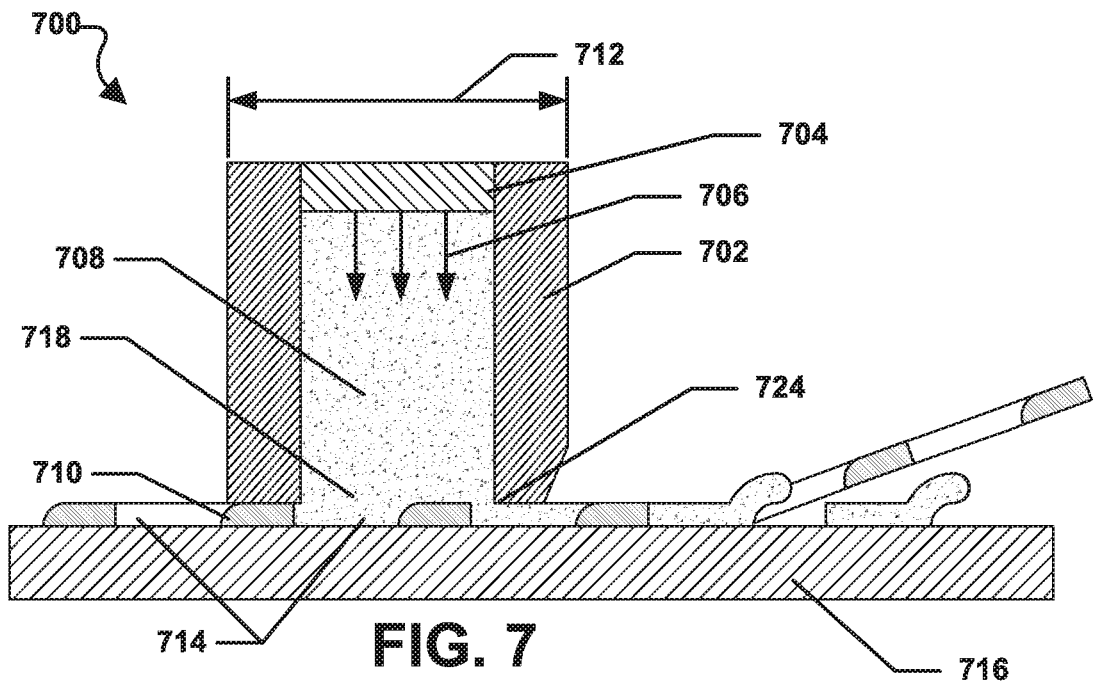
FIG. 7 includes a portion of a system for forming a particulate material in accordance with an embodiment.

Referring to FIG. 7, an illustration of still another system 700 for forming a shaped abrasive particle in accordance with one, non-limiting embodiment. As shown, the system 700 may include a die 702 in which a piston 704 may move in order to apply a force 706 onto a mixture 708 within the die 702. The resulting pressure of the force 706 may extrude the mixture 708 into a tool 710, e.g., a screen, within an application zone 712. The mixture 708 may be extruded into one or more tool cavities 714 formed within the tool 710. Further, the tool 710 may be supported by a backing plate 716. In a particular aspect, the backing plate 716 may be constructed from a low friction material, e.g., polytetrafluoroethylene (PTFE).

As shown in FIG. 7, the die 702 can be configured so that as the piston 704 moves toward the tool 710, the mixture can be extruded through a die opening 718 positioned, or otherwise formed, at one end of the die 702, e.g., the end of the die 702 closest to the tool 710.

During extrusion within the application zone 712, the tool 710 can be in direct contact with a portion of the die 702 to facilitate extrusion of the mixture 708 into the one or more tool cavities 714. However, a portion of the tool cavity 714 may be positioned outside of the application zone 712 to allow a portion of the mixture 708 to be extruded through and out of the tool cavity 714. The portion of the mixture 708 that is allowed to overflow the tool cavity 714 may form a lip or other structure on a shaped abrasive particle, as described in detail herein, when the tool 710, e.g., the screen, is peeled away from the backing plate 716 as illustrated in FIG. 7.

After the mixture 708 is extruded through the die opening 718, the mixture 708 and tool 710 may be translated under a knife edge 724 attached to, or otherwise formed on, a surface of the die 702. The knife edge 724 may define a region at the front of the die 702 that facilitates displacement of the mixture 708 into the tool one or more tool cavities 714 of the tool 710. It can be appreciated that after the material 708 is extruded into and through the tool cavity 714, the material may undergo one or more of the post-forming processes, described above, to become a shaped abrasive particle having the shape of the tool cavity 714 and the overflow portion.

Figure 8:
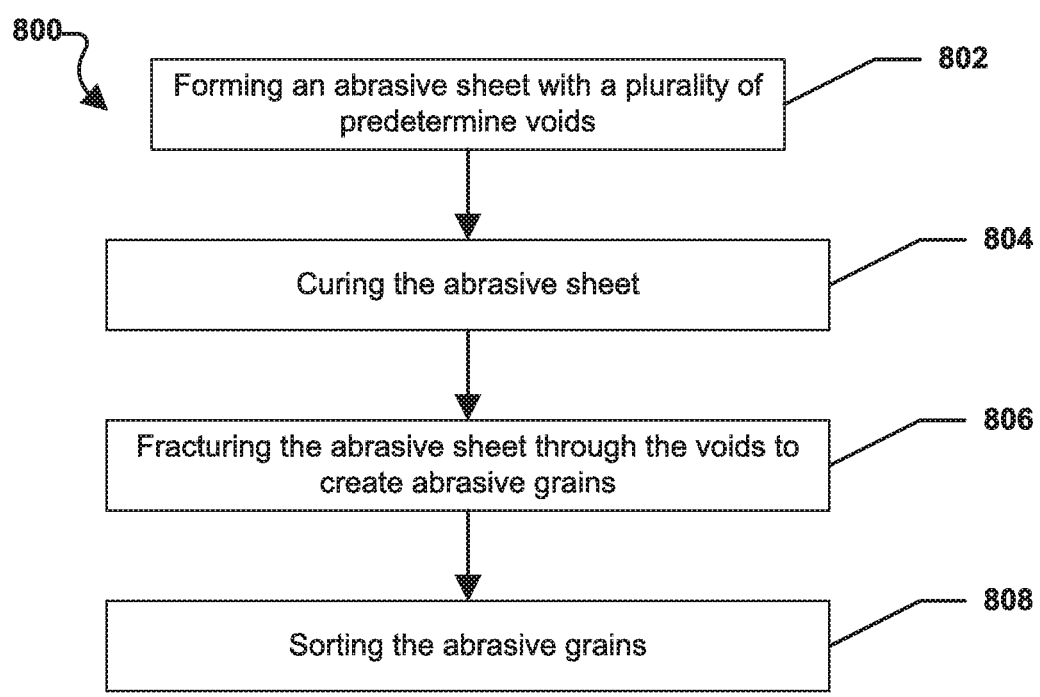
FIG. 8 includes a flow chart of a method of forming a particulate material in accordance with an embodiment.

Referring now to FIG. 8, a method of forming a shaped abrasive particle in accordance with one, non-limiting embodiment, is illustrated and is generally designated 800. As depicted, the method 800 can include forming an abrasive sheet with a plurality of predetermined voids (e.g., pores) at step 802. The abrasive sheet may be formed using a screen printing process or a molding process. Further, the voids may be formed by including a volatile component in the mixture that burns off during the firing process leaving behind the voids. At step 804, the method 800 may include curing the abrasive sheet 804. Moreover, the method 800 may include fracturing the abrasive sheet through the voids to create abrasive grains at step 806. Thereafter, at step 808, the method 808 may include sorting the abrasive grains.

FIGS. 9-12c illustrate various shaped abrasive particles formed with a plurality of voids. The voids can be discrete micro-voids that can be distributed throughout a body, such as uniformly distributed throughout the volume of the body. The discrete micro-voids can include a liquid or gas material. Further, the discrete micro-voids can be non-uniformly distributed through a particular body. As such, a particular body can include a greater content of discrete micro-voids in a central region of the body compare to a content of discrete micro-voids at a surface region of the body.

In another aspect, the discrete micro-voids can be uniformly distributed throughout the body, or sheet. Moreover, the discrete micro-voids can be non-homogenously distributed so that there are more voids in thicker parts of a body and less near edges of the body. The voids can be created by coating precursor abrasive particles with a second layer or double extruding two different types of mixtures. The micro-voids may also be formed by a subtractive process, including the use of one or more pore formers.

Figure 9:
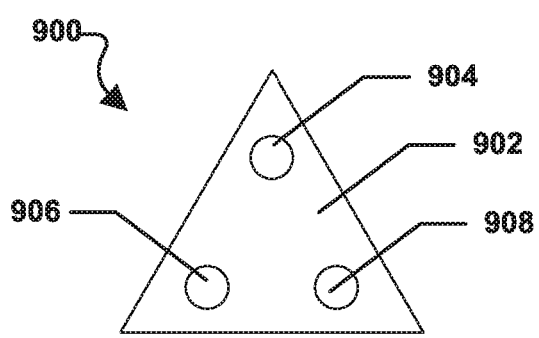
FIG. 9 includes a shaped abrasive particle in accordance with an embodiment.
Figure 10:
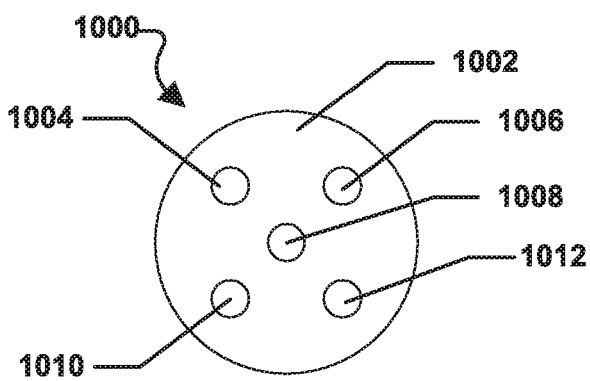
FIG. 10 includes a shaped abrasive particle in accordance with an embodiment.
Figure 11:
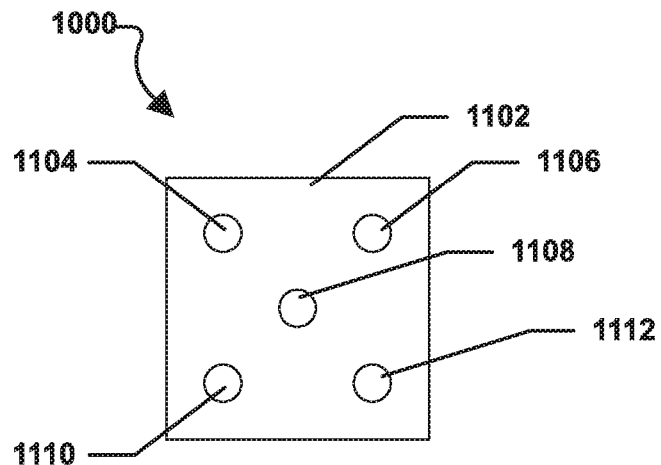
FIG. 11 includes a shaped abrasive particle in accordance with an embodiment.

FIG. 9 illustrates an abrasive particle 900 having a body 902 formed with a first void 904, a second void 906, and a third void 908. As shown, the voids 904, 906, 908 are shaped like circles. However, the voids 904, 906, 908 can be shaped like a triangle, a square, a five-point star, a diamond, a hexagon, a four-point star, or any other regular or irregular polygonal shape. FIG. 10 depicts an abrasive particle 1000 having a body 1002 formed with a first void 1004, a second void 1006, a third void 1008, a fourth void 1010, and a fifth void 1012. As shown, the voids 1004, 1006, 1008, 1010 are shaped like circles. However, the voids 1004, 1006, 1008, 1010 can be shaped like a triangle, a square, a five-point star, a diamond, a hexagon, a four-point star, or any other regular or irregular polygonal shape. FIG. 11 depicts yet another abrasive particle 1100 having a body 1102 formed with a first void 1104, a second void 1106, a third void 1108, a fourth void 1110, and a fifth void 1112. As shown, the voids 1104, 1106, 1108, 1110, 1112 can be shaped like circles. However, the voids 1104, 1106, 1108, 1110, 1112 can be shaped like a triangle, a square, a five-point star, a diamond, a hexagon, a four-point star, or any other regular or irregular polygonal shape. It can be appreciated that while the various voids formed in the abrasive particles 900, 1000, 1100 described in conjunction with FIG. 9 through FIG. 11, those voids may be formed with any other shape. For example, the voids can include any other complex shapes including a combination of polygonal shapes, and a combination thereof. In particular instances, the voids may have two-dimensional polygonal shapes such as a rectangle, a quadrilateral, a pentagon, a hexagon, a heptagon, an octagon, a nonagon, a decagon, and a combination thereof. Additionally, the voids may have amorphous shapes that do not correspond to polygonal shapes. Further, the abrasive particles 900, 1000, 1100 may include any number of voids formed therein. Those voids may be oriented in a grid pattern or they may be oriented in no formal pattern. Further, the abrasive particles 900, 1000, 1100 may be formed using one or more of the processes described herein prior to fracturing the abrasive particles 900, 1000, 1100, through the voids.

Figure 12A:
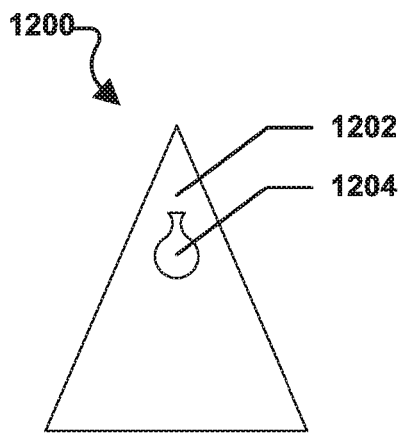
FIGS. 12a-12c include a shaped abrasive particle in accordance with an embodiment.
Figure 12B:
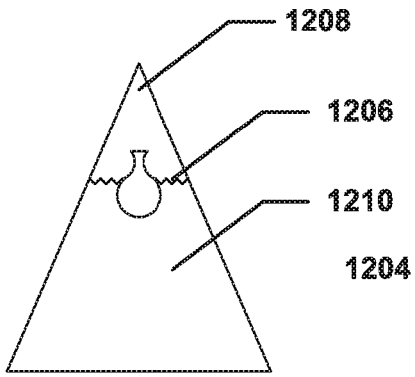

FIG. 12a shows another abrasive particle 1200 that includes a body 1202 formed with a keyhole, or vase, shaped void 1204. FIG. 12b indicates that the abrasive particle 1200 may be fractured through or near the void 1204 along a crack 1206 to yield a major portion 1208 and a minor portion

Figure 12C:
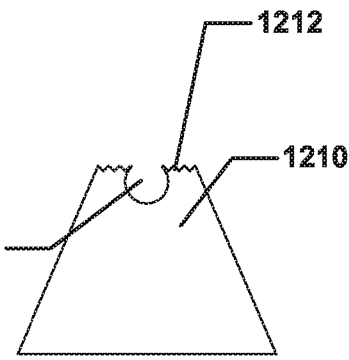

1210. As indicated in FIG. 12*c*, the minor portion 1210 may be removed after the fracturing operation, e.g., using a sieving operation. As such, the major portion 1208 may remain and may include one or more relatively sharp edges 1212 adjacent to, or flanking, the void 1204.

Shaped Abrasive Particles

Figure 13A:
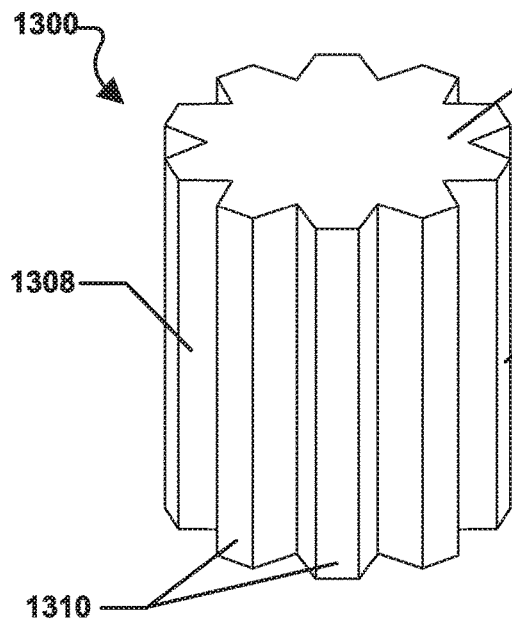
FIGS. 13a-13d include a shaped abrasive particle in accordance with an embodiment.
Figure 13B:
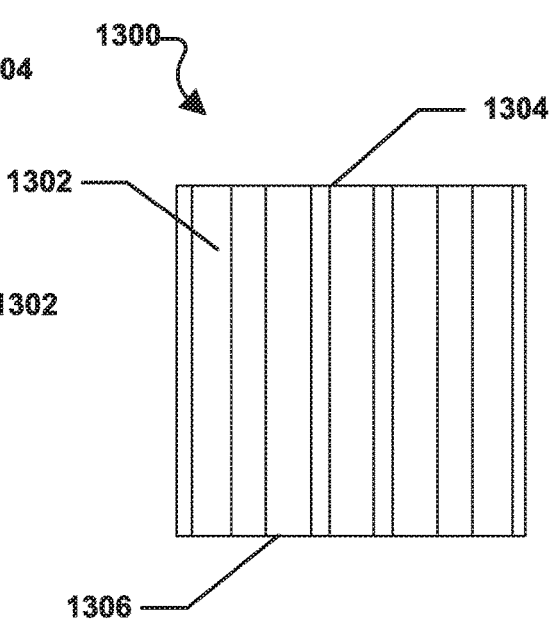

Referring to FIG. 13*a* through 13*d*, a shaped abrasive particle in accordance with an embodiment is shown and is generally designated 1300. FIG. 13*a* includes a perspective view of the shaped abrasive particle 1300. FIG. 13*b* includes a side plan view of the shaped abrasive particle 1300 and FIG. 13*c* includes a top plan view of the shaped abrasive particle 1300. The bottom plan view is the same as the top plan view.

Figure 13C:
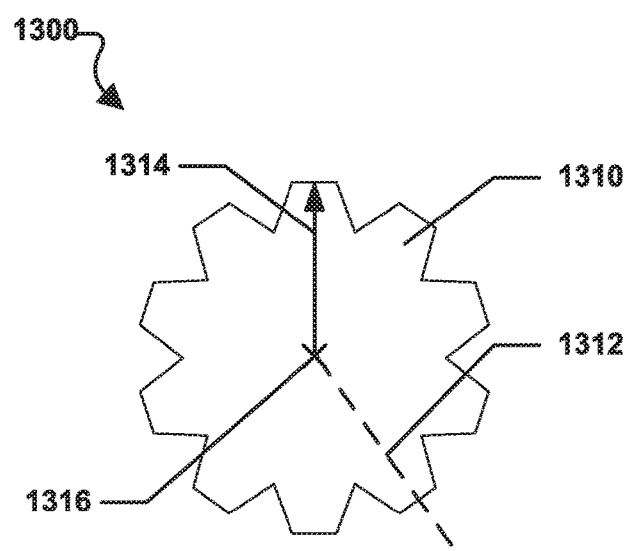

As illustrated, the shaped abrasive particle 1300 includes a body 1302 that includes a first surface 1304 and a second surface 1306 opposite the first surface 1304. As depicted, a side surface 1308 can extend between the first surface 1304 and the second surface 1306. FIG. 13*a* through FIG. 13*c* show that the body 1302 can be generally gear-shaped, i.e., the plan view of the body 1302 (the two-dimensional shape) can include a plurality of teeth 1310 extending peripherally from the side surface 1308 of the body 1302.

In a particular aspect, the teeth 1310 can extend along a length of the body 1302. Further, the teeth 1310 can extend along the entire length of the body 1302. As indicated in FIG. 13*c*, each of the plurality of teeth 1310 can include a two-dimensional shape. The two-dimensional shape of each tooth 1310 can be symmetric about an axis 1312 that bisects each tooth 1310. In another aspect, the two-dimensional shape of each tooth 1310 may be asymmetric about the axis 1312.

Figure 13D:
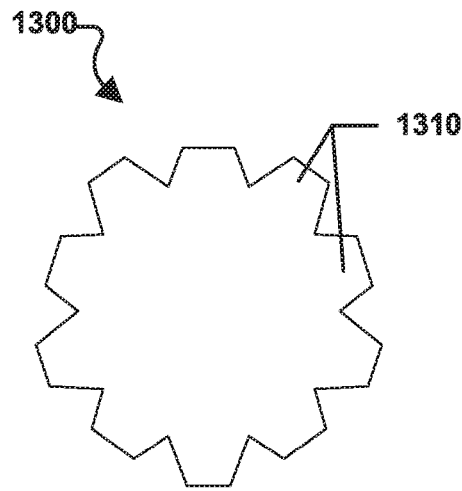

As indicated in FIG. 13*a* through FIG. 13*c*, the teeth 1310 are substantially identical. In other aspects, the teeth 1310 may have different shapes. In other words, some of the teeth 1310 may be symmetric about the axis 1312 while other teeth 1310 are asymmetric about the axis 1312. Further, some teeth 1310 may have tooth height 1314, i.e., a distance from a center 1316 of the shaped abrasive grain 1300, that is different from other teeth 1310, so that some teeth 1310 extend a greater distance from the side surface 1308 than other teeth 1310 (as illustrated in FIG. 13*d*). In a particular aspect, the shaped abrasive particle 1300 can be formed using one or more of the systems and methods, described herein.

Figure 14A:
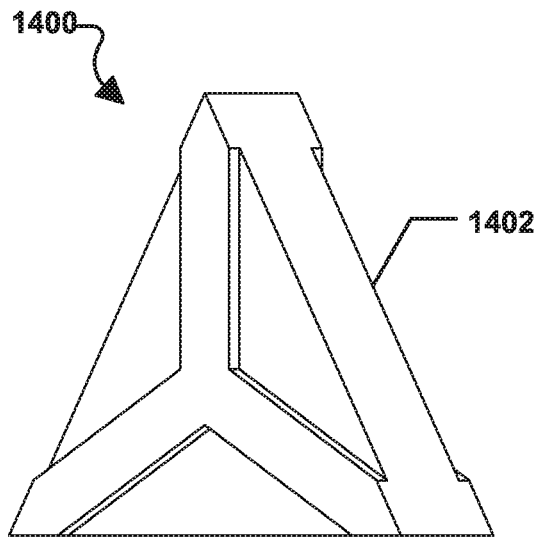
FIGS. 14a-14e include a shaped abrasive particle in accordance with an embodiment.
Figure 14B:
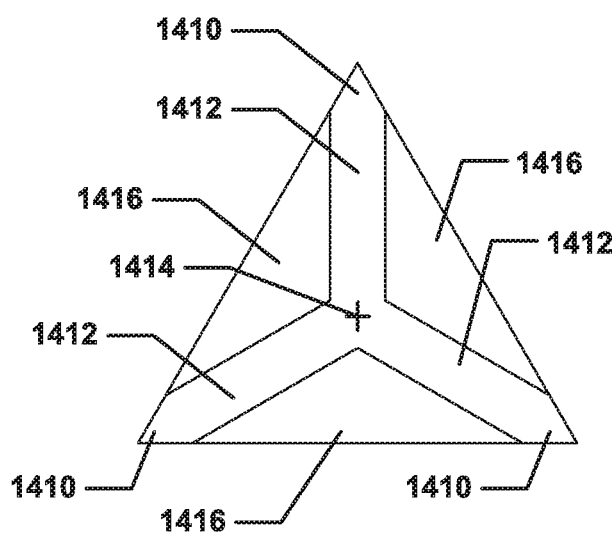
Figure 14C:
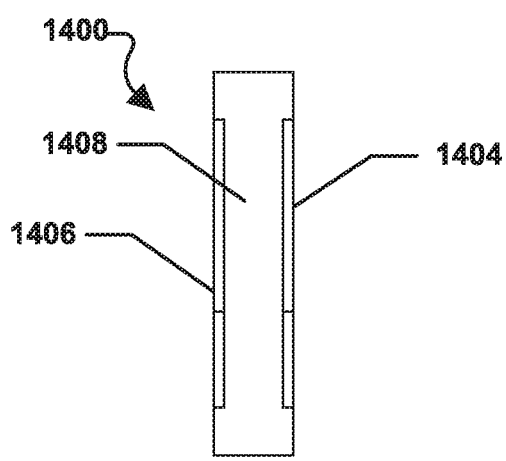
Figure 14D:
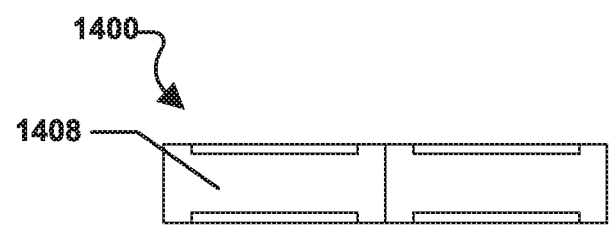
Figure 14E:
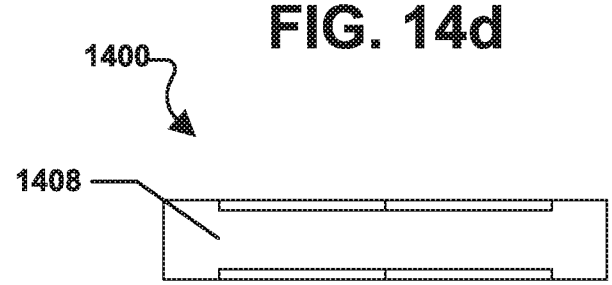

FIG. 14*a* through FIG. 14*e* illustrate a shaped abrasive particle 1400 in accordance with an embodiment. FIG. 14*a* includes a perspective view of the shaped abrasive particle 1400. FIG. 14*b* includes a front plan view of the shaped abrasive particle 1400. The back plan view of the shaped abrasive particle 1400 is the same as the front plan view. FIG. 14*c* includes a side plan view of the shaped abrasive particle 1400. Both sides of the shaped abrasive particle 1400 are the same in the plan view. FIG. 14*d* includes a top plan view of the shaped abrasive particle 1400 and FIG. 14*e* includes a bottom plan view of the shaped abrasive particle 1400.

As indicated, the shaped abrasive particle 1400 includes a body 1402 having a first surface 1404 and a second surface 1406 distanced from the first surface 1404. A side surface 1408 can extend between the first surface 1404 and the second surface 1406.

As depicted in FIG. 14*a* through FIG. 14*e*, the body 1402 of the shaped abrasive particle 1400 can be generally triangular and can include three exterior corners 1410. The first surface 1404 and the second surface 1406 can each include a raised portion 1412 that can extend from each exterior corner 1410 to the center 1414 of the body 1402. The raised portions 1412 can join each other in the center region of the first surface 1404 and the second surface 1406, respectively. In a particular aspect, the raised portions 1412 can extend linearly from the exterior corners 1410 to the center 1414 region of the body 1402. As more clearly indicated in FIG. 14*b*, the raised portions 1412 can define and separate a plurality of depressed regions 1416 that can abut the raised portions and at least a portion of the side surface 1408 of the body 1402. In other words, each depressed region 1416 is bounded by two adjacent raised portions 1412 and a portion of the side surface 1408 of the body 1402. The raised portions 1412 on the first surface 1404 and the second surface 1406 can have substantially the same arrangement to each other. In a particular aspect, the shaped abrasive particle 1400 can be formed using one or more of the systems and methods, described herein.

Figure 15A:
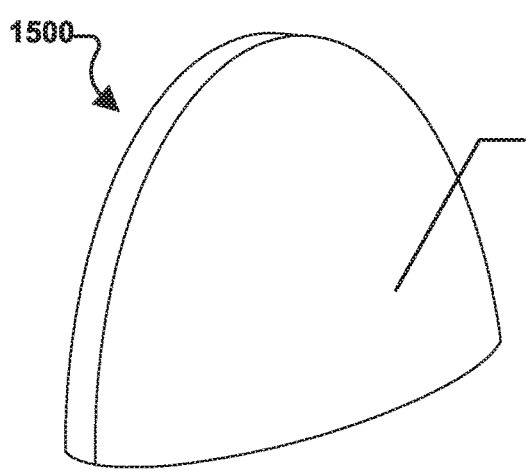
FIGS. 15a-15g include a shaped abrasive particle in accordance with an embodiment.
Figure 15B:
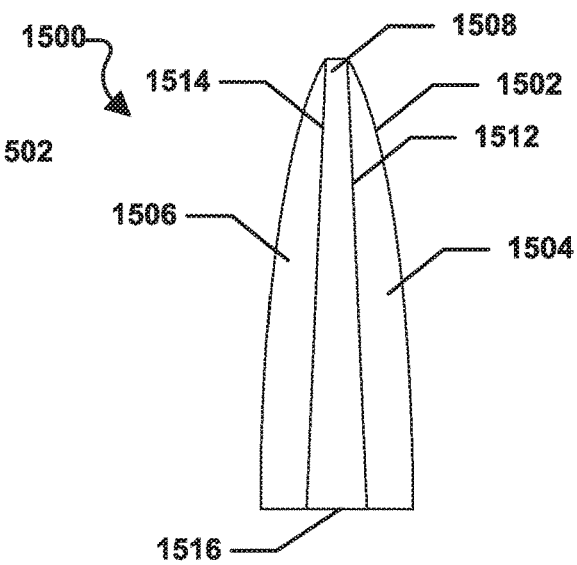
Figure 15C:
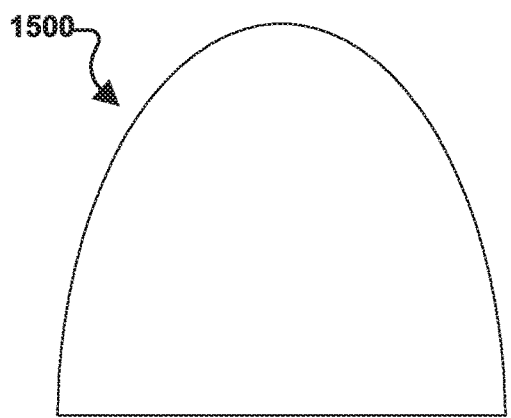
Figure 15D:
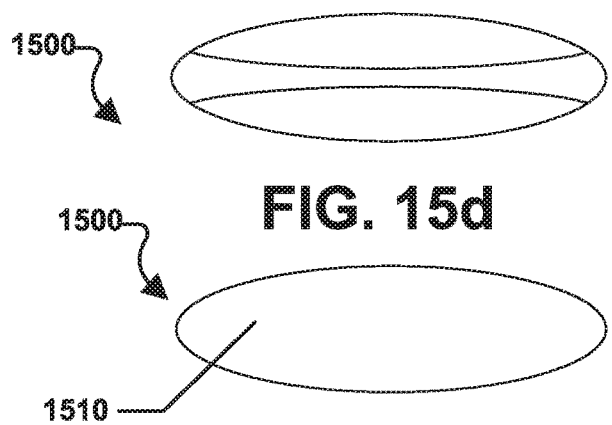

FIG. 15*a* through FIG. 15*e* includes a shaped abrasive particle 1500 in accordance with an embodiment. FIG. 15*a* includes a perspective view of the shaped abrasive particle 1500. FIG. 15*b* includes a front plan view of the shaped abrasive particle 1500. FIG. 15*c* includes a side plan view of the shaped abrasive particle 1500. Both sides of the shaped abrasive particle 1500 are the same in plan view. FIG. 15*d* includes a top plan view of the shaped abrasive particle 1500 and FIG. 15*e* includes a bottom plan view of the shaped abrasive particle 1500.

Figure 15E:
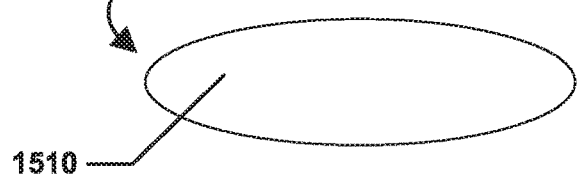

As illustrated, the shaped abrasive particle 1500 can include a body 1502 having a partial-ellipsoid shape. The body 1502 can include a first major surface 1504 and a second major surface 1506 jointed by a third surface 1508 that can extend between at least a portion of the first major surface 1504 and the second major surface 1506. The third surface 1508 can be generally arch shaped. The body 1502 can include a fourth surface 1510 that can extend between at least a portion of the first major surface 1504, the second major surface 1506, and the third surface 1508. The fourth surface 1510 can act as a base and as indicated in FIG. 15*e*, the fourth surface 1510 can be generally elliptical in shape. In certain instances, the body 1502 can have a partial-ellipsoid shape on only one major surface (e.g., either the first major surface 1504 or the second major surface 1506 can include a degree of curvature).

As depicted in FIG. 15*b*, the first major surface 1504 can connect to the third surface 1508 along a first edge 1512. The second major surface 1506 can also connect to the third surface 1508 along a second edge 1514. The second edge 1514 can be opposite the first edge 1512. The fourth surface 1510 can connect to the first major surface 1504, the second major surface 1506, and the third surface 1508 along a third edge 1516.

Figure 15F:
Figure 15G:

In a particular aspect, the first major surface 1504 can include a convex shape. In another aspect, the first major surface 1504 can include a concave shape, as illustrated in FIG. 15*f*. In still another aspect, the first major surface 1504 can include a flat, planar shape, as illustrated in FIG. 15*g*. Similarly, the second major surface 1506 can include a concave shape, a convex shape, a planar shape, or a combination thereof. The third surface 1508 can be include an arch shape, as indicated in FIG. 15*c* and the fourth surface 1510 can include a planar shape. However, in another aspect, the fourth surface 1510 can also include a concave shape. The first edge 1512 and the second edge 1514 can include a curved or elliptical contour. The third edge 1616 can also include a curved or elliptical contour.

In a particular aspect, the first major surface 1504 and the second major surface 1506 may both include a convex shape. In another aspect, the first major surface 1504 and the second major surface 1506 may both include a concave shape. In another aspect, the first major surface 1504 may be include a convex shape while the second major surface 1506 includes a concave shape (or vice versa). In still another aspect, the first major surface 1504 can include a planar shape and the second major surface 1506 may both include a convex shape or a concave shape. Or, the second major surface 1506 may include a planar shape and the first major surface 1504 can include a convex shape or a concave shape. In a particular aspect, the shaped abrasive particle 1500 can be formed using one or more of the systems and methods, described herein.

Figure 16A:
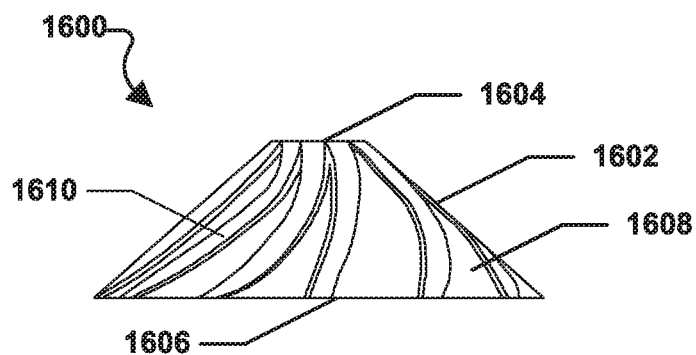
FIGS. 16a-16c include a shaped abrasive particle in accordance with an embodiment.
Figure 16B:
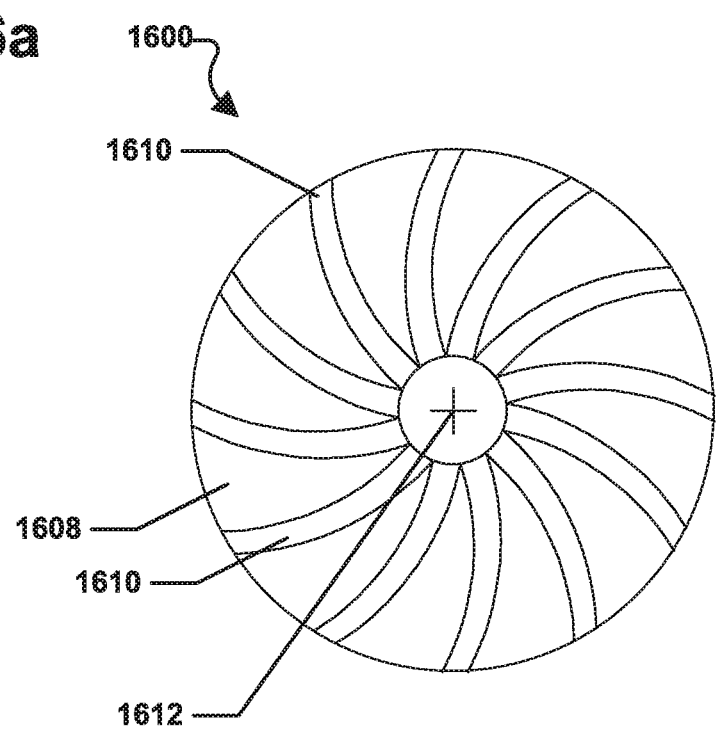
Figure 16C:
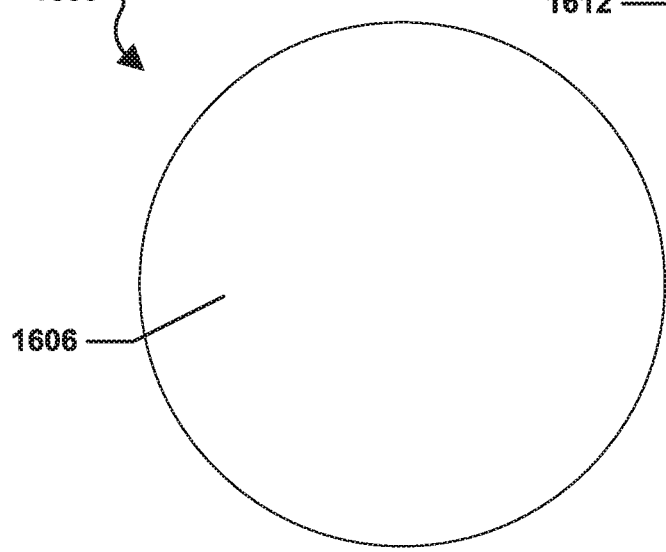

FIG. 16*a* through FIG. 16*c* include a shaped abrasive particle 1600 in accordance with an embodiment. FIG. 16*a* includes a side plan view of the shaped abrasive particle 1600. FIG. 16*b* includes a top plan view of the shaped abrasive particle 1600 and FIG. 16*c* includes a bottom plan view of the shaped abrasive particle 1600.

As shown, the shaped abrasive particle 1600 can have a body 1602 that is generally frustoconical in shape. The body 1602 can include a first surface 1604 and a second surface 1606 that is substantially parallel to the first surface 1604. An angled side surface 1608 can extend between the first surface 1604 and the second surface 1606. The side surface 1608 can include a plurality of protrusions 1610 that can extend between the first surface 1604 and the second surface 1606 along a spiral pathway. As indicated in FIG. 16*b*, the protrusions 1610 can be equally spaced around a center 1612 of the body 1602. In a particular aspect, the shaped abrasive particle 1600 can be formed using one or more of the systems and methods, described herein.

Figure 17A:
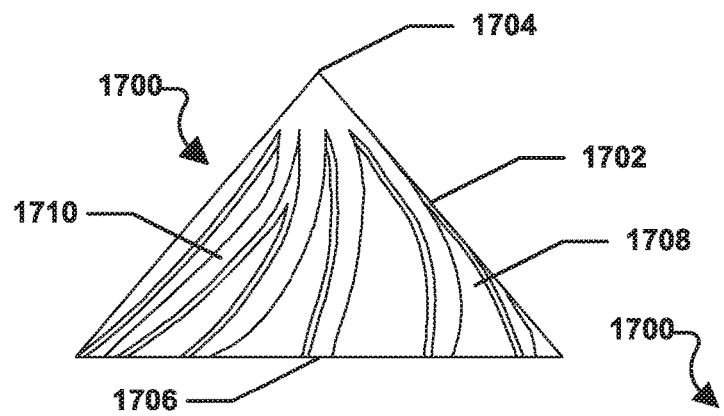
FIGS. 17a-17c include a shaped abrasive particle in accordance with an embodiment.
Figure 17B:
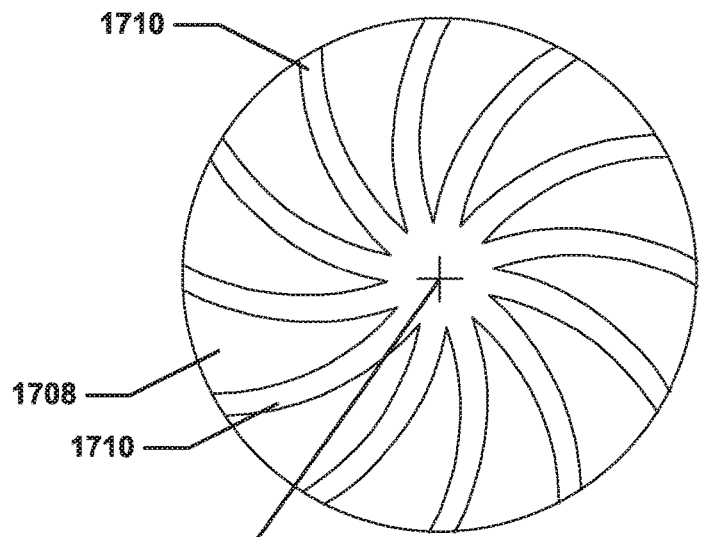
Figure 17C:
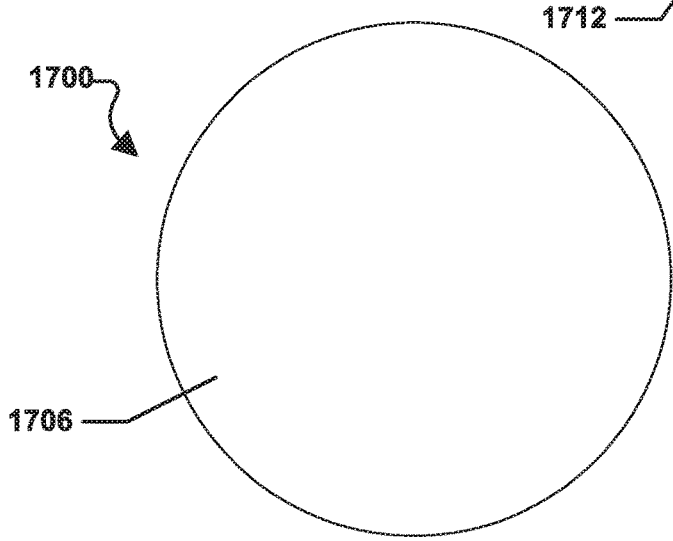

FIG. 17*a* through FIG. 17*c* include a shaped abrasive particle 1700 in accordance with an embodiment. FIG. 17*a* includes a side plan view of the shaped abrasive particle 1700. FIG. 17*b* includes a top plan view of the shaped abrasive particle 1700 and FIG. 17*c* includes a bottom plan view of the shaped abrasive particle 1700.

As shown, the shaped abrasive particle 1700 can have a body 1702 that is generally conical in shape. The body 1702 can include a vertex 1704 and a surface 1706 that is spaced a distance from the vertex 1704. An angled side surface 1708 can extend between the vertex 1704 and the surface 1706. The side surface 1708 can include a plurality of protrusions 1710 that can extend between the vertex 1704 and the surface 1706 along a spiral pathway. As indicated in FIG. 17*b*, the protrusions 1710 can be equally spaced around a center 1712 of the body 1702. In a particular aspect, the shaped abrasive particle 1700 can be formed using one or more of the systems and methods, described herein.

FIG. 18*a* through FIG. 18*e* include a shaped abrasive particle 1800 in accordance with an embodiment. FIG. 18*a* includes a perspective view of the shaped abrasive particle 1800. FIG. 18*b* includes a front plan view of the shaped abrasive particle 1800. The back plan view of the shaped abrasive particle 1800 is the same as the front plan view. FIG. 18*c* includes a side plan view of the shaped abrasive particle 1800. Both sides of the shaped abrasive particle 1800 are the same in plan view. FIG. 18*d* includes a top plan view of the shaped abrasive particle 1800 and FIG. 18*e* includes a bottom plan view of the shaped abrasive particle 1800.

As illustrated, the shaped abrasive particle 1800 includes a body 1802 attached to a base 1804. The body 1802 is generally fin-shaped and includes a length 1806, a width 1808, and a thickness 1808.

In a particular aspect, the body 1802 includes a rectangular cross-sectional shape in a plane defined by the length 1806 and the width 1808. Further, the body 1802 has a generally elliptical cross-sectional shape in a plane defined by the width 1808 and thickness 1810. In a particular aspect, an aspect ratio of the width 1808 to the thickness 1810 (w:t) is at least 2:1, such as at least 3:1, at least 4:1, at least 5:1, or at least 6:1. Further, in a particular aspect, w:t is no greater than 20:1, such as no greater than 15:1, no greater than 12:1, or no greater than 10:1.

In a particular aspect, the base 1804 of the shaped abrasive particle 1800 includes a diameter 1812 and a ratio of the diameter 1812 of the base 1804 to the width 1808 of the body 1802 (d:w) is at least 1:1, such as at least 2:1, at least 3:1, or at least 4:1. In another aspect, d:w is no greater than 10:1, no greater than 8:1, or no greater than 5:1.

As depicted, the body 1802 shaped abrasive particle 1800 includes a first surface 1814 and a second surface 1816 distanced therefrom. A side surface 1818 extends between the first surface 1814 and the second surface 1816. The side surface 1818 includes two side surface portions 1820 having a planar shape and two side surface portions 1822 having a convex shape. The two side portions 1822 having the convex shape are separated from each other by the two side portions 1820 having the planar shape. In a particular aspect, the shaped abrasive particle 1800 can be formed using one or more of the systems and methods, described herein.

FIG. 19*a* through FIG. 19*d* include a shaped abrasive particle 1900 in accordance with an embodiment. FIG. 19*a* through FIG. 19*e* include a shaped abrasive particle 1900 in accordance with an embodiment. FIG. 19*a* includes a perspective view of the shaped abrasive particle 1900. FIG. 19*b* includes a front plan view of the shaped abrasive particle 1900. The back plan view of the shaped abrasive particle 1900 is the same as the front plan view. FIG. 19*c* includes a side plan view of the shaped abrasive particle 1900. Both sides of the shaped abrasive particle 1900 are the same in plan view. FIG. 19*d* includes a top plan view of the shaped abrasive particle 1900. The bottom plan view of the shaped abrasive particle 1900 is the same as the top plan view.

As illustrated, the shaped abrasive particle 1900 is generally rake-shaped and includes a body 1902 having a central region 1904. A first group of castellated projections 1906 can extend from the central region 1904 of the body 1902 in a first direction. A second group of castellated projections 1908 can extend from the central region 1904 of the body 1902 in a second direction. In a particular aspect, the first group of castellated projections 1906 can have a length, LP1, and the second group of castellated projections 1908 can have a length, LP2. A ratio of LP1 to LP2 (LP1:LP2) can be at least 1:1, such as at least 1.5:1, or 2:1. In another aspect, LP1:LP2 may be no greater than 5:1, such as no greater than 4:1, or no greater than 3:1.

It can be appreciated that when used to form a coated abrasive article, the second group of castellated projections 1908 can extend into and adhere to a make coat that is disposed on a backing material. The first group of castellated projections 1906 can provide a plurality of grinding points for material removal during an abrasive operation. In a particular aspect, the shaped abrasive particle 1900 can be formed using one or more of the systems and methods, described herein.

Figure 20A:
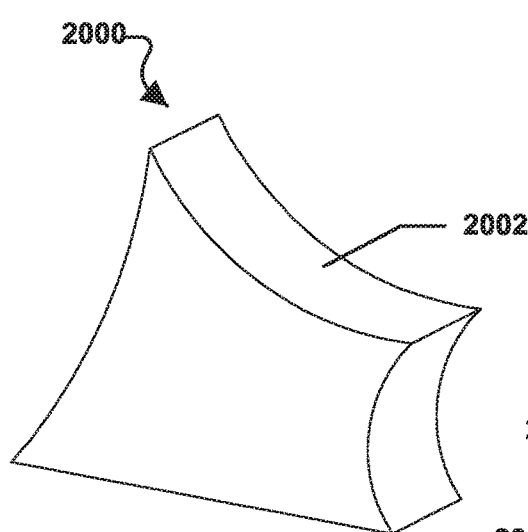
FIGS. 20a-20f include a shaped abrasive particle in accordance with an embodiment.
Figure 20B:
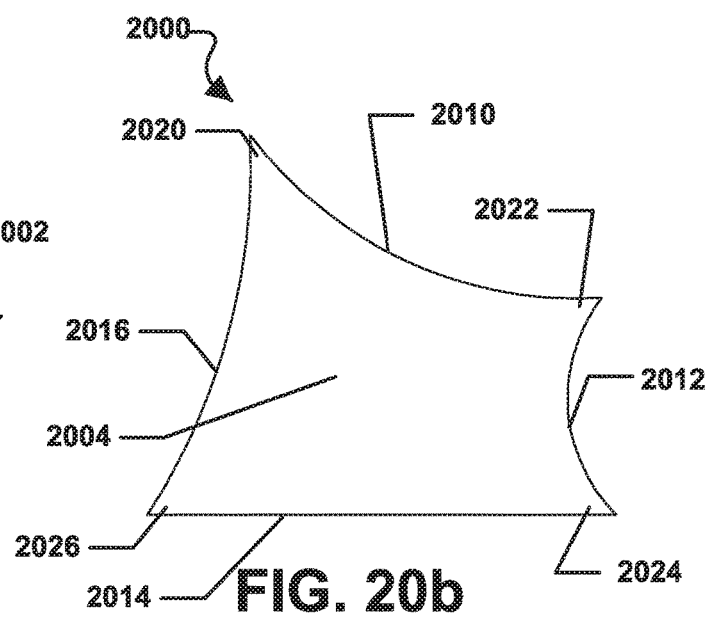
Figure 20C:
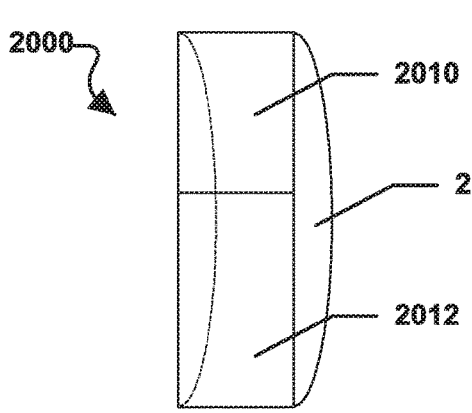
Figure 20D:
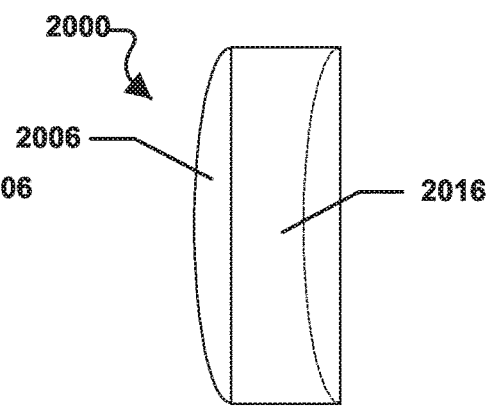
Figure 20E:
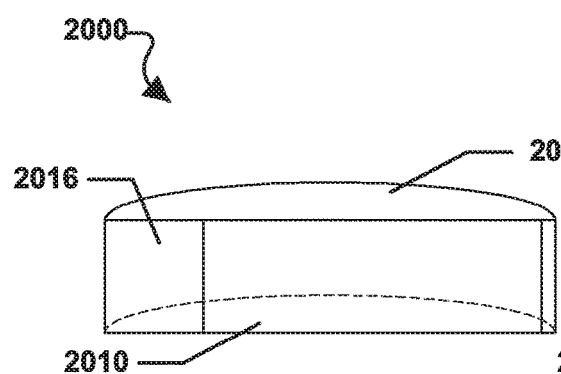
Figure 20F:
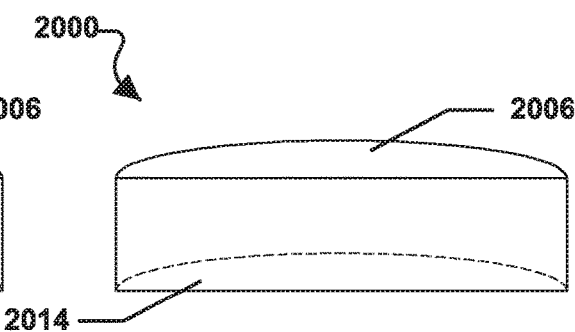

FIG. 20*a* through FIG. 20*f* include a shaped abrasive particle 2000 in accordance with an embodiment. FIG. 20*a* includes a perspective view of the shaped abrasive particle 2000. FIG. 20*b* includes a front plan view of the shaped abrasive particle 2000. The back plan view of the shaped abrasive particle 2000 is the same as the front plan view. FIG. 20c includes a first side plan view of the shaped abrasive particle 2000. FIG. 20d includes a second side plan view of the shaped abrasive particle 2000. FIG. 20e includes a top plan view of the shaped abrasive particle 2000 and FIG. 20f includes a bottom plan view of the shaped abrasive particle 2000.

As illustrated, the shaped abrasive particle 2000 includes a body 2002 having a first surface 2004 and a second surface 2006. Moreover, the body 2002 includes a side surface 2008 extending between the first surface 2004 and the second surface 2006. The side surface 2008 can include at least four distinct side surface portions, e.g., a first side surface portion 2010, a second side surface portion 2012, a third side surface portion 2014, and a fourth side surface portion 216. As shown, the side surface portions 2010, 2012, 2014, 2016 may be separated by at least four exterior corners 2020, 2022, 2024, 2026.

As indicated in FIG. 20a through FIG. 20f, at least one of the side surface portions 2010, 2012, 2014, 2016 can include a concave contour. Further, the shaped abrasive particle 2000 can have a curved shape in which the first surface 2004 includes a substantially concave curvature and the second surface 2006 includes a substantially convex curvature. In a particular aspect, the shaped abrasive particle 2000 can be formed using one or more of the systems and methods, described herein.

FIG. 21a through FIG. 21e include a shaped abrasive particle 2100 in accordance with an embodiment. FIG. 21a includes a perspective view of the shaped abrasive particle 2100. FIG. 21b includes a front plan view of the shaped abrasive particle 2100. The back plan view is the same as the front plan view. FIG. 21c includes a side plan view of the shaped abrasive particle 2100. Both side plan views are the same. FIG. 21d includes a top plan view of the shaped abrasive particle 2100 and FIG. 21e includes a bottom plan view of the shaped abrasive particle 2100.

As indicated, the shaped abrasive particle 2100 can include a body 2102 that is generally toothed and includes a plurality of teeth 2104 extending from one side of the body 2102. As shown, the teeth 2014 may define external corners of the body 2102 and can include an average spacing 2106 between adjacent teeth 2104 of less than 0.5L, where L defines the length 2108 of the body. In another aspect, each of the teeth 2104 can include a tooth height and at least some of the teeth 2104 have a different height when compared to other teeth 2104 of the plurality of teeth 2104. In yet another aspect, each of the teeth 2104 can have the same height. Further, in another aspect, the body 2102 can include a peripheral surface and all of the teeth 2104 can be uniformly distributed around the peripheral surface. In another aspect, the teeth may be non-uniformly distributed around the peripheral surface of the body 2102. In another aspect, each of the teeth of the plurality of teeth 2104 defines a single point on the body 2102. In another aspect, each of the teeth of the plurality of teeth 2104 defines multiple points on the body 2102. In a particular aspect, the shaped abrasive particle 2100 can be formed using one or more of the systems and methods, described herein.

Figures 22A, 22B:
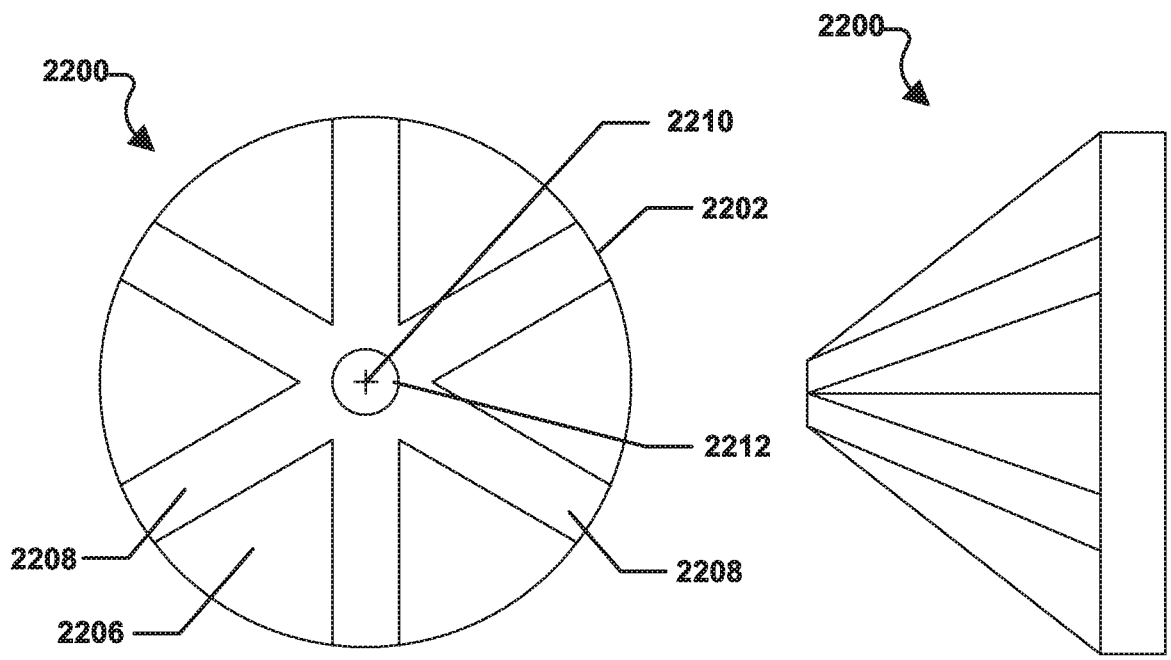
FIGS. 22a-22d include a shaped abrasive particle in accordance with an embodiment.
Figures 22C, 22D:
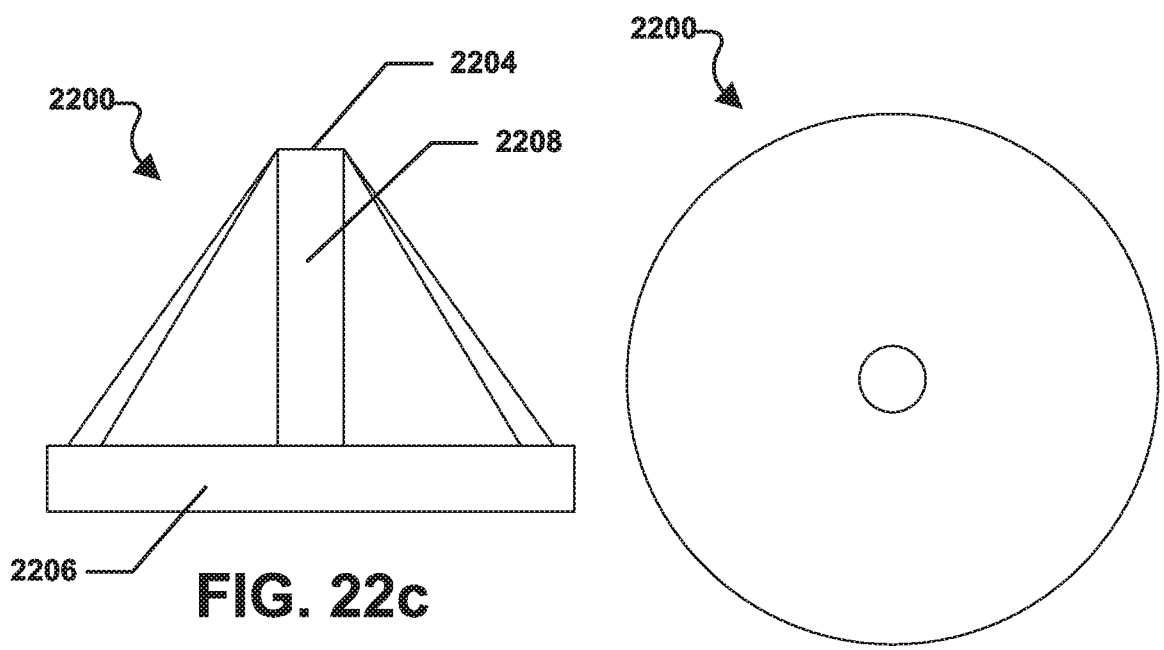

FIG. 22a through FIG. 22d include a shaped abrasive particle 2200 in accordance with an embodiment. FIG. 22a includes a top plan view of the shaped abrasive particle 2200. FIG. 22b is a side plan view of the shaped abrasive particle 2200. The opposite side plan view is the same. FIG. 22c is a front plan of the shaped abrasive particle 2200. The back plan view is the same as the front. FIG. 22d is a bottom plan view of the shaped abrasive particle 2200.

As indicated, the shaped abrasive particle 2200 can include a body 2202 having a first surface 2204 and a base 2206 spaced a distance from the first surface 2204. A plurality of structures 2208 can extend between the base 2206 and the first surface 2204 in an outward direction from a center 2210 of the body 2202. Each of the plurality of structures 2208 can include an isosceles triangle and each of the plurality of structures 2208 can be attached in the central region of the body 2202. Further, the body 2202 can include a bore 2212 that can extend along a length of the body 2202 and through the center 2210 of the body 2202. In a particular aspect, the shaped abrasive particle 2200 can be formed using one or more of the systems and methods, described herein.

Figure 23A:
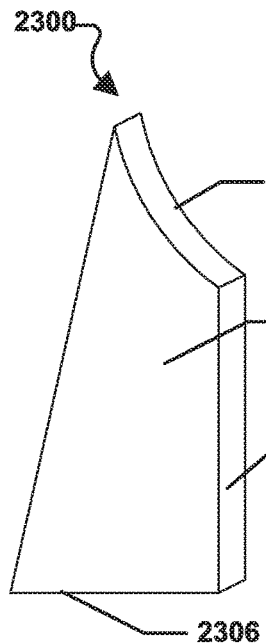
FIGS. 23a-23f include a shaped abrasive particle in accordance with an embodiment.
Figure 23B:
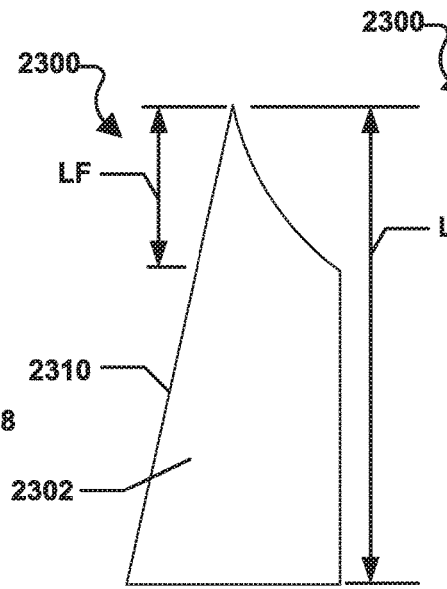
Figure 23C:
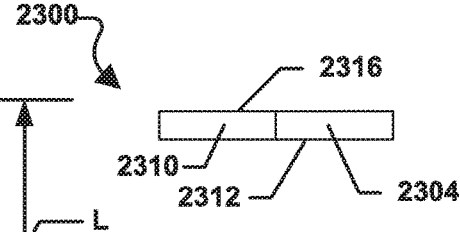
Figure 23D:
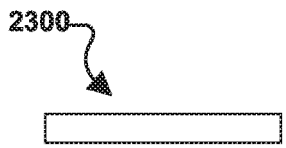
Figure 23E:
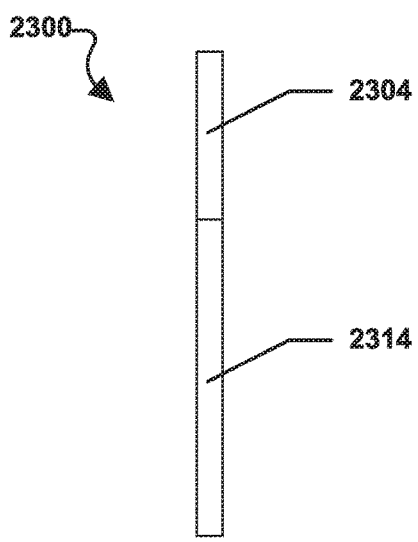
Figure 23F:
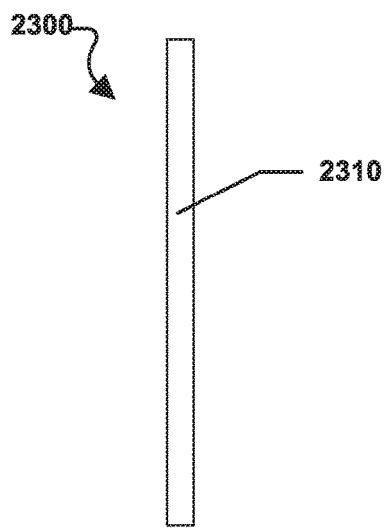

FIG. 23a through FIG. 23f include a shaped abrasive particle 2300 in accordance with an embodiment. FIG. 23a is a perspective view of the shaped abrasive particle 2300. FIG. 23b is a front plan view of the shaped abrasive particle 2300. The back plan view is the same as the front—only in reverse. FIG. 23c is a top plan view of the shaped abrasive particle 2300. FIG. 23d is a bottom plan view of the shaped abrasive particle 2300. FIG. 23e is a first side plan view of the shaped abrasive particle 2300 and FIG. 23f is a second side plan view of the shaped abrasive particle 2300.

As illustrated, the shaped abrasive particle 2300 can include a body 2302 having a first surface 2304 and a second surface 2306. A side surface 2308 can extend between the first surface 2304 and the second surface 2306. The side surface 2308 can include a first side surface portion 2310, a second side surface portion 2312, a third side surface portion 2314, and a fourth side surface portion 2316. In particular, the first surface 2304 of the body 2302 is concave and the first side surface portion 2310 can extend to the first surface 2304 to form a flashing 2318 on the body 2302 of the shaped abrasive particle 2300. The flashing 2318 can have a flashing length, LF, and the body 2302 can include a length, L. A ratio of the length of the body 2302 to the flashing length, L:LF, can be at least 10:1 such as at least 9:1, at least 8:1, at least 7:1, or at least 6:1. Further, the L:LF may be no greater than 2:1, no greater than 3:1, or no greater than 4:1. The increase length of the flashing 2318 can extend the useful life of the shaped abrasive grain 2300 and a coated abrasive article, such as an abrasive belt, on which the shaped abrasive grain 2300 is deposited. In a particular aspect, the shaped abrasive particle 2300 can be formed using one or more of the systems and methods, described herein.

Figure 24A:
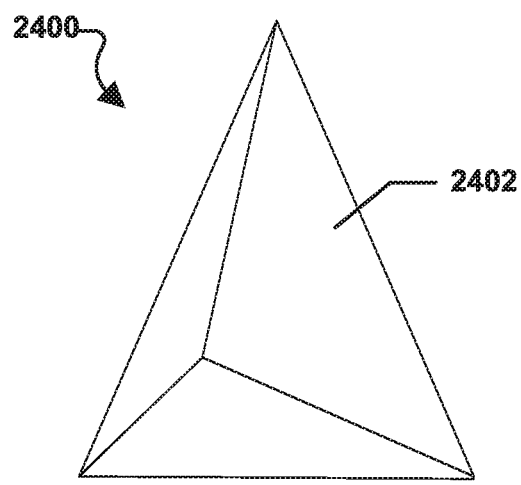
FIGS. 24a-24f include a shaped abrasive particle in accordance with an embodiment.
Figure 24B:
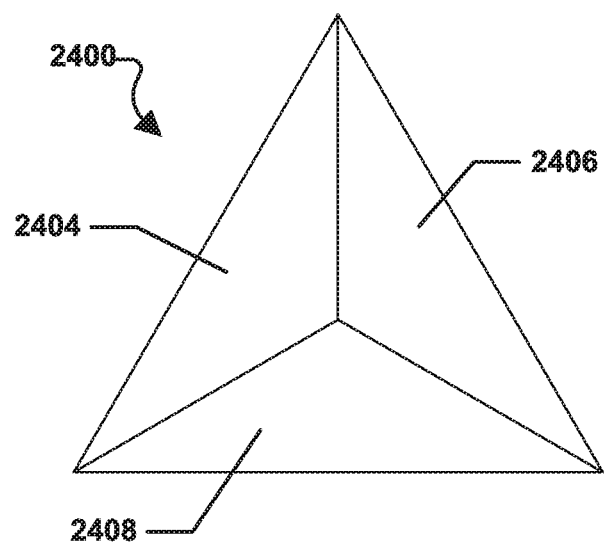
Figure 24C:
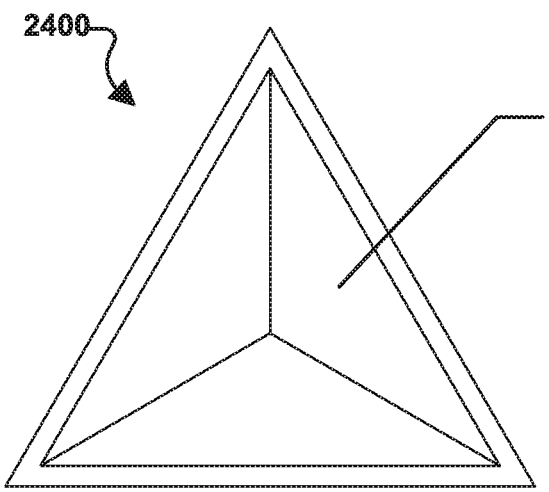
Figure 24D:
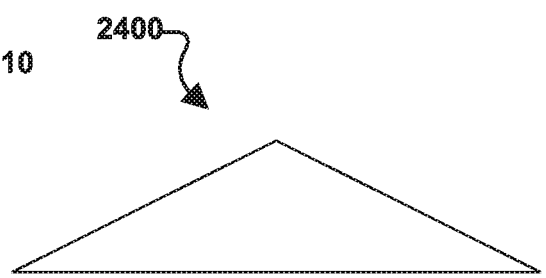
Figure 24E:
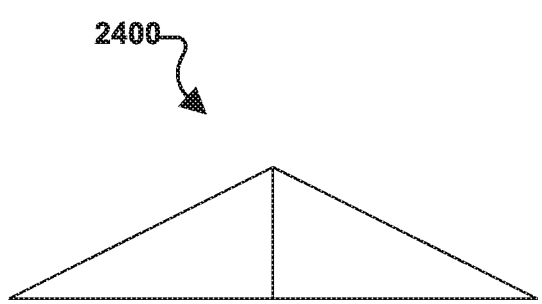
Figure 24F:
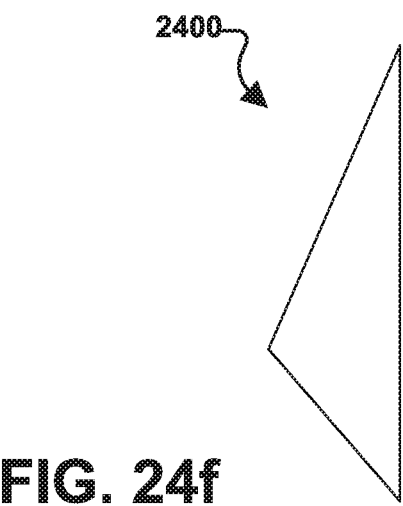

FIG. 24a through FIG. 24f include a shaped abrasive particle 2400 in accordance with an embodiment. FIG. 24a is a perspective view of the shaped abrasive particle 2400. FIG. 24b is a top plan view of the shaped abrasive particle 2400. FIG. 24c is a bottom plan view of the shaped abrasive particle 2400. FIG. 24d is a front plan view of the shaped abrasive particle 2400. FIG. 24e is a top plan view of the shaped abrasive particle 2400 and FIG. 24f is a side plan view of the shaped abrasive particle 2400. Both side plan views are the same.

The shaped abrasive particle 2400 includes a body 2402 having a first surface 2404, a second surface 2406, and a third surface 2408 that are connected to each other to form a pyramid shape with a hollow interior 2410. In a particular aspect, the shaped abrasive particle 2400 can be formed using one or more of the systems and methods, described herein.

Figure 25A:
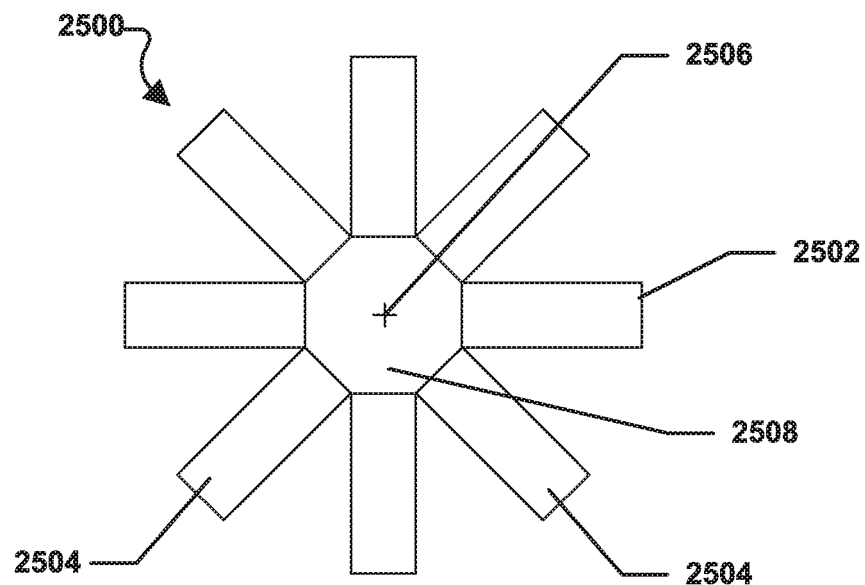
FIGS. 25a-25b include a shaped abrasive particle in accordance with an embodiment.
Figure 25B:
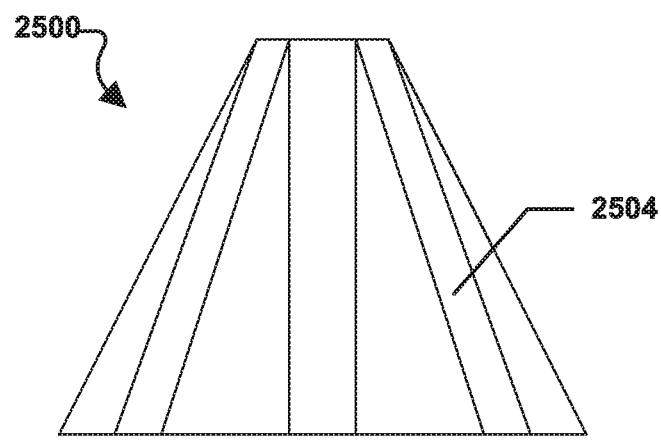

FIG. 25a through FIG. 25b include a shaped abrasive particle 2500 in accordance with an embodiment. FIG. 25a is a top plan view of the shaped abrasive particle 2500. The bottom plan view is the same. FIG. 25b is a side plan view of the shaped abrasive particle 2500. Both side plan views, the front plan view, and the rear plan view of the shaped abrasive particle 2500 are the same.

As indicated, the shaped abrasive particle 2500 can include a body 2502 having a plurality of structures 2504 equally spaced around a center 2506 of the body 2502. Each of the plurality of structures 2504 can include an isoceles triangle shape and each of the plurality of structures 2504 can be attached, or otherwise bonded, to adjacent structures 2504 to form an opening 2506, or hole that extends along a length of the body 2502 through the center 2510 of the body 2502. In a particular aspect, the shaped abrasive particle 2500 can be formed using one or more of the systems and methods, described herein.

Figure 26A:
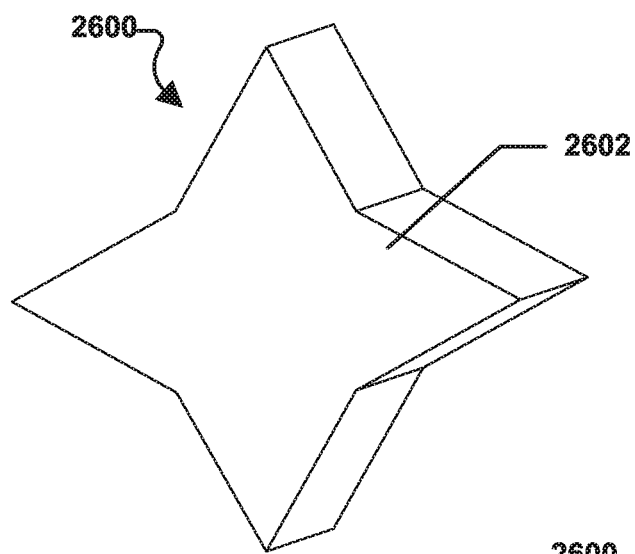
FIGS. 26a-26c include a shaped abrasive particle in accordance with an embodiment.
Figure 26B:
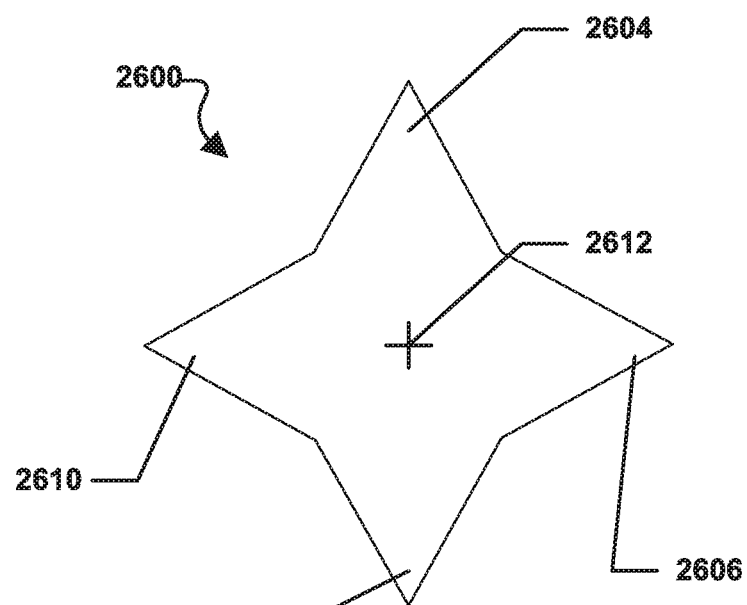
Figure 26C:
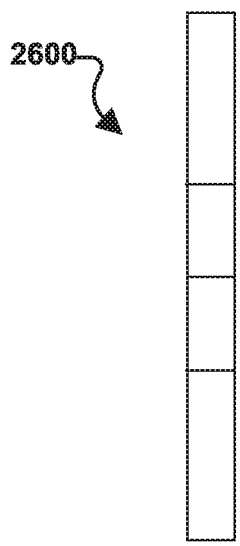

FIG. 26a through FIG. 26c include a shaped abrasive particle 2600 in accordance with an embodiment. FIG. 26a is a perspective view of the shaped abrasive particle 2600. FIG. 26b is a front plan view of the shaped abrasive particle 2600. The back plan view is the same. FIG. 26c is a side plan view of the shaped abrasive particle 2600. Both side plan views, the top plan view, and the bottom plan view are the same. Mention that the arms on these stars are thicker at the base.

As illustrated, the shaped abrasive particle 2600 can include a body 2602. The body 2602 can be generally star shaped and flat. Moreover, the body 2602 can include a first point 2604, a second point 2606, a third point 2608, and a fourth point 2610. The points 2604, 2606, 2608, 2610 can be equally spaced around a center 2612 of the body 2602. In a particular aspect, the shaped abrasive particle 2600 can be formed using one or more of the systems and methods, described herein.

Figure 27A:
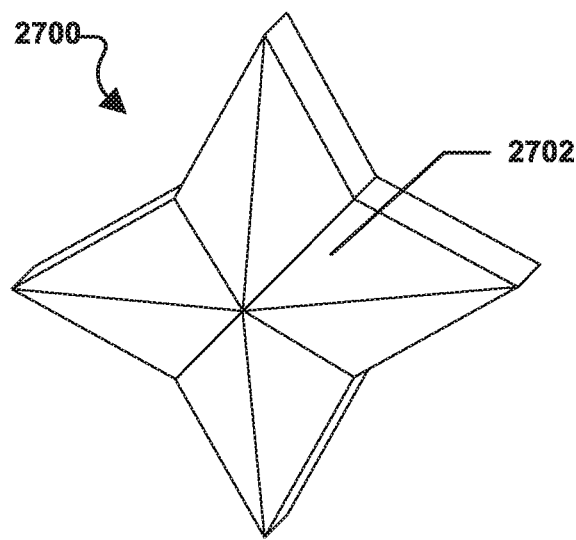
FIGS. 27a-27c include a shaped abrasive particle in accordance with an embodiment.
Figure 27B:
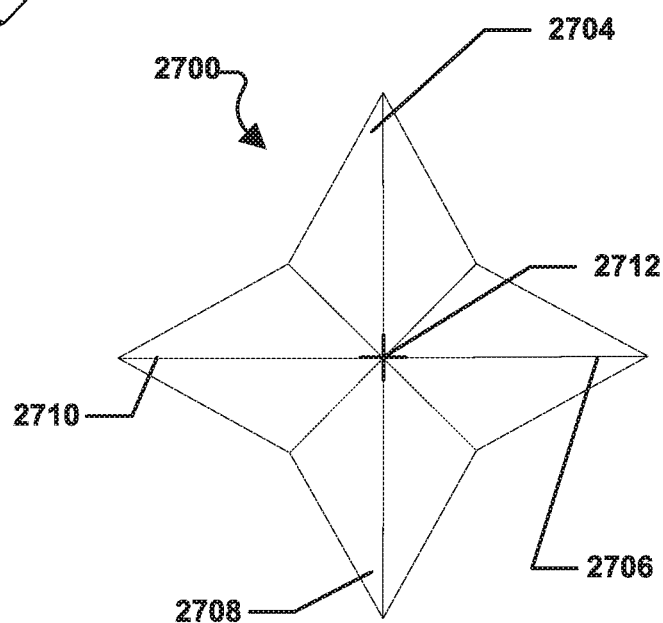
Figure 27C:
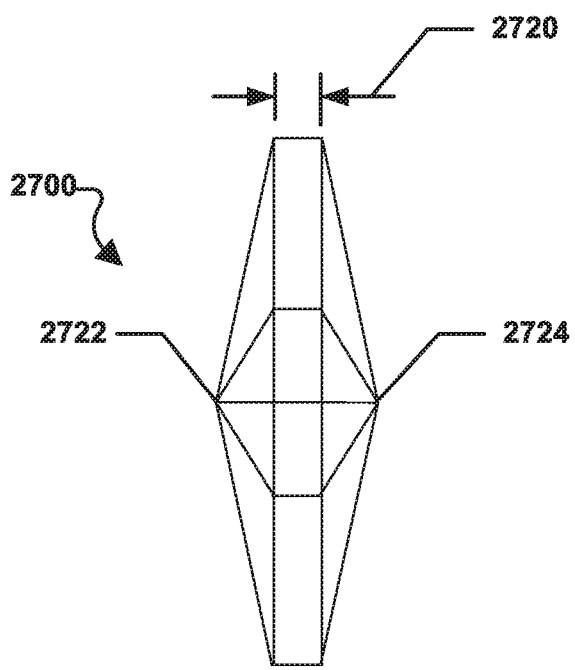

FIG. 27a through FIG. 27c include a shaped abrasive particle 2700 in accordance with an embodiment. FIG. 27a is a perspective view of the shaped abrasive particle 2700. FIG. 27b is a front plan view of the shaped abrasive particle 2700. The back plan view is the same. FIG. 27c is a side plan view of the shaped abrasive particle 2700. Both side plan views, the top plan view, and the bottom plan view are the same.

As illustrated, the shaped abrasive particle 2700 can include a body 2702. The body 2702 can be generally star shaped. Moreover, the body 2702 can include a first point 2704, a second point 2706, a third point 2708, and a fourth point 2710. The points 2704, 2706, 2708, 2710 can be equally spaced around a center 2712 of the body 2702. Moreover, the body 2702 of the shaped abrasive particle 2700 can have a thickness 2720 that increases from each point 2704, 2706, 2708, 2710 to the center 2712 of the body 2702. Further, the body 2702 can include a first central point 2722 and a second central point 2724 opposite the first central point 2722. In a particular aspect, the shaped abrasive particle 2700 can be formed using one or more of the systems and methods, described herein.

Figure 28A:
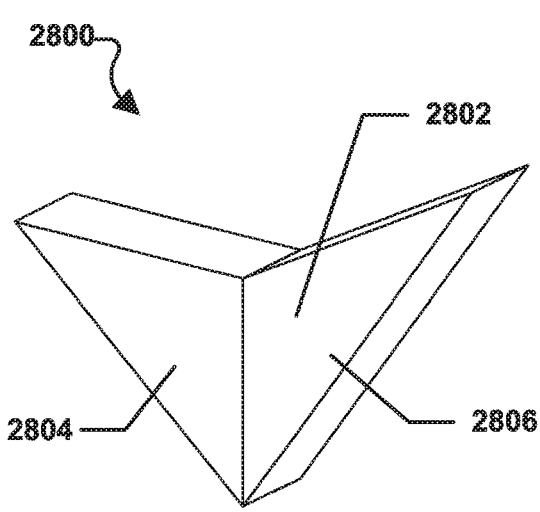
FIGS. 28a-28e include a shaped abrasive particle in accordance with an embodiment.
Figure 28B:
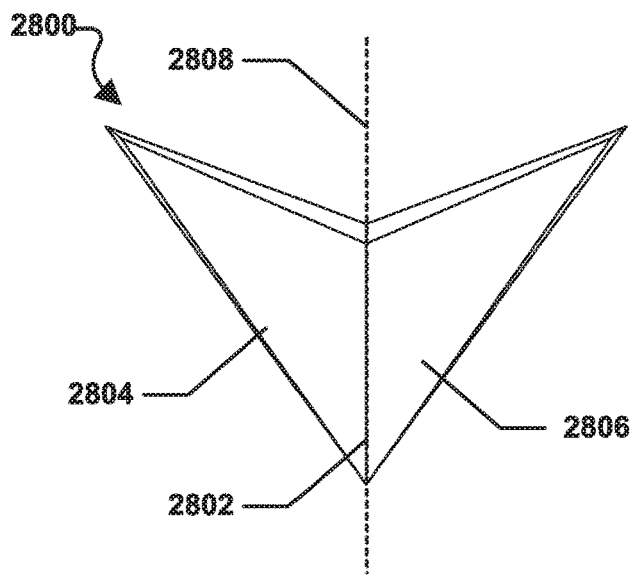
Figure 28C:
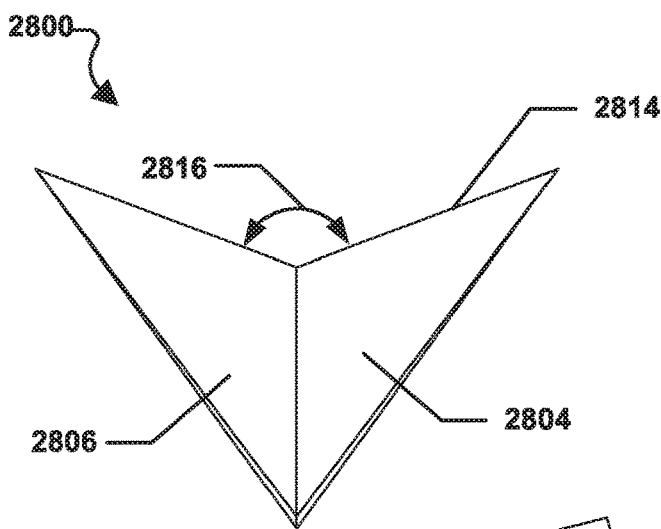
Figure 28D:
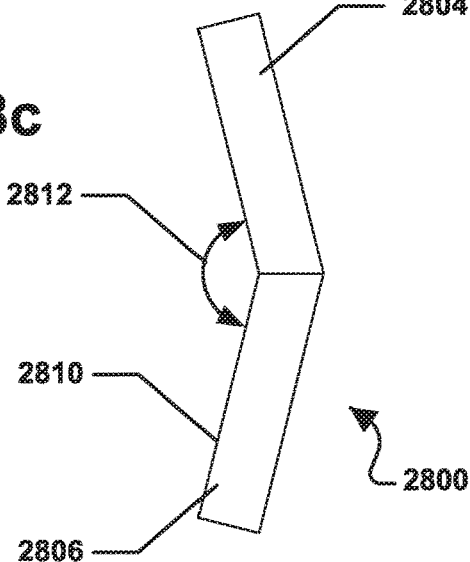
Figure 28E:
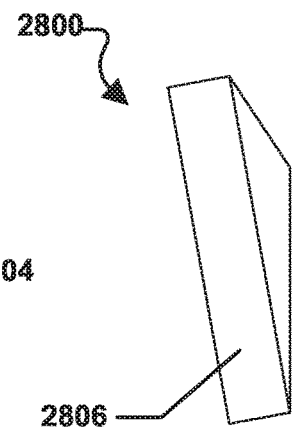

FIG. 28a through FIG. 28e include a shaped abrasive particle 2800 in accordance with an embodiment. FIG. 28a includes a perspective view of the shaped abrasive particle 2800. FIG. 28b includes a front plan view of the shaped abrasive particle 2800. FIG. 28c includes a back plan view of the shaped abrasive particle 2800. FIG. 28d is a bottom plan view of the shaped abrasive particle 2800. The top plan view is the same as the bottom. FIG. 28e is a side plan view of the shaped abrasive particle 2800. Both side plan views are the same.

As illustrated, the shaped abrasive particle 2800 can include a body 2802 having a first triangular portion 2804 and a second triangular portion 2806. The triangular portions 2804, 2806 can be bonded, or otherwise fused, to each other along a central axis 2808. In particular, the triangular portions 2804, 2806 can be bonded to each other so that a side surface 2810 formed after bonding the triangular portions 2804, 2806 together includes an angle 2812.

The angle 2812 of the side surface 2810 can be less than or equal to 180°, such as less than or equal to 170°, less than or equal to 160°, less than or equal to 150°, less than or equal to 140°, or less than or equal to 130°. In another aspect, the angle 2812 of the side surface can be greater than or equal to 90°, such as greater than or equal to 100°, greater than or equal to 110°, or greater than or equal to 120°.

In another aspect, the triangular portions 2804, 2806 can be shaped so that a first surface 2814 formed when the triangular portions 2804, 2806 are bonded together also includes an angle 2816. The angle 2816 of the first surface 2814 can be less than or equal to 180°, such as less than or equal to 170°, less than or equal to 160°, less than or equal to 150°, less than or equal to 140°, or less than or equal to 130°. In another aspect, the angle 2816 of the first surface 2814 can be greater than or equal to 90°, such as greater than or equal to 100°, greater than or equal to 110°, or greater than or equal to 120°. In a particular aspect, the shaped abrasive particle 2800 can be formed using one or more of the systems and methods, described herein.

In another aspect, the triangular portions 2804, 2806 of the body 2802 of the shaped abrasive particle 2800 can be considered flanges and as shown, the flanges can extend in different planes with respect to each other at one or more of the angles described.

FIG. 29a through FIG. 29c include a shaped abrasive particle 2900 in accordance with an embodiment. FIG. 29a is a top plan view of the shaped abrasive particle 2900. The bottom plan view is the same as the top plan view. FIG. 29b is a side plan view of the shaped abrasive particle 2900. Both side plan views, the front plan view, and the rear plan view of the shaped abrasive particle 2900 are the same. FIG. 29c is a cross sectional view of the shaped abrasive particle 2900.

As illustrated, the shaped abrasive particle 2900 includes a body 2902. The body 2902 is toroid shaped, or annular, and includes the cross-sectional shape depicted in FIG. 29c. In particular, the body 2902 of shaped abrasive particle 2900 includes a first major surface 2904 and a second major surface 2906. A first side surface 2908 can extend between the first major surface 2904 and the second major surface 2906. As depicted in FIG. 29c, the first side surface 2908 is linear in cross-section. The body 2902 can also include a second side surface 2910 that can extend between the first major surface 2904 and the second major surface 2906. As shown in FIG. 29c, the second side surface 2910 is concave in cross-section. In a particular aspect, the shaped abrasive particle 2900 can be formed using one or more of the systems and methods, described herein.

FIG. 30a through FIG. 30d include a shaped abrasive particle 3000 in accordance with an embodiment. FIG. 30a is a top plan view of the shaped abrasive particle 3000. FIG. 30b is a bottom plan view of the shaped abrasive particle 3000. FIG. 30b is a side plan view of the shaped abrasive particle 3000. Both side plan views, the front plan view, and the rear plan view of the shaped abrasive particle 3000 are the same. FIG. 30c is a cross sectional view of the shaped abrasive particle 3000.

As illustrated, the shaped abrasive particle 3000 includes a body 3002. The body 3002 is toroid shaped and includes the cross-sectional shape depicted in FIG. 30c. In particular, the body 3002 of shaped abrasive particle 3000 includes a first major surface 3004 and a second major surface 3006. A first side surface 3008 can extend between the first major surface 3004 and the second major surface 3006. As depicted in FIG. 30c, the first side surface 3008 is linear in cross-section. The body 3002 can also include a second side surface 3010 that can extend between the first major surface 3004 and the second major surface 3006. As shown in FIG. 30c, the second side surface 3008 is linear in cross-section and can form an angle 3012 with respect to the second major surface 3004.

The angle 3012 can be greater than or equal to 45°, such as greater than or equal 50°, greater than or equal 55°, or greater than or equal 60°. Further, the angle 3012 can be less than or equal to 85°, such as less than or equal to 80°, less than or equal to 75°, less than or equal to 70°, or less than or equal to 65°. In a particular aspect, the shaped abrasive particle 3000 can be formed using one or more of the systems and methods, described herein.

FIG. 31a through FIG. 31c include a shaped abrasive particle in accordance with an embodiment. FIG. 31a is a top plan view of the shaped abrasive particle 3100. The bottom plan view is the same as the top plan view. FIG. 31b is a side plan view of the shaped abrasive particle 3100. Both side plan views, the front plan view, and the rear plan view of the shaped abrasive particle 3100 are the same. FIG. 31c is a cross sectional view of the shaped abrasive particle 3100.

As illustrated, the shaped abrasive particle 3100 includes a body 3102. The body 3102 is toroid shaped and includes the cross-sectional shape depicted in FIG. 31c. In particular, the body 3102 of shaped abrasive particle 3100 includes a first major surface 3104 and a second major surface 3106. A first side surface 3108 can extend between the first major surface 3104 and the second major surface 3106. As depicted in FIG. 31c, the first side surface 3108 is linear in cross-section. The body 3102 can also include a second side surface 3110 that can extend between the first major surface 3104 and the second major surface 3106. As shown in FIG. 31c, the second side surface 3108 is can include a first portion 3112 and a second portion 3114. The first portion 3112 of the second side surface 3110 can form an angle 3116 with respect to the second portion 3114 of the second side surface 3110.

The angle 3116 can be greater than or equal to 90°, such as greater than or equal 100°, greater than or equal 110°, or greater than or equal 120°. Further, the angle 3116 can be less than or equal to 170°, such as less than or equal to 160°, less than or equal to 150°, less than or equal to 140°, or less than or equal to 130°. In a particular aspect, the shaped abrasive particle 3100 can be formed using one or more of the systems and methods, described herein.

FIG. 32a through FIG. 32c include a shaped abrasive particle in accordance with an embodiment. FIG. 32a is a top plan view of the shaped abrasive particle 3200. The bottom plan view is the same as the top plan view. FIG. 32b is a side plan view of the shaped abrasive particle 3200. Both side plan views, the front plan view, and the rear plan view of the shaped abrasive particle 3200 are the same. FIG. 32c is a cross sectional view of the shaped abrasive particle 3200.

As illustrated, the shaped abrasive particle 3200 includes a body 3202. The body 3202 is toroid shaped and includes the cross-sectional shape depicted in FIG. 32c. In particular, the body 3202 of shaped abrasive particle 3200 includes a first major surface 3204 and a second major surface 3206. A first side surface 3208 can extend between the first major surface 3204 and the second major surface 3206. As depicted in FIG. 32c, the first side surface 3208 is concave in cross-section. The body 3202 can also include a second side surface 3210 that can extend between the first major surface 3204 and the second major surface 3206. As shown in FIG. 32c, the second side surface 3210 is concave in cross-section. It can be appreciated that either the first side surface 3208, the second side surface 3210, or both side surfaces 3208, 3210 can be convex is cross-section. In a particular aspect, the shaped abrasive particle 3200 can be formed using one or more of the systems and methods, described herein.

Figures 33A, 33B:
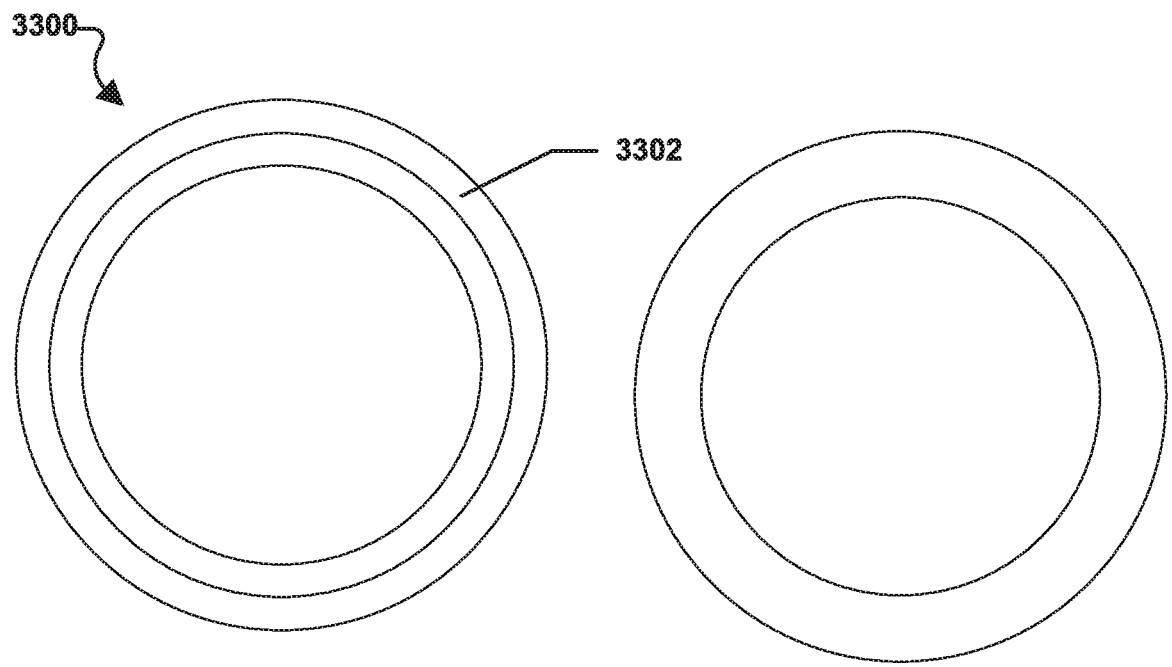
FIGS. 33a-33d include a shaped abrasive particle in accordance with an embodiment.
Figure 33C:

FIG. 33a through FIG. 33d include a shaped abrasive particle in accordance with an embodiment. FIG. 33a is a top plan view of the shaped abrasive particle 3300. FIG. 33b is a bottom plan view of the shaped abrasive particle 3300. FIG. 33b is a side plan view of the shaped abrasive particle 3300. Both side plan views, the front plan view, and the rear plan view of the shaped abrasive particle 3300 are the same. FIG. 33c is a cross sectional view of the shaped abrasive particle 3300.

Figure 33D:
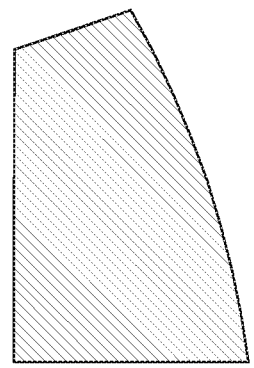

As illustrated, the shaped abrasive particle 3300 includes a body 3302. The body 3302 is toroid shaped, or annular with a central opening extending through the body 3302 and a rounded contour, and includes the cross-sectional shape depicted in FIG. 33c. In particular, the body 3302 of shaped abrasive particle 3300 includes a first major surface 3304 and a second major surface 3306. As shown in FIG. 33d, in cross-section, the first major surface 3304 is not parallel to the second major surface 3306. Also, the first major surface 3304 is linear in cross-section. However, it can be appreciated that the first major surface 3304 can be concave, rounded, or otherwise non-planar, in cross-section.

As illustrated, a first side surface 3308 can extend between the first major surface 3304 and the second major surface 3306. As depicted in FIG. 33c, the first side surface 3308 is linear in cross-section. The first major surface 3304 can form an angle 3310 with respect to the first side surface 3308.

In a particular aspect, the angle 3310 can be greater than or equal to 95°, such as greater than or equal 100°, greater than or equal 105°, or greater than or equal 110°. Further, the angle 3310 can be less than or equal to 150°, such as less than or equal to 140°, less than or equal to 130°, or less than or equal to 120°. The body 3302 can also include a second side surface 3312 that can extend between the first major surface 3304 and the second major surface 3306. As shown in FIG. 33c, the second side surface 3312 is concave in cross-section. In a particular aspect, the shaped abrasive particle 3300 can be formed using one or more of the systems and methods, described herein.

FIG. 34a through FIG. 34e include a shaped abrasive particle 3400 in accordance with an embodiment. FIG. 34a is a perspective view of the shaped abrasive particle 3400. FIG. 34b is a front plan view of the shaped abrasive particle 3400. The back plan view is the same as the front plan view. FIG. 34c is a top plan view of the shaped abrasive particle 3400. The bottom plan view of the shaped abrasive particle 3400 is the same as the top plan view. FIG. 34d is a side plan view of the shaped abrasive particle 3400. Both side plan views of the shaped abrasive particle 3400 are the same.

As illustrated, the shaped abrasive particle 3400 can include a body 3402 having a first triangular portion 3404 and a second triangular portion 3406. The triangular portions 3404, 3406 can be bonded, or otherwise fused, to each other along a side surface 3408, 3410 of each triangular portion 3404, 3406. In particular, the triangular portions 3404, 3406 can be bonded to each other so that in the side plan view of FIG. 34b, a first surface 3412 of the first triangular portion 3404 can form an angle 3414 with respect to a first surface 3416 of the second triangular portion 3406.

The angle 3414 can be less than or equal to 120°, such as less than or equal to 110°, less than or equal to 100°, or less than or equal to 90°. In another aspect, the angle 3414 of can be greater than or equal to 50°, such as greater than or equal to 60°, greater than or equal to 70°, or greater than or equal to 80°. In another aspect, the first triangular portion 3404 can include a second surface 3418 and the second triangular portion 3406 can include a second surface 3420. When the triangular portions 3404, 3406 are bonded together, as depicted, the second surface 3418 of the first triangular portion 3404 can be coplanar with the second surface 3420 of the second triangular portion 3406, e.g., to form a base for the shaped abrasive particle 3400. In a particular aspect, the shaped abrasive particle 3400 can be formed using one or more of the systems and methods, described herein.

FIG. 35a through FIG. 35e include a shaped abrasive particle 3500 in accordance with an embodiment. FIG. 35a includes a perspective view of the shaped abrasive particle 3500. FIG. 35b includes a front plan view of the shaped abrasive particle 3500. The back plan view is the same as the front plan view. FIG. 35c is a side plan view of the shaped abrasive particle 3500. Both side plan views are the same. FIG. 35d is a top plan view of the shaped abrasive particle 3500 and FIG. 35e is a bottom plan view of the shaped abrasive particle 3500.

As illustrated, the shaped abrasive particle 3500 can include a body 3502 having a first triangular portion 3504 and a second triangular portion 3506. The triangular portions 3504, 3506 can be bonded, or otherwise fused, to each other along a side surface 3508, 3510 of each triangular portion 3504, 3506. In particular, the triangular portions 3504, 3506 can be equilateral triangles and the triangular portions 3504, 3506 can be bonded to each other so that in the side plan view of FIG. 35b, the shaped abrasive particle 3500 can be shaped like a six-point star. In a particular aspect, the shaped abrasive particle 3500 can be formed using one or more of the systems and methods, described herein.

FIG. 36a through FIG. 36e include a twenty-seventh shaped abrasive particle 3900 in accordance with an embodiment. FIG. 36a is a perspective view of the twenty-seventh shaped abrasive particle 3900. FIG. 36b is a front plan view of the twenty-seventh shaped abrasive particle 3900. The back plan view is the same as the front plan view. FIG. 36c is a top plan view of the twenty-seventh shaped abrasive particle 3900. FIG. 36d is a bottom plan view of the twenty-seventh shaped abrasive particle 3900. FIG. 36e is a side plan view of the twenty-seventh shaped abrasive particle 3900. Both side plan views of the twenty-seventh shaped abrasive particle 3900 are the same.

The shaped abrasive particle 3900 can include a body 3902 that can be formed by creating a layer of material from a mixture comprising a precursor ceramic material. The body 3902 can include a pattern 3904 formed in an upper surface 3906 of the body 3902. The pattern 3904 can be formed by altering the upper surface 3906 of the body 3902 by exposing it to a gaseous or liquid material in order to create the pattern 3904 in the upper surface 3906 of the body 3902, e.g., the layer of material that forms the body 3902. In a particular aspect, the shaped abrasive particle 3900 can be formed into a plurality of abrasive particles, e.g., by crushing the shaped abrasive particle 3900. In such a case, at least a portion of the abrasive particles formed from the shaped abrasive particle 3900 can include a surface having at least a portion of the pattern created in the upper surface 3906 of the layer making up the body 3902. In a particular aspect, the shaped abrasive particle 3900 can be formed using one or more of the systems and methods, described herein. In particular, the shaped abrasive particle 3900 can be formed by first forming a sheet of gel and then, agitating surface of the sheet of gel, e.g., using air driven by a fan blade or impeller, before the gel is dried in order to create waves or ripple features in the upper surface of the sheet of gel to achieve the pattern shown in the abrasive particle 3900.

FIG. 37a through FIG. 37e include a shaped abrasive particle 4000 in accordance with an embodiment. FIG. 37a through FIG. 37e include a shaped abrasive particle 4000 in accordance with an embodiment. FIG. 37a is a perspective view of the shaped abrasive particle 4000. FIG. 37b is a front plan view of the shaped abrasive particle 4000. The back plan view is the same as the front plan view. FIG. 37c is a top plan view of the shaped abrasive particle 4000. FIG. 37d is a bottom plan view of the shaped abrasive particle 4000. FIG. 37e is a side plan view of the shaped abrasive particle 4000. Both side plan views of the shaped abrasive particle 4000 are the same.

The shaped abrasive particle 4000 can include a body 4002 that can be formed by creating a layer of material from a mixture comprising a precursor ceramic material. The body 4002 can include a pattern 4004 formed in an upper surface 4006 of the body 4002. The pattern 4004 can be formed by altering the upper surface 4006 of the body 4002 by exposing it to a gaseous or liquid material in order to create the pattern 4004 in the upper surface 4006 of the body 4002, e.g., the layer of material that forms the body 4002. In a particular aspect, the shaped abrasive particle 4000 can be formed into a plurality of abrasive particles, e.g., by crushing the shaped abrasive particle 4000. In such a case, at least a portion of the abrasive particles formed from the shaped abrasive particle 4000 can include a surface having at least a portion of the pattern created in the upper surface 4006 of the layer making up the body 4002. In a particular aspect, the shaped abrasive particle 4000 can be formed using one or more of the systems and methods, described herein. In particular, the shaped abrasive particle 4000 can be formed by first forming a sheet of gel and then, agitating surface of the sheet of gel, e.g., using air driven by a fan blade or impeller, before the gel is dried in order to create waves or ripple features in the upper surface of the sheet of gel to achieve the pattern shown in the abrasive particle 4000.

FIG. 38a through FIG. 38f include a shaped abrasive particle 4100 in accordance with an embodiment. FIG. 38a is a perspective view of the shaped abrasive particle 4100. FIG. 38b is a front plan view of the shaped abrasive particle 4100. The back plan view is the same as the front. FIG. 38c is a top plan view of the shaped abrasive particle 4100. FIG. 38d is a bottom plan view of the shaped abrasive particle 4100. FIG. 38e is a first side plan view of the shaped abrasive particle 4100 and FIG. 38f is a second side plan view of the shaped abrasive particle 4100. In a particular aspect, the shaped abrasive particle 4100 can be formed using a screen printing process and overfilling the screen in one direction as described herein.

As depicted, the shaped abrasive particle 4100 can include a body 4102 having a first surface 4104 and a second surface 4106. A side surface 4108 can extend between the first surface 4104 and the second surface 4106. The body 4102 can also include a flange 4110 that can extend from the side surface 4108 and the first surface 4104. In a particular aspect, the flange 4110 can include a rounded shape. Further, the flange 4110 can include a flange length 4112. The flange length 4112 can be less than a length 4114 of the body 4102. In another aspect, the flange 4110 can include a height 4116 and the height 4116 of the flange 4110 is not greater than a thickness 4118 of the body 4102. In another aspect, the body 4102 can only include a single flange 4110 and the flange 4110 extends along the periphery of the body 4102 for a distance that is not greater than 50% of the total peripheral length of the body 4102. In particular, the flange can extend around at least one exterior corner of the body 4102 and not greater than three exterior corners.

The body 4102 can include a narrow end 4120 and wide end 4122. The flange 4110 can extend from the narrow end 4120 of the body 4102. In a particular aspect, the shaped abrasive particle 4100 can be formed using one or more of the systems and methods, described herein.

FIG. 39a through FIG. 39f include a shaped abrasive particle 4200 in accordance with an embodiment. FIG. 39a is a perspective view of the shaped abrasive particle 4200. FIG. 39b is a front plan view of the shaped abrasive particle 4200. The back plan view is the same as the front. FIG. 39c is a top plan view of the shaped abrasive particle 4200. FIG. 39d is a bottom plan view of the shaped abrasive particle 4200. FIG. 39e is a first side plan view of the shaped abrasive particle 4200 and FIG. 39f is a second side plan view of the shaped abrasive particle 4200. In a particular aspect, the shaped abrasive particle 4200 can be formed using a screen printing process and overfilling the screen in one direction as described herein.

As depicted, the shaped abrasive particle 4200 can include a body 4202 having a first surface 4204 and a second surface 4206. A side surface 4208 can extend between the first surface 4204 and the second surface 4206. The body 4202 can also include a flange 4210 that can extend from the side surface 4208 and the first surface 4204. In a particular aspect, the flange 4210 can include a rounded shape. Further, the flange 4210 can include a flange length 4212. The flange length 4212 can be less than a length 4214 of the body 4202. In another aspect, the flange 4210 can include a height 4216 and the height 4216 of the flange 4210 is not greater than a thickness 4218 of the body 4202. In another aspect, the body 4202 can only include a single flange 4210 and the flange 4210 extends along the periphery of the body 4202 for a distance that is not greater than 50% of the total peripheral length of the body 4202. In particular, the flange can extend around at least one exterior corner of the body 4202 and not greater than three exterior corners.

The body 4202 can include a narrow end 4220 and wide end 4222. The flange 4210 can extend from the wide end 4220 of the body 4202. In a particular aspect, the shaped abrasive particle 4200 can be formed using one or more of the systems and methods, described herein.

FIG. 40a through FIG. 40c include a shaped abrasive particle 4300 in accordance with an embodiment. FIG. 40a is a perspective view of the shaped abrasive particle 4300. FIG. 40b is a front plan view of the shaped abrasive particle 4300. The back plan view is the same as the front plan view. FIG. 40c is a side plan view of the shaped abrasive particle 4300. Both side plan views, the top plan view, and the bottom plan view of the shaped abrasive particle 4300 are the same.

As indicated, the shaped abrasive particle 4300 can include a body 4302 having a peripheral surface 4304. A plurality of teeth 4306 can extend from the peripheral surface 4304 of the body 4302. As shown, the plurality of teeth 4306 do not extend to the corners 4308, 4310, 4312, 4314 of the body 4308. Further, each of the teeth 4304 can have the same height and all of the teeth 4304 can be uniformly distributed around the peripheral surface 4304 of the body. In a particular aspect, the shaped abrasive particle 4300 can be formed using one or more of the systems and methods, described herein.

FIG. 41a through FIG. 41c include a shaped abrasive particle 4400 in accordance with an embodiment. FIG. 41a is a perspective view of the shaped abrasive particle 4400. FIG. 41b is a front plan view of the shaped abrasive particle 4400. The back plan view is the same as the front plan view. FIG. 41c is a side plan view of the shaped abrasive particle 4400. Both side plan views, the top plan view, and the bottom plan view of the shaped abrasive particle 4400 are the same.

As indicated, the shaped abrasive particle 4400 can include a body 4402 having a peripheral surface 4404. A plurality of teeth 4406 can extend from the peripheral surface 4404 of the body 4402. As shown, the plurality of teeth 4406 extend to, and form, the corners 4408, 4410, 4412, 4414 of the body 4408. Further, each of the teeth 4404 can have the same height and all of the teeth 4404 can be uniformly distributed around the peripheral surface 4404 of the body. In a particular aspect, the shaped abrasive particle 4400 can be formed using one or more of the systems and methods, described herein.

FIG. 42a through FIG. 42c include a shaped abrasive particle 4500 in accordance with an embodiment. FIG. 42a is a perspective view of the shaped abrasive particle 4500. FIG. 42b is a front plan view of the shaped abrasive particle 4500. The back plan view is the same as the front plan view. FIG. 42c is a side plan view of the shaped abrasive particle 4500. Both side plan views, the top plan view, and the bottom plan view of the shaped abrasive particle 4500 are the same.

As indicated, the shaped abrasive particle 4500 can include a body 4502 having a peripheral surface 4504. A plurality of teeth 4506 can extend from the peripheral surface 4504 of the body 4502. As shown, the plurality of teeth 4506 extend to, and form, the corners 4508, 4510, 4512, 4514 of the body 4508. Further, each of the teeth 4504 can have different heights when compared to other teeth and the teeth 4504 of varying sizes can be uniformly distributed around the peripheral surface 4504 of the body. In a particular aspect, the shaped abrasive particle 4500 can be formed using one or more of the systems and methods, described herein.

Figure 43A:
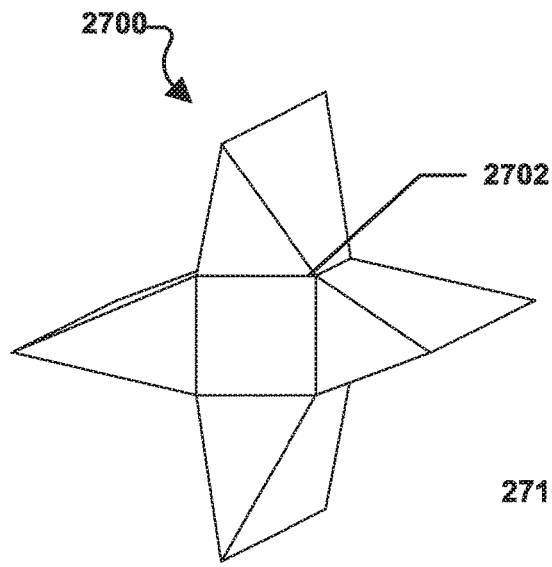
FIGS. 43a-43d include a shaped abrasive particle in accordance with an embodiment.
Figure 43B:
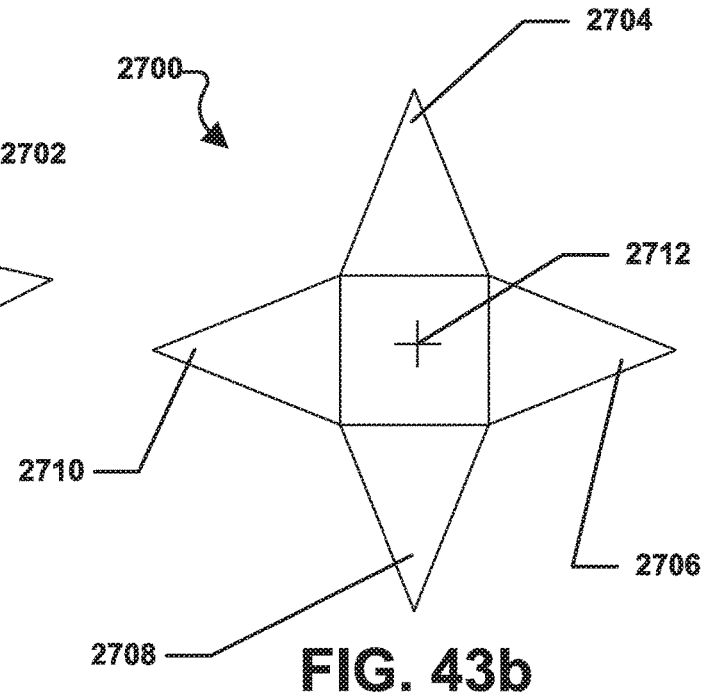
Figure 43C:
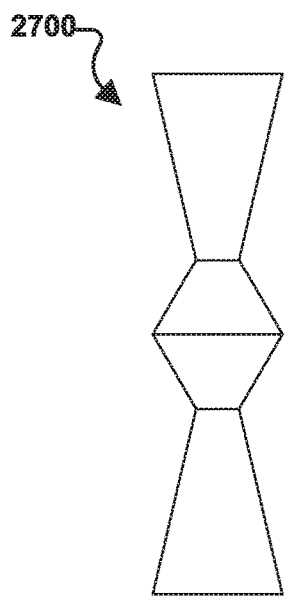
Figure 43D:
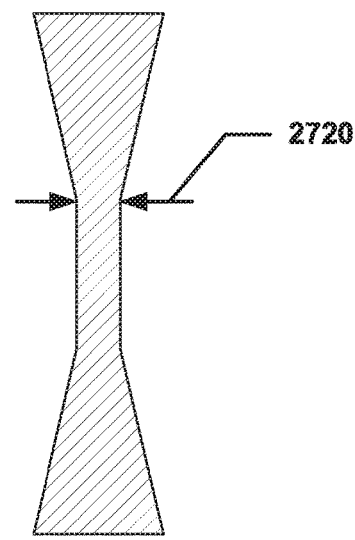

FIG. 43a through FIG. 43d include a shaped abrasive particle 4600 in accordance with an embodiment. FIG. 43a is a perspective view of the shaped abrasive particle 4600. FIG. 43b is a front plan view of the shaped abrasive particle 4600. The back plan view of the shaped abrasive particle 4600 is the same as the front plan view. FIG. 43c is a side plan view of the shaped abrasive particle 4600. Both side plan views, the top plan view, and the bottom plan view of the shaped abrasive particle 4600 are the same. FIG. 43d is a cross-sectional view of the shaped abrasive particle 4600. In a particular aspect, the shaped abrasive particle 4600 can be formed using one or more of the systems and methods, described herein.

As illustrated, the shaped abrasive particle 4600 can include a body 4602. The body 4602 can be generally star shaped. Moreover, the body 4602 can include a first point 4604, a second point 4606, a third point 4608, and a fourth point 4610. The points 4604, 4606, 4608, 4610 can be equally spaced around a central portion 4612 of the body 4602. Moreover, the body 4602 of the shaped abrasive particle 4600 can have a thickness 4620 that can increase from the central portion 4612 of the body 4602 outwardly toward each point 4604, 4606, 4608, 4610. In a particular aspect, the shaped abrasive particle 4600 can be formed using one or more of the systems and methods, described herein.

Figure 44A:
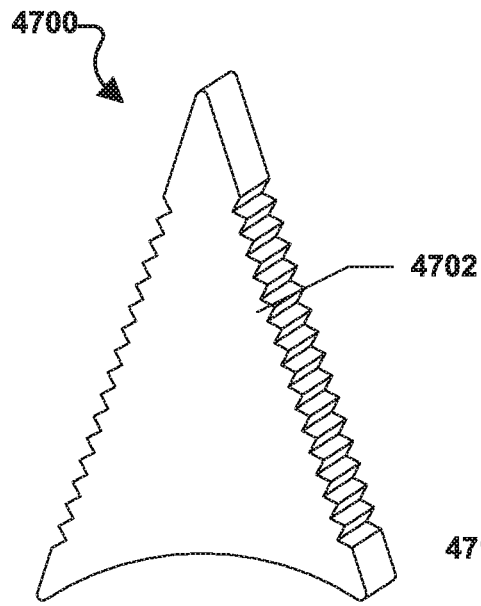
FIGS. 44a-44e include a shaped abrasive particle in accordance with an embodiment.
Figure 44B:
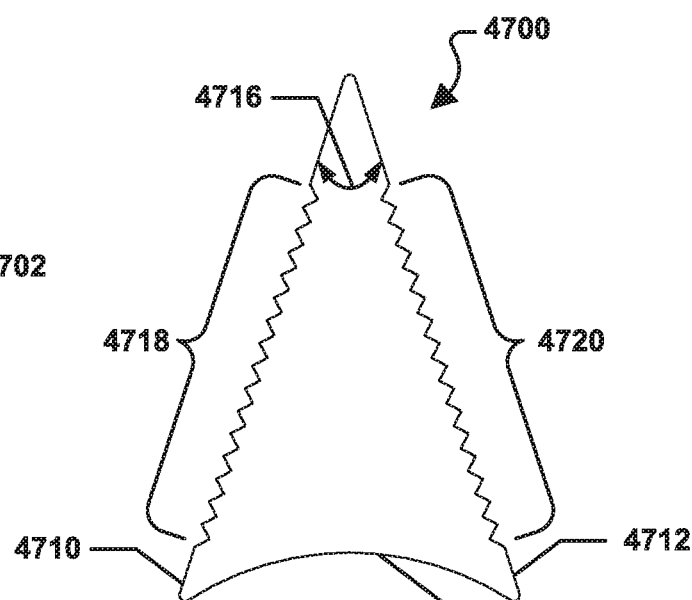
Figure 44C:
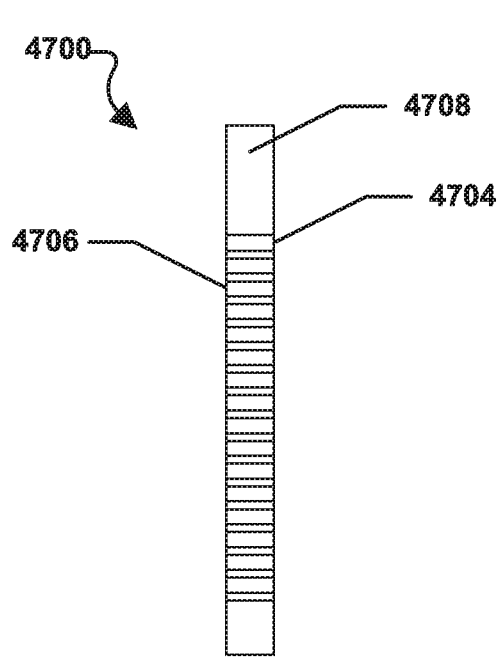
Figure 44D:
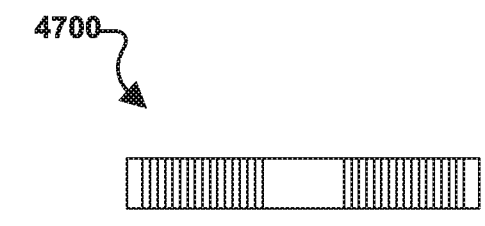
Figure 44E:

FIG. 44a through FIG. 44e include a shaped abrasive particle 4700 in accordance with an embodiment. FIG. 44a is a perspective view of the shaped abrasive particle 4700. FIG. 44b is a front plan view of the shaped abrasive particle 4700. The back plan view is the same as the front plan view. FIG. 44c is a side plan view of the shaped abrasive particle 4700. Both side plan views of the shaped abrasive particle 4700 are the same. FIG. 44d is a top plan view of the shaped abrasive particle 4700 and FIG. 44e is a bottom plan view of the shaped abrasive particle 4700.

As illustrated, the shaped abrasive particle 4700 can include a body 4702 that can be generally shaped like an arrowhead, or a shark's tooth. The body 4702 can include a first major surface 4704 and a second major surface 4706. A side surface 4708 can extend between the first major surface 4704 and the second major surface 4706. The side surface 4708 can include a first portion 4710, a second portion 4712, and a third portion 4714. The first portion 4710 can form an angle 4714 with respect to the second portion 4712. The angle 4714 can be less than or equal to 75°, such as less than or equal to 60°, less than or equal to 50°, less than or equal to 40°, or less than or equal to 35°. In another aspect, the angle 4714 can be greater than or equal to 15°, such as greater than or equal to 20°, greater than or equal to 25°, or greater than or equal to 30°.

FIG. 44b shows that the third portion 4714 of the side surface 4708 can extend between the first portion 4710 and the second portion 4712 of the side surface 4708 and can be concave. Moreover, the first portion 4710 of the side surface 4708 can include a serrated, or toothed, portion 4718. Similarly, the second portion 4712 of the side surface 4708 can include a serrated, or toothed, portion 4720. In a particular aspect, the shaped abrasive particle 4700 can be formed using one or more of the systems and methods described herein.

Figure 45A:
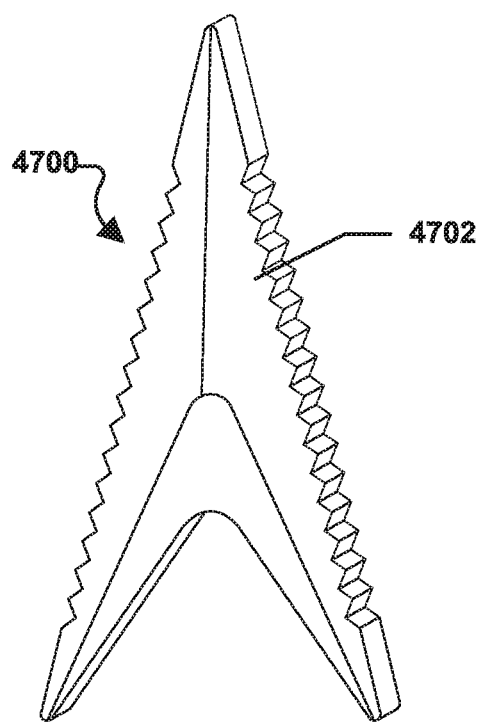
FIGS. 45a-45e include a shaped abrasive particle in accordance with an embodiment.
Figure 45B:
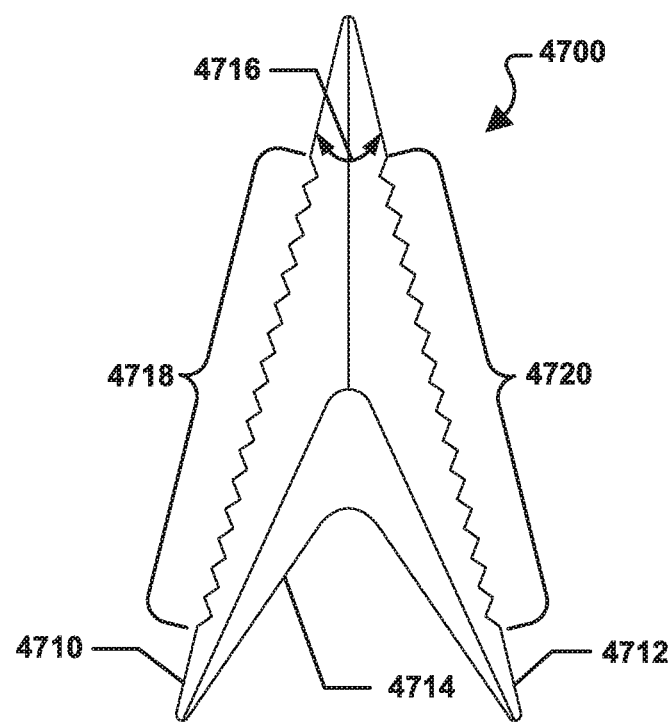
Figure 45C:
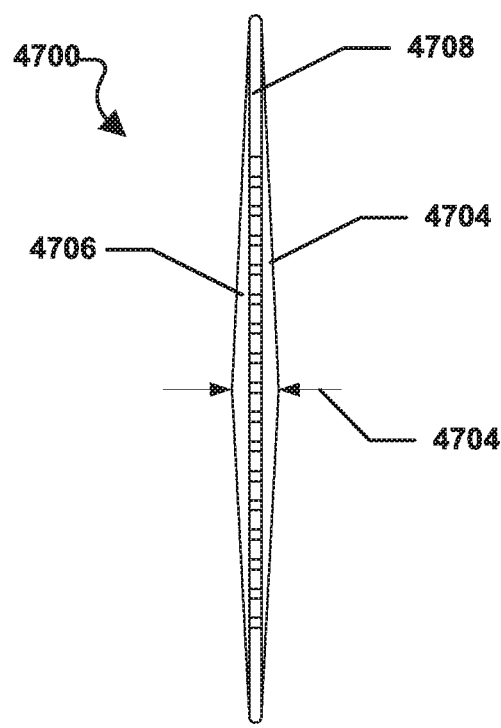
Figure 45D:
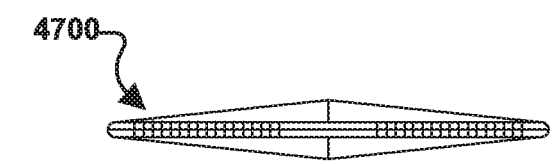
Figure 45E:
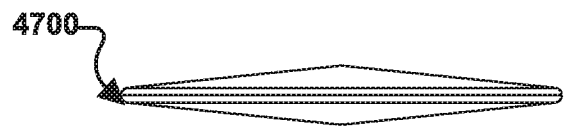

FIG. 45a through FIG. 45e include a shaped abrasive particle 4800 in accordance with an embodiment. FIG. 45a is a perspective view of the shaped abrasive particle 4800. FIG. 45b is a front plan view of the shaped abrasive particle 4800. The back plan view is the same as the front plan view. FIG. 45c is a side plan view of the shaped abrasive particle 4800. Both side plan views of the shaped abrasive particle 4800 are the same. FIG. 45d is a top plan view of the shaped abrasive particle 4800 and FIG. 45e is a bottom plan view of the shaped abrasive particle 4800.

As illustrated, the shaped abrasive particle 4800 can include a body 4802 that can be generally shaped like an arrowhead, or a shark's tooth. The body 4802 can include a first major surface 4804 and a second major surface 4806. A side surface 4808 can extend between the first major surface 4804 and the second major surface 4806. The side surface 4808 can include a first portion 4810, a second portion 4812, and a third portion 4814. The first portion 4810 can form an angle 4814 with respect to the second portion 4812. The angle 4814 can be less than or equal to 75°, such as less than or equal to 60°, less than or equal to 50°, less than or equal to 40°, or less than or equal to 35°. In another aspect, the angle 4814 can be greater than or equal to 15°, such as greater than or equal to 20°, greater than or equal to 25°, or greater than or equal to 30°.

FIG. 45b shows that the third portion 4814 of the side surface 4808 can extend between the first portion 4810 and the second portion 4812 of the side surface 4808 and can be generally triangular and rounded at the apex. Moreover, the first portion 4810 of the side surface 4808 can include a serrated, or toothed, portion 4818. Similarly, the second portion 4812 of the side surface 4808 can include a serrated, or toothed, portion 4820. As indicated in FIG. 45c, the body 4802 of the shaped abrasive particle 4800 can have a thickness 4822. The thickness 4822 of the body 4802 can decrease outwardly from a central region of the body 4802. In a particular aspect, the shaped abrasive particle 4800 can be formed using one or more of the systems and methods described herein.

The shaped abrasive particles described herein can be formed such that each respective body can include a crystalline material, and more particularly, a polycrystalline material. Notably, the polycrystalline material can include abrasive grains. In one embodiment, the body can be essentially free of an organic material, including for example, a binder. More particularly, the body can consist essentially of a polycrystalline material.

In one aspect, the body of each shaped abrasive particle can be an agglomerate including a plurality of abrasive particles, grit, and/or grains bonded to each other to form the body of the abrasive particle. Suitable abrasive grains can include nitrides, oxides, carbides, borides, oxynitrides, oxyborides, diamond, and a combination thereof. In particular instances, the abrasive grains can include an oxide compound or complex, such as aluminum oxide, zirconium oxide, titanium oxide, yttrium oxide, chromium oxide, strontium oxide, silicon oxide, and a combination thereof. In one particular instance, each shaped abrasive particle can be formed such that the abrasive grains forming the body thereof can include alumina, and more particularly, may consist essentially of alumina. Moreover, in particular instances, the shaped abrasive particle can be formed from a seeded sol-gel.

The abrasive grains (i.e., crystallites) contained within the body may have an average grain size that is generally not greater than about 100 microns. In other embodiments, the average grain size can be less, such as not greater than about 80 microns, not greater than about 50 microns, not greater than about 30 microns, not greater than about 20 microns, not greater than about 10 microns, or even not greater than about 1 micron, not greater than about 0.9 microns, not greater than about 0.8 microns, not greater than about 0.7 microns, or even not greater than about 0.6 microns. Still, the average grain size of the abrasive grains contained within each body can be at least about 0.01 microns, such as at least about 0.05 microns, at least about 0.06 microns, at least about 0.07 microns, at least about 0.08 microns, at least about 0.09 microns, at least about 0.1 microns, at least about 0.12 microns, at least about 0.15 microns, at least about 0.17 microns, at least about 0.2 microns, or even at least about 0.5 microns. It will be appreciated that the abrasive grains can have an average grain size within a range between any of the minimum and maximum values noted above.

In accordance with certain embodiments, one or more of the abrasive particles described herein can be a composite article including at least two different types of grains within the respective body. It will be appreciated that different types of grains are grains having different compositions with regard to each other. For example, the body can be formed such that is includes at least two different types of grains, wherein the two different types of grains can be nitrides, oxides, carbides, borides, oxynitrides, oxyborides, diamond, and a combination thereof.

In accordance with an embodiment, the shaped abrasive particles described herein can have an average particle size, as measured by the largest dimension measurable on the body thereof, of at least about 100 microns. In fact, the shaped abrasive particles can have an average particle size of at least about 150 microns, such as at least about 200 microns, at least about 300 microns, at least about 400 microns, at least about 500 microns, at least about 600 microns, at least about 700 microns, at least about 800 microns, or even at least about 900 microns. Still, the shaped abrasive particles can have an average particle size that is not greater than about 5 mm, such as not greater than about 3 mm, not greater than about 2 mm, or even not greater than about 1.5 mm. It will be appreciated that the abrasive particle 300 can have an average particle size within a range between any of the minimum and maximum values noted above.

The shaped abrasive particles of the embodiments herein, e.g., the bodies thereof, can have particular compositions. For example, the bodies may include a ceramic material, such as a polycrystalline ceramic material, and more particularly an oxide. The oxide may include, for example alumina. In certain instances, the bodies may include a majority content of alumina, such as at least about 95 wt % alumina for the total weight of the body, or such as at least about 95.1 wt %, at least about 95.2 wt %, at least about 95.3 wt %, at least about 95.4 wt %, at least about 95.5 wt %, at least about 95.6 wt %, at least about 95.7 wt %, at least about 95.8 wt %, at least about 95.9 wt %, at least about 96 wt %, at least about 96.1 wt %, at least about 96.2 wt %, at least about 96.3 wt %, at least about 96.4 wt %, at least about 96.5 wt %, at least about 96.6 wt %, at least about 96.7 wt %, at least about 96.8 wt %, at least about 96.9 wt %, at least about 97 wt %, at least about 97.1 wt %, at least about 97.2 wt %, at least about 975.3 wt %, at least about 97.4 wt %, or even at least about 97.5 wt % alumina for the total weight of the body. Still, in another non-limiting embodiment, the bodies may include a content of alumina not greater than about 99.5 wt %, such as not greater than about 99.4 wt %, not greater than about 99.3 wt %, not greater than about 99.2 wt %, not greater than about 99.1 wt %, not greater than about 99 wt %, not greater than about 98.9 wt %, not greater than about 98.8 wt %, not greater than about 98.7 wt %, not greater than about 98.6 wt %, not greater than about 98.5 wt %, not greater than about 98.4 wt %, not greater than about 98.3 wt %, not greater than about 98.2 wt %, not greater than about 98.1 wt %, not greater than about 98 wt %, not greater than about 97.9 wt %, not greater than about 97.8 wt %, not greater than about 97.7 wt %, not greater than about 97.6 wt %, or even not greater than about 97.5 wt % alumina for the total weight of the body 1201. It will be appreciated that the bodies may include a content of alumina within a range between any of the minimum and maximum values noted above.

The bodies of the shaped abrasive particles may be formed to include certain additives. The additives can be non-organic species, including but not limited to an oxide. In one particular instance, the additive may be a dopant material, which may be present in a particular minor amount sufficient to affect the microstructure of the material, but present in a greater content than a trace amount or less. The dopant material may include an element selected from the group of hafnium, zirconium, niobium, tantalum, molybdenum, vanadium, lithium, sodium, potassium, magnesium, calcium, strontium, barium, scandium, yttrium, lanthanum, cesium, praseodymium, chromium, cobalt, iron, germanium, manganese, nickel, titanium, zinc, and a combination thereof. In still a more particular embodiment, the dopant material may include magnesium, and may be a magnesium-containing species, including but not limited to, magnesium oxide (MgO).

According to one embodiment, the magnesium-containing species can be a compound including magnesium and at least one other element. In at least one embodiment, the magnesium-containing compound can include an oxide compound, such that the magnesium-containing species includes magnesium and oxygen. In yet another embodiment, the magnesium-containing species can include aluminum, and more particularly may be a magnesium aluminate species. For example, in certain instances, the magnesium-containing species can be a spinel material. The spinel material may be stoichiometric or non-stoichiometric spinel.

The magnesium-containing species may be a distinct phase of material formed in the body as compared to another primary phase, including for example, an alumina phase. The magnesium-containing species may be preferentially disposed at the grain boundaries of the primary phase (e.g., alumina grains). In still other instances, the magnesium-containing species may be primarily and uniformly dispersed throughout the volume of the grains of the primary phase.

The magnesium-containing species may be a strength-altering material. For example, in at least one embodiment, the addition of the magnesium-containing species can be configured to reduce the strength of the body compared to a body that does not include the magnesium-containing species.

Certain compositions of the shaped abrasive particles of the embodiments can include a particular content of magnesium oxide. For example, the bodies of any of the shaped abrasive particles may include a content of a magnesium-containing species of at least about 0.5 wt %, such as at least about 0.6 wt %, at least about 0.7 wt %, at least about 0.8 wt %, at least about 0.9 wt %, at least about 1 wt %, at least about 1.1 wt %, at least about 1.2 wt %, at least about 1.3 wt %, at least about 1.4 wt %, at least about 1.5 wt %, at least about 1.6 wt %, at least about 1.7 wt %, at least about 1.8 wt %, at least about 1.9 wt %, at least about 2 wt %, at least about 2.1 wt %, at least about 2.2 wt %, at least about 2.3 wt %, at least about 2.4 wt %, or even at least about 2.5 wt % for the total weight of the body 1201. In still another non-limiting embodiment, the body 1201 may include a content of a magnesium-containing species of not greater than about 5 wt %, such as not greater than about 4.9 wt %, not greater than about 4.8 wt %, not greater than about 4.7 wt %, not greater than about 4.6 wt %, not greater than about 4.5 wt %, not greater than about 4.4 wt %, not greater than about 4.3 wt %, not greater than about 4.2 wt %, not greater than about 4.1 wt %, not greater than about 4 wt %, not greater than about 3.9 wt %, not greater than about 3.8 wt %, not greater than about 3.7 wt %, not greater than about 3.6 wt %, not greater than about 3.5 wt %, not greater than about 3.4 wt %, not greater than about 3.3 wt %, not greater than about 3.2 wt %, not greater than about 3.1 wt %, not greater than about 3 wt %, not greater than about 2.9 wt %, not greater than about 2.8 wt %, not greater than about 2.7 wt %, not greater than about 2.6 wt %, or even not greater than about 2.5 wt %. It will be appreciated that the content of a magnesium-containing species within the bodies may be within a range between any of the minimum and maximum values noted above. Furthermore, in at least one embodiment, the bodies of the shaped abrasive particles may consist essentially of alumina ($Al_2O_3$) and the magnesium-containing species.

Moreover, the bodies of the shaped abrasive particle of any of the embodiments herein may be formed of a polycrystalline material including grains, which may be made of materials such as nitrides, oxides, carbides, borides, oxynitrides, diamond, and a combination thereof. Further, the bodies can be essentially free of an organic material, essentially free of rare earth elements, and essentially free of iron. The bodies may be essentially free of nitrides, essentially free of chlorides, essentially free of nitrides, or essentially free of oxynitrides. Being essentially free is understood to mean that the body is formed in a manner to exclude such materials, but the body may not necessarily be completely free of such materials as they may be present in trace amounts or less.

Certain features, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

EMBODIMENTS

Embodiment 1. A shaped abrasive particle comprising a body including a first surface, a second surface, a side surface extending between the first surface and second surface, and a flange portion extending from the side surface and the first major surface.

Embodiment 2. The shaped abrasive particle of embodiment 1, wherein the flange comprises a rounded shape.

Embodiment 3. The shaped abrasive particle of embodiment 1, wherein the flange comprises a length that is less than a length of the body.

Embodiment 4. The shaped abrasive particle of embodiment 1, wherein the flange has a height that is not greater than a thickness of the body.

Embodiment 5. The shaped abrasive particle of embodiment 1, wherein the body comprises a single flange and wherein the single flange extends from the body and extends for a distance of not greater than 50% of a total peripheral length of the body.

Embodiment 6. The shaped abrasive particle of embodiment 5, wherein the single flange extends around at least 1 exterior corner and not greater than 3 exterior corners.

Embodiment 7. A shaped abrasive particle having a body including a first surface, a second surface, and a side surface, wherein the body comprises a gear-shaped two-dimensional shape including a plurality of teeth extending peripherally from the side surface of the body.

Embodiment 8. The shaped abrasive particle of embodiment 7, wherein the plurality of teeth extend along a length of the body.

Embodiment 9. The shaped abrasive particle of embodiment 7, wherein the plurality of teeth extend along an entire length of the body.

Embodiment 10. The shaped abrasive particle of embodiment 7, wherein each of the teeth of the plurality of teeth comprises a two-dimensional shape.

Embodiment 11. The shaped abrasive particle of embodiment 10, wherein the two-dimensional shape is symmetric about at least a bisecting axis.

Embodiment 12. The shaped abrasive particle of embodiment 10, wherein the two-dimensional shape is asymmetric about a bisecting axis.

Embodiment 13. A shaped abrasive particle having a body including a first surface, a second surface, and a side surface extending between a first surface and the second surface, wherein the first surface comprises raised portions extending from exterior corners of the body along the first surface and joining in a center region of the first surface.

Embodiment 14. The shaped abrasive particle of embodiment 13, wherein the raised portions extend linearly from the exterior corners to the center region, and wherein the raised portions define and separate a plurality of depressed regions that abut the raised portions and at least a portion of the side surface of the body.

Embodiment 15. The shaped abrasive particle of embodiment 13, wherein the second surface comprises raised portions extending from exterior corners of the body along the first surface and joining in a center region of the first surface.

Embodiment 16. The shaped abrasive particle of embodiment 15, wherein the raised portions of the first surface and the second surface have substantially the same arrangement relative to each other.

Embodiment 17. The shaped abrasive particle of embodiment 15, wherein the raised portions extend linearly from the exterior corners to the center region, and wherein the raised portions define and separate a plurality of depressed regions that abut the raised portions and at least a portion of the side surface of the body.

Embodiment 18. A shaped abrasive particle having a body defining a partial-ellipsoid shape, the body including a first surface, a second surface, and a third surface extending between a portion of the first major surface and the second major surface, wherein at least a portion of the first surface and a portion of the second surface are connected to each other along a first edge and wherein a portion of the first surface and a portion of the third surface are connected to each other and define a second edge, and wherein a portion of the second surface and a portion of the third surface are connected to each other and define a third edge.

Embodiment 19. The shaped abrasive particle of embodiment 18, wherein the first surface comprises a concave shape.

Embodiment 20. The shaped abrasive particle of embodiment 18, wherein the first surface comprises a planar shape.

Embodiment 21. The shaped abrasive particle of embodiment 18, wherein second surface comprises a convex shape.

Embodiment 22. The shaped abrasive particle of embodiment 18, wherein the third surface comprises a concave shape.

Embodiment 23. The shaped abrasive particle of embodiment 18, wherein the third surface comprises a planar shape.

Embodiment 24. The shaped abrasive particle of embodiment 18, wherein the first edge comprises a curved or elliptical contour.

Embodiment 25. The shaped abrasive particle of embodiment 18, wherein the third edge comprises a curved or elliptical contour.

Embodiment 26. A shaped abrasive particle comprising a body having a conical or frustoconical shape, wherein a surface of the body comprises a plurality of protrusions extending in a spiral pathway.

Embodiment 27. The shaped abrasive particle of embodiment 26, wherein the body comprises a first surface, a second surface substantially parallel to the first surface and a side surface extending between the first surface and the second surface, and wherein the side surface comprises the plurality of protrusions.

Embodiment 28. A shaped abrasive particle having a body defining a fin-shape, wherein the body comprises a length, a width and a thickness and wherein the body comprises a rectangular cross-sectional shape in the plane defined by the length and width and an elliptical cross-sectional shape in the plane defined by the width and thickness, and wherein the aspect ratio of width-to-thickness (w:t) is at least 2:1.

Embodiment 29. The shaped abrasive particle of embodiment 28, wherein the body comprises a first surface, a second surface, and a side surface, wherein the side surface comprises two side surface portions comprising a convex shape and two side surface portions comprising a planar shape, and wherein the two side surface portions comprising the convex shape are separated by the side surface portions having the planar shape.

Embodiment 30. A shaped abrasive particle having a rake-shaped body including a first group of projections extending from a central region of the body in a first direction and a second group of projections extending from the central region the body in a second direction, and wherein the first group of projections have a length (Lp1) that is different compared to a length (Lp2) of the second group of projections.

Embodiment 31. A shaped abrasive particle having a body including a first surface, a second surface, and a side surface, wherein the body comprises at least four distinct side surface portions separated by at least four exterior corners, and wherein at least one side surface portion comprises a concave contour and wherein the particle comprises a curved shape, wherein the first surface comprises a substantially concave curvature and the second surface comprises a substantially convex curvature.

Embodiment 32. A shaped abrasive particle having a toothed body including a plurality of teeth extending from one side of the body, wherein the plurality of teeth define external corners of the body having an average spacing of less than 0.5(L), wherein L defines the length of the body.

Embodiment 33. The shaped abrasive particle of embodiment 32, wherein each of the teeth of the plurality of teeth comprises a height and wherein at least some of the teeth have a different height compared to other teeth of the plurality of teeth.

Embodiment 34. The shaped abrasive particle of embodiment 32, wherein each of the teeth of the plurality of teeth comprises a height and wherein all of the teeth have a same height compared to each other.

Embodiment 35. The shaped abrasive particle of embodiment 32, wherein the plurality of teeth are uniformly distributed around a peripheral surface of the body.

Embodiment 36. The shaped abrasive particle of embodiment 32, wherein the plurality of teeth are non-uniformly distributed around a peripheral surface of the body.

Embodiment 37. The shaped abrasive particle of embodiment 32, wherein each of the teeth of the plurality of teeth define a single point on the body.

Embodiment 38. The shaped abrasive particle of embodiment 32, wherein each of the teeth of the plurality of teeth define multiple points on the body.

Embodiment 39. A shaped abrasive agglomerate having a body including a plurality of shaped abrasive particle portions bonded to each other to form the body of the shaped abrasive particle.

Embodiment 40. The shaped abrasive particle of embodiment 39, wherein the body comprise a central hole extending through a thickness of the particle.

Embodiment 41. The shaped abrasive particle of embodiment 39, wherein each of the shaped abrasive particle portions of the plurality of shaped abrasive particle portions have a triangular two-dimensional shape and wherein each of the triangles are joined to each other along an edge.

Embodiment 42. A shaped abrasive particle having a body including at least a first surface, a second surface, a third surface, and a fourth surface, wherein each of the first, second, third, and fourth surfaces contact at least one of the other first, second, third, and fourth surfaces along at least one edge of the body, and wherein the first surface comprises a concave contour.

Embodiment 43. The shaped abrasive particle of embodiment 42, wherein the body is in the shape of a pyramid with a tip and a base, and wherein the first surface defines the base.

Embodiment 44. A method of making a ceramic body comprising: creating a layer of material from a mixture comprising a precursor ceramic material; altering the surface of the layer with a gaseous or liquid material to create a pattern in an upper surface of the layer; and forming the layer into abrasive particles, wherein at least a portion of the abrasive particles comprises a surface including at least a portion of the pattern created in the upper surface of the layer.

Embodiment 45. A method of forming a shaped abrasive particle comprising: placing a mixture comprising a ceramic precursor material into a production tool comprising a plurality of openings, wherein placing the mixture comprises partially filling a majority of the openings of the plurality of openings.

Embodiment 46. The method of embodiment 45, wherein partially filling comprises placing the mixture into only a portion of the openings such that the openings comprise some mixture and some void volume that is free of the mixture.

Embodiment 47. The method of embodiment 45, wherein partially filling a majority of the openings includes controlling at least one variable from the group consisting of: orientation of the plurality openings relative to a direction of translation of the production tool; speed of translation of the production tool; viscosity of the mixture; pressure applied to the mixture during placing of the mixture into the plurality openings; material of the production tool; surface energy between the surface of the plurality of the openings and the mixture; and any combination thereof.

Embodiment 48. A shaped abrasive particle having a body including plurality of a discrete micro-voids distributed throughout the body, wherein the discrete micro-voids include a liquid or gas material.

Embodiment 49. The shaped abrasive particle of embodiment 48, wherein the discrete micro-voids are non-uniformly distributed throughout the body.

Embodiment 50. The shaped abrasive particle of embodiment 48, wherein the discrete micro-voids are non-uniformly distributed throughout the body including a greater content of the discrete micro-voids in a central region of the body compared to a content of discrete micro-voids at a surface region of the body.

Embodiment 51. The shaped abrasive particle of embodiment 48, wherein the discrete micro-voids are uniformly distributed throughout the body.

Embodiment 52. A method of making shaped abrasive particles comprising translating a production tool having openings over rollers and through a deposition zone configured to deposit a mixture into the openings, wherein in the deposition zone the production tool is translated over a primary roller having a greater diameter compared to any other rollers in contact with the production tool.

Embodiment 53. A shaped abrasive particle having a multi-flanged body including a first shaped abrasive portion bonded to another shaped abrasive portion to form the body including at least two different flanges, and wherein the different flanges extend in different planes with respect to each other.

Embodiment 54. A shaped abrasive particle having an annular body comprising a first surface, second surface, a third surface extending between the first surface and second surface, wherein the annular body comprises a rounded contour, a central opening extend through the body, and wherein at least a portion of the first surface comprises a non-planar contour.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The Abstract of the Disclosure is provided to comply with Patent Law and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all features of any of the disclosed embodiments. Thus, the following claims are incorporated into the Detailed Description of the Drawings, with each claim standing on its own as defining separately claimed subject matter.

What is claimed is:

1. A method of making a shaped abrasive particle comprising:
   forming a mixture;
   disposing the mixture into a plurality of openings of a production tool supported by a backing plate, wherein disposing includes overfilling a portion of the openings of the production tool with the mixture;
   removing the production tool from the backing plate and creating precursor shaped abrasive particles, wherein a majority of the precursor shaped abrasive particles comprise a flange from the overfilling of the mixture and removing the production tool from the backing.

2. The method of claim 1, wherein the mixture comprises a ceramic material and a liquid.

3. The method of claim 2, wherein the ceramic material comprises an oxide, a nitride, a carbide, a boride, an oxycarbide, an oxynitride, and a combination thereof.

4. The method of claim 2, wherein the ceramic material comprises alumina.

5. The method of claim 1, wherein the mixture comprises a solids content of at least about 25 wt % and not greater than about 75 wt % for a total weight of the mixture.

6. The method of claim 1, wherein the mixture comprises a liquid content of at least about 25 wt % and not greater than about 75 wt % for a total weight of the mixture.

7. The method of claim 1, wherein the mixture comprises a storage modulus of at least about $1\times10^4$ Pa.

8. The method of claim 1, wherein the mixture comprises a viscosity of at least about $2\times10^3$ Pa.

9. The method of claim 1, wherein the mixture comprises not greater than about 30 wt % organic material for the total weight of the mixture.

10. The method of claim 1, wherein each of the plurality of openings of the production tool have a two-dimensional shape as viewed in a plane defined by the length (l) and width (w) of the production tool.

11. The method of claim 10, wherein the two-dimensional shape comprises polygons, ellipsoids, numerals, Greek alphabet letters, Latin alphabet letters, Russian alphabet characters, complex shapes including a combination of polygonal shapes, and a combination thereof.

12. The method of claim 10, wherein the two-dimensional shape comprises a triangle.

13. The method of claim 1, wherein each of the plurality of openings of the production tool have a different two-dimensional shape.

14. The method of claim 1, wherein the production tool comprises a continuous belt, wherein the continuous belt is translated over rollers to facilitate a continuous molding operation.

15. The method of claim 1, wherein disposing comprises applying a force onto the mixture within a die in an application zone and extruding the mixture through a die opening into the production tool.

16. The method of claim 15, wherein a portion of the openings are positioned outside of the application zone to allow a portion of the mixture to be extruded through and out of the opening to form precursor shaped abrasive particles comprising a flange.

17. The method of claim 1, wherein the precursor shaped abrasive particles comprising a flange includes a body including a first surface, a second surface, a side surface extending between the first surface and second surface, the flange extending from the side surface and the first surface and wherein the body comprises a narrow end, a wide end, and a convex portion wherein the flange extends from the narrow end and the convex portion of the body.

18. The method of claim 1, wherein the flange comprises a rounded shape.

19. The method of claim 1, wherein the flange comprises a length that is less than a length of the body.

20. The method of claim 1, wherein the shaped abrasive particles formed according to the method of claim 1 are incorporated into a fixed abrasive article.

* * * * *

UNITED STATES PATENT AND TRADEMARK OFFICE
CERTIFICATE OF CORRECTION

| | | |
|---|---|---|
| PATENT NO. | : 11,427,740 B2 | Page 1 of 1 |
| APPLICATION NO. | : 16/749490 | |
| DATED | : August 30, 2022 | |
| INVENTOR(S) | : Todd M. Cotter et al. | |

It is certified that error appears in the above-identified patent and that said Letters Patent is hereby corrected as shown below:

On the Title Page

In Column 2, Item (56), FOREIGN PATENT DOCUMENTS, page 8, Line 12, please delete "2021214065" and insert --2021214605--

In the Specification

Column 41, Line 8, please delete "about 1×104 Pa." and insert --about $1\times10^4$ Pa.--

Column 41, Line 10, please delete "about 2×103 Pa." and insert --about $2\times10^3$ Pa.--

Column 41, Line 16, please delete "the length (1) and" and insert --the length (l) and--

Signed and Sealed this
Seventeenth Day of October, 2023

Katherine Kelly Vidal
*Director of the United States Patent and Trademark Office*